United States Patent
Fujimoto et al.

(10) Patent No.: US 11,374,249 B2
(45) Date of Patent: Jun. 28, 2022

(54) FLOW BATTERY

(71) Applicant: Panasonic Intellectual Property Management Co., Ltd., Osaka (JP)

(72) Inventors: Masahisa Fujimoto, Osaka (JP); Shuji Ito, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 131 days.

(21) Appl. No.: 16/167,532

(22) Filed: Oct. 23, 2018

(65) Prior Publication Data

US 2019/0058208 A1 Feb. 21, 2019

Related U.S. Application Data

(63) Continuation of application No. PCT/JP2017/022310, filed on Jun. 16, 2017.

(30) Foreign Application Priority Data

Jul. 19, 2016 (JP) .............................. JP2016-141440
Sep. 7, 2016 (JP) .............................. JP2016-174222
(Continued)

(51) Int. Cl.
*H01M 8/18* (2006.01)
*H01M 8/22* (2006.01)
(Continued)

(52) U.S. Cl.
CPC ........... *H01M 8/188* (2013.01); *H01M 4/382* (2013.01); *H01M 8/023* (2013.01);
(Continued)

(58) Field of Classification Search
CPC ...... H01M 8/188; H01M 4/382; H01M 8/023; H01M 8/04186; H01M 8/04283; H01M 8/20; H01M 2300/0025; H01M 2300/0071
See application file for complete search history.

(56) References Cited

U.S. PATENT DOCUMENTS

| | | | |
|---|---|---|---|
| 2008/0145721 A1* | 6/2008 | Shapiro | H01M 6/5005 429/410 |
| 2011/0189520 A1 | 8/2011 | Carter et al. | |

(Continued)

FOREIGN PATENT DOCUMENTS

| | | |
|---|---|---|
| JP | 2013-037856 | 2/2013 |
| JP | 2016-085955 A | 5/2016 |
| WO | 2010/143634 | 12/2010 |

OTHER PUBLICATIONS

The Extended European Search Report dated Sep. 2, 2019 for the related European Application No. 17830769.0.
(Continued)

*Primary Examiner* — Stewart A Fraser
(74) *Attorney, Agent, or Firm* — McDermott Will & Emery LLP

(57) ABSTRACT

A flow battery according to one aspect of the present disclosure includes: a first liquid containing dissolved therein a charge mediator and a discharge mediator; a first electrode immersed in the first liquid; and a first active material immersed in the first liquid. The equilibrium potential of the charge mediator is lower than the equilibrium potential of the first active material, and the equilibrium potential of the discharge mediator is higher than the equilibrium potential of the first active material.

27 Claims, 94 Drawing Sheets

(30) Foreign Application Priority Data

| | | |
|---|---|---|
| Nov. 16, 2016 | (JP) | JP2016-223177 |
| Nov. 16, 2016 | (JP) | JP2016-223178 |
| Nov. 16, 2016 | (JP) | JP2016-223179 |
| Nov. 16, 2016 | (JP) | JP2016-223180 |
| Dec. 15, 2016 | (JP) | JP2016-242811 |
| Mar. 13, 2017 | (JP) | JP2017-046869 |

(51) Int. Cl.
  *H01M 8/04186* (2016.01)
  *H01M 4/38* (2006.01)
  *H01M 8/023* (2016.01)
  *H01M 8/04276* (2016.01)
  *H01M 8/20* (2006.01)

(52) U.S. Cl.
  CPC ... *H01M 8/04186* (2013.01); *H01M 8/04283* (2013.01); *H01M 8/20* (2013.01); *H01M 8/225* (2013.01); *H01M 2300/0025* (2013.01); *H01M 2300/0071* (2013.01); *Y02E 60/50* (2013.01)

(56) References Cited

U.S. PATENT DOCUMENTS

| | | | |
|---|---|---|---|
| 2011/0287305 A1* | 11/2011 | Scordilis-Kelley | H01M 2/1653 429/163 |
| 2012/0135278 A1 | 5/2012 | Yoshie et al. | |
| 2014/0178735 A1* | 6/2014 | Wang | H01M 8/20 429/105 |
| 2015/0255803 A1 | 9/2015 | Delnick et al. | |
| 2015/0280259 A1 | 10/2015 | Anderson et al. | |
| 2017/0187059 A1* | 6/2017 | Potash | H01M 8/188 |
| 2017/0222226 A1* | 8/2017 | Helms | H01M 4/382 |
| 2017/0250434 A1* | 8/2017 | Gennett | H01M 8/188 |
| 2018/0254463 A1* | 9/2018 | Sundaresan | H01M 8/1053 |

OTHER PUBLICATIONS

International Search Report of PCT application No. PCT/JP2017/022310 dated Aug. 15, 2017.

* cited by examiner

FIG. 2

| COMPOUND | | PHENANTHRENE | BIPHENYL | o-TERPHENYL |
|---|---|---|---|---|
| MOLAR CONCENTRATION | | 1 | 1 | 1 |
| | Li METAL | DISSOLVED (DARK GREEN) | DISSOLVED (NAVY BLUE) | DISSOLVED (DUSKY RED) |
| | $C_6Li$ | UNCHANGED | UNCHANGED | UNCHANGED |
| POTENTIAL (V vs. Li/Li$^+$) | | 0.03 | 0 | 0.15 |

FIG. 3

| COMPOUND | PHENANTHROLINE | 2,2'-BIPYRIDYL | BENZOPHENONE | trans-STILBENE |
|---|---|---|---|---|
| MOLAR CONCENTRATION | 0.1 | 1 | 1 | 0.5 |
| Li METAL | DISSOLVED (YELLOW) | DISSOLVED (RED) | DISSOLVED (BLUE) | DISSOLVED (DARK RED) |
| $C_6Li$ | Li DESORBED (YELLOW) | Li DESORBED (RED) | Li DESORBED (BLUE) | Li DESORBED (DARK RED) |
| REACTION RATE | SLOW | SLIGHTLY FAST | FAST | VERY SLOW |
| POTENTIAL (V vs. Li/Li$^+$) | 1.78 | 0.4 | 0.78 | 0.3 |

FIG. 6

(NEGATIVE ELECTRODE ACTIVE MATERIAL: GRAPHITE)

| | BIPHENYL | | PHENANTHRENE | |
|---|---|---|---|---|
| | 2,2'-BIPYRIDYL | STILBENE | 2,2'-BIPYRIDYL | STILBENE |
| NEGATIVE ELECTRODE CHARGE MEDIATOR | | | | |
| NEGATIVE ELECTRODE DISCHARGE MEDIATOR | | | | |
| POTENTIAL OF POSITIVE ELECTRODE CHARGE MEDIATOR (TTF) | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 |
| POTENTIAL OF NEGATIVE ELECTRODE CHARGE MEDIATOR | 0 | 0 | 0.03 | 0.03 |
| POTENTIAL OF NEGATIVE ELECTRODE DISCHARGE MEDIATOR | 0.4 | 0.3 | 0.4 | 0.3 |
| CHARGE VOLTAGE OF FLOW BATTERY | 3.7 | 3.7 | 3.67 | 3.67 |
| DISCHARGE VOLTAGE OF FLOW BATTERY | 3 | 3.1 | 3 | 3.1 |
| THEORETICAL CAPACITY DENSITY OF FLOW BATTERY | 317 | 317 | 317 | 317 |
| THEORETICAL ENERGY DENSITY OF FLOW BATTERY | 951 | 982 | 951 | 982 |
| VOLUME FILLING FACTOR OF POWER GENERATION ELEMENT | 0.6 | 0.6 | 0.6 | 0.6 |
| ENERGY DENSITY OF FLOW BATTERY | 570 | 589 | 570 | 589 |

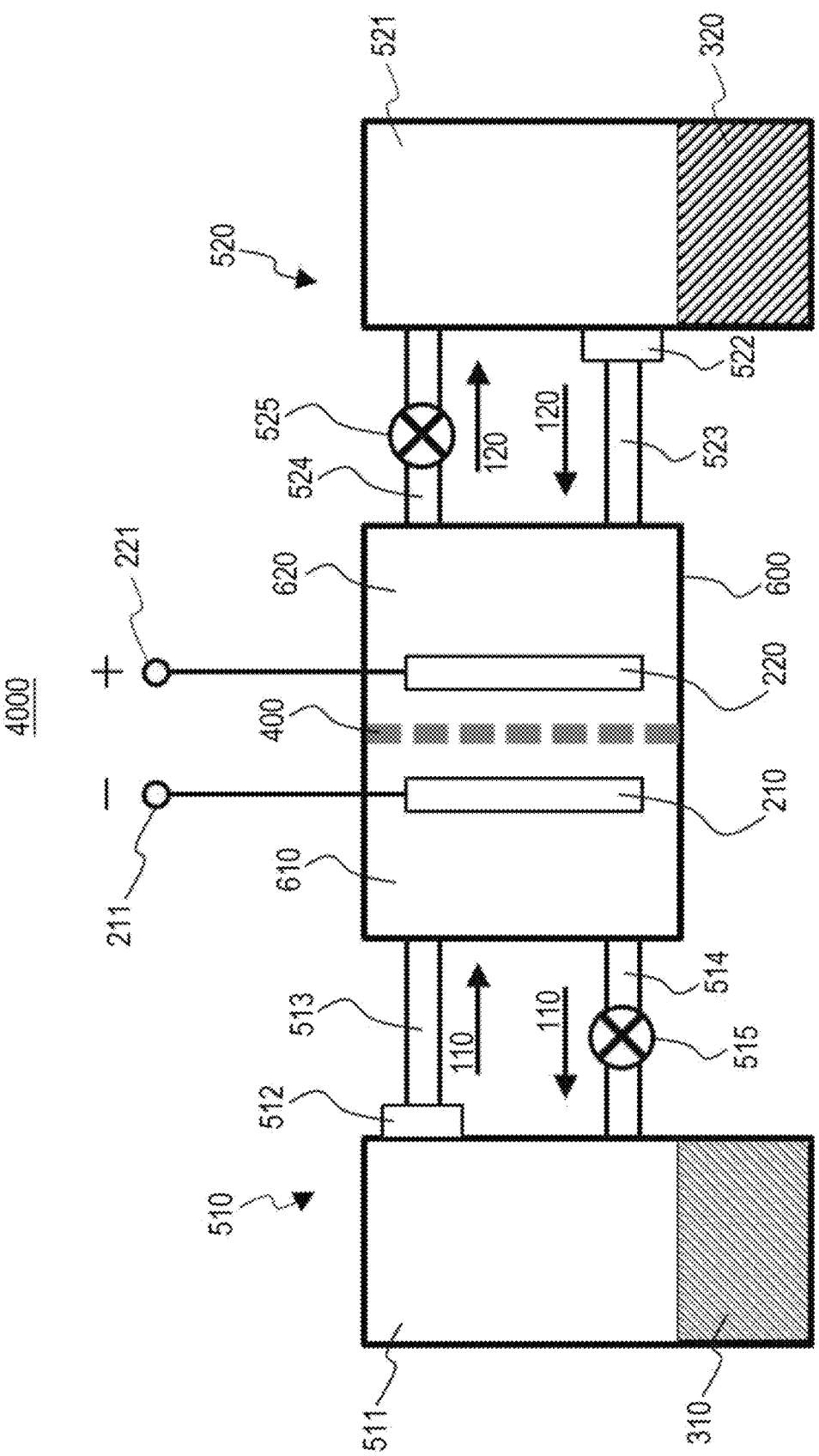

FIG. 8

| COMPOUND | MOLAR CONCENTRATION (M) | POTENTIAL (V vs. Li/Li$^+$) |
|---|---|---|
| TRIPHENYLENE | 0.1 | 0.01 |
| ANTHRACENE | 0.1 | 0.05 |

FIG. 9

| COMPOUND | MOLAR CONCENTRATION (M) | POTENTIAL (V vs. Li/Li$^+$) |
|---|---|---|
| 4,4'-BIPYRIDYL | 0.1 | 1.22 |
| 3,3'-BIPYRIDYL | 0.1 | 2.5 |
| 2,4'-BIPYRIDYL | 0.1 | 0.54 |
| 2,3'-BIPYRIDYL | 0.1 | 0.58 |
| cis-STILBENE | 0.1 | 0.43 |
| ACETOPHENONE | 0.1 | 1.29 |
| PROPIOPHENONE | 0.1 | 0.42 |
| BUTYROPHENONE | 0.1 | 0.3 |
| VALEROPHENONE | 0.1 | 0.31 |
| ETHYLENEDIAMINE | 0.1 | 0.36 |

FIG. 10
| COMPOUND | MOLAR CONCENTRATION (M) | POTENTIAL (V vs. Li/Li$^+$) |
|---|---|---|
| ACENAPHTHENE 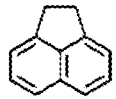 | 0.1 | 0.016 |
| ACENAPHTHYLENE 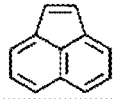 | 0.1 | 0.014 |
| FLUORANTHENE 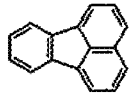 | 0.1 | 0.014 |
FIG. 11
| COMPOUND | MOLAR CONCENTRATION (M) | POTENTIAL (V vs. Li/Li$^+$) |
|---|---|---|
| BENZIL 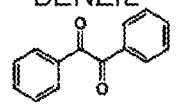 | 0.1 | 0.16 |
| TETRAPHENYLCYCLOPENTADIENONE 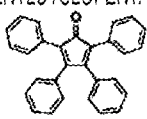 | 0.1 | 0.34 |

FIG. 12A

NEGATIVE ELECTRODE CHARGE MEDIATOR USED: PHENANTHRENE (NEGATIVE ELECTRODE ACTIVE MATERIAL: GRAPHITE)

| NEGATIVE ELECTRODE DISCHARGE MEDIATOR | 2,2'-BIPYRIDYL | trans-STILBENE | 4,4'-BIPYRIDYL | 2,4'-BIPYRIDYL | 2,3'-BIPYRIDYL | cis-STILBENE | ACETO-PHENONE | PROPIO-PHENONE | BUTYRO-PHENONE | VALERO-PHENONE | ETHYLENE-DIAMINE | BENZIL | TETRAPHENYL CYCLOPENTA DIENONE | BENZO-PHENONE |
|---|---|---|---|---|---|---|---|---|---|---|---|---|---|---|
| POTENTIAL OF POSITIVE ELECTRODE CHARGE MEDIATOR (TTF) | 3.7 | 3.7 | 3.7 | 3.7 | 3.7 | 3.7 | 3.7 | 3.7 | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 | 3.4 | 3.4 | 3.4 | 3.4 | 3.4 | 3.4 | 3.4 | 3.4 |
| POTENTIAL OF NEGATIVE ELECTRODE CHARGE MEDIATOR | 0.03 | 0.03 | 0.03 | 0.03 | 0.03 | 0.03 | 0.03 | 0.03 | 0.03 | 0.03 | 0.03 | 0.03 | 0.03 | 0.03 |
| POTENTIAL OF NEGATIVE ELECTRODE DISCHARGE MEDIATOR | 0.4 | 0.3 | 1.22 | 0.54 | 0.58 | 0.43 | 1.29 | 0.42 | 0.3 | 0.31 | 0.36 | 0.16 | 0.34 | 0.78 |
| CHARGE VOLTAGE OF FLOW BATTERY | 3.67 | 3.67 | 3.67 | 3.67 | 3.67 | 3.67 | 3.67 | 3.67 | 3.67 | 3.67 | 3.67 | 3.67 | 3.67 | 3.67 |
| DISCHARGE VOLTAGE OF FLOW BATTERY | 3 | 3.1 | 2.18 | 2.86 | 2.82 | 2.97 | 2.11 | 2.98 | 3.1 | 3.09 | 3.04 | 3.24 | 3.06 | 2.62 |
| THEORETICAL CAPACITY DENSITY OF FLOW BATTERY | 315 | 315 | 315 | 315 | 315 | 315 | 315 | 315 | 315 | 315 | 315 | 315 | 315 | 316 |
| THEORETICAL ENERGY DENSITY OF FLOW BATTERY | 945 | 976.5 | 686.7 | 900.9 | 888.3 | 935.55 | 664.65 | 938.7 | 976.5 | 973.35 | 957.6 | 1020.6 | 963.9 | 827.92 |
| VOLUME FILLING FACTOR OF POWER GENERATION ELEMENT | 0.6 | 0.6 | 0.6 | 0.6 | 0.6 | 0.6 | 0.6 | 0.6 | 0.6 | 0.6 | 0.6 | 0.6 | 0.6 | 0.6 |
| ENERGY DENSITY OF FLOW BATTERY | 567 | 585.9 | 412.02 | 540.54 | 532.98 | 561.33 | 398.79 | 563.22 | 585.9 | 584.01 | 574.56 | 612.36 | 578.34 | 496.752 |

FIG. 12B

NEGATIVE ELECTRODE CHARGE MEDIATOR USED: BIPHENYL
(NEGATIVE ELECTRODE ACTIVE MATERIAL: GRAPHITE)

| NEGATIVE ELECTRODE DISCHARGE MEDIATOR | 2,2'-BIPYRIDYL | trans-STILBENE | 4,4'-BIPYRIDYL | 2,4'-BIPYRIDYL | 2,3'-BIPYRIDYL | cis-STILBENE | ACETO-PHENONE | PROPIO-PHENONE | BUTYRO-PHENONE | VALERO-PHENONE | ETHYLENE-DIAMINE | BENZIL | TETRAPHENYL CYCLOPENTA DIENONE | BENZO-PHENONE |
|---|---|---|---|---|---|---|---|---|---|---|---|---|---|---|
| POTENTIAL OF POSITIVE ELECTRODE CHARGE MEDIATOR (TTF) | 3.7 | 3.7 | 3.7 | 3.7 | 3.7 | 3.7 | 3.7 | 3.7 | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 | 3.4 | 3.4 | 3.4 | 3.4 | 3.4 | 3.4 | 3.4 | 3.4 |
| POTENTIAL OF NEGATIVE ELECTRODE CHARGE MEDIATOR | 0 | 0 | 0 | 0 | 0 | 0 | 0 | 0 | 0 | 0 | 0 | 0 | 0 | 0 |
| POTENTIAL OF NEGATIVE ELECTRODE DISCHARGE MEDIATOR | 0.4 | 0.3 | 1.22 | 0.54 | 0.58 | 0.43 | 1.29 | 0.42 | 0.3 | 0.31 | 0.36 | 0.16 | 0.34 | 0.78 |
| CHARGE VOLTAGE OF FLOW BATTERY | 3.7 | 3.7 | 3.7 | 3.7 | 3.7 | 3.7 | 3.7 | 3.7 | 3.7 | 3.7 | 3.7 | 3.7 | 3.7 | 3.7 |
| DISCHARGE VOLTAGE OF FLOW BATTERY | 3 | 3.1 | 2.18 | 2.86 | 2.82 | 2.97 | 2.11 | 2.98 | 3.1 | 3.09 | 3.04 | 3.24 | 3.06 | 2.62 |
| THEORETICAL CAPACITY DENSITY OF FLOW BATTERY | 315 | 315 | 315 | 315 | 315 | 315 | 315 | 315 | 315 | 315 | 315 | 315 | 315 | 315 |
| THEORETICAL ENERGY DENSITY OF FLOW BATTERY | 945 | 976.5 | 686.7 | 900.9 | 888.3 | 935.55 | 664.65 | 938.7 | 976.5 | 973.35 | 957.6 | 1020.6 | 963.9 | 825.3 |
| VOLUME FILLING FACTOR OF POWER GENERATION ELEMENT | 0.6 | 0.6 | 0.6 | 0.6 | 0.6 | 0.6 | 0.6 | 0.6 | 0.6 | 0.6 | 0.6 | 0.6 | 0.6 | 0.6 |
| ENERGY DENSITY OF FLOW BATTERY | 567 | 585.9 | 412.02 | 540.54 | 532.98 | 561.33 | 398.79 | 563.22 | 585.9 | 584.01 | 574.56 | 612.36 | 578.34 | 495.18 |

FIG. 13A

NEGATIVE ELECTRODE CHARGE MEDIATOR USED: TRIPHENYLENE (NEGATIVE ELECTRODE ACTIVE MATERIAL: GRAPHITE)

| NEGATIVE ELECTRODE DISCHARGE MEDIATOR | 2,2'-BIPYRIDYL | trans-STILBENE | 4,4'-BIPYRIDYL | 2,4'-BIPYRIDYL | 2,3'-BIPYRIDYL | cis-STILBENE | ACETO-PHENONE | PROPIO-PHENONE | BUTYRO-PHENONE | VALERO-PHENONE | ETHYLENE-DIAMINE | BENZIL | TETRAPHENYL CYCLOPENTA-DIENONE | BENZO-PHENONE |
|---|---|---|---|---|---|---|---|---|---|---|---|---|---|---|
| POTENTIAL OF POSITIVE ELECTRODE CHARGE MEDIATOR (TTF) | 3.7 | 3.7 | 3.7 | 3.7 | 3.7 | 3.7 | 3.7 | 3.7 | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 | 3.4 | 3.4 | 3.4 | 3.4 | 3.4 | 3.4 | 3.4 | 3.4 |
| POTENTIAL OF NEGATIVE ELECTRODE CHARGE MEDIATOR | 0.01 | 0.01 | 0.01 | 0.01 | 0.01 | 0.01 | 0.01 | 0.01 | 0.01 | 0.01 | 0.01 | 0.01 | 0.01 | 0.01 |
| POTENTIAL OF NEGATIVE ELECTRODE DISCHARGE MEDIATOR | 0.4 | 0.3 | 1.22 | 0.54 | 0.58 | 0.43 | 1.29 | 0.42 | 0.3 | 0.31 | 0.36 | 0.16 | 0.34 | 0.78 |
| CHARGE VOLTAGE OF FLOW BATTERY | 3.69 | 3.69 | 3.69 | 3.69 | 3.69 | 3.69 | 3.69 | 3.69 | 3.69 | 3.69 | 3.69 | 3.69 | 3.69 | 3.69 |
| DISCHARGE VOLTAGE OF FLOW BATTERY | 3 | 3.1 | 2.18 | 2.86 | 2.82 | 2.97 | 2.11 | 2.98 | 3.1 | 3.09 | 3.04 | 3.24 | 3.06 | 2.62 |
| THEORETICAL CAPACITY DENSITY OF FLOW BATTERY | 315 | 315 | 315 | 315 | 315 | 315 | 315 | 315 | 315 | 315 | 315 | 315 | 315 | 315 |
| THEORETICAL ENERGY DENSITY OF FLOW BATTERY | 945 | 976.5 | 686.7 | 900.9 | 888.3 | 935.55 | 664.65 | 938.7 | 976.5 | 973.35 | 957.6 | 1020.6 | 963.9 | 825.3 |
| VOLUME FILLING FACTOR OF POWER GENERATION ELEMENT | 0.6 | 0.6 | 0.6 | 0.6 | 0.6 | 0.6 | 0.6 | 0.6 | 0.6 | 0.6 | 0.6 | 0.6 | 0.6 | 0.6 |
| ENERGY DENSITY OF FLOW BATTERY | 567 | 585.9 | 412.02 | 540.54 | 532.98 | 561.33 | 398.79 | 563.22 | 585.9 | 584.01 | 574.56 | 612.36 | 578.34 | 495.18 |

FIG. 13B

NEGATIVE ELECTRODE CHARGE MEDIATOR USED: o-TERPHENYL (NEGATIVE ELECTRODE ACTIVE MATERIAL: GRAPHITE)

| NEGATIVE ELECTRODE DISCHARGE MEDIATOR | 2,2'-BIPYRIDYL | trans-STILBENE | 4,4'-BIPYRIDYL | 2,4'-BIPYRIDYL | 2,3'-BIPYRIDYL | cis-STILBENE | ACETO-PHENONE | PROPIO-PHENONE | BUTYRO-PHENONE | VALERO-PHENONE | ETHYLENE-DIAMINE | BENZIL | TETRAPHENYL CYCLOPENTA DIENONE | BENZO-PHENONE |
|---|---|---|---|---|---|---|---|---|---|---|---|---|---|---|
| POTENTIAL OF POSITIVE ELECTRODE CHARGE MEDIATOR (TTF) | 3.7 | 3.7 | 3.7 | 3.7 | 3.7 | 3.7 | 3.7 | 3.7 | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 | 3.4 | 3.4 | 3.4 | 3.4 | 3.4 | 3.4 | 3.4 | 3.4 |
| POTENTIAL OF NEGATIVE ELECTRODE CHARGE MEDIATOR | 0.15 | 0.15 | 0.15 | 0.15 | 0.15 | 0.15 | 0.15 | 0.15 | 0.15 | 0.15 | 0.15 | 0.15 | 0.15 | 0.15 |
| POTENTIAL OF NEGATIVE ELECTRODE DISCHARGE MEDIATOR | 0.4 | 0.3 | 1.22 | 0.54 | 0.58 | 0.43 | 1.29 | 0.42 | 0.3 | 0.31 | 0.36 | 0.16 | 0.34 | 0.78 |
| CHARGE VOLTAGE OF FLOW BATTERY | 3.55 | 3.55 | 3.55 | 3.55 | 3.55 | 3.55 | 3.55 | 3.55 | 3.55 | 3.55 | 3.55 | 3.55 | 3.55 | 3.55 |
| DISCHARGE VOLTAGE OF FLOW BATTERY | 3 | 3.1 | 2.18 | 2.86 | 2.82 | 2.97 | 2.11 | 2.98 | 3.1 | 3.09 | 3.04 | 3.24 | 3.06 | 2.62 |
| THEORETICAL CAPACITY DENSITY OF FLOW BATTERY | 315 | 315 | 315 | 315 | 315 | 315 | 315 | 315 | 315 | 315 | 315 | 315 | 315 | 316 |
| THEORETICAL ENERGY DENSITY OF FLOW BATTERY | 945 | 976.5 | 686.7 | 900.9 | 888.3 | 935.55 | 664.65 | 938.7 | 976.5 | 973.35 | 957.6 | 1020.6 | 963.9 | 315 |
| VOLUME FILLING FACTOR OF POWER GENERATION ELEMENT | 0.6 | 0.6 | 0.6 | 0.6 | 0.6 | 0.6 | 0.6 | 0.6 | 0.6 | 0.6 | 0.6 | 0.6 | 0.6 | 0.6 |
| ENERGY DENSITY OF FLOW BATTERY | 567 | 585.9 | 412.02 | 540.54 | 532.98 | 561.33 | 398.79 | 563.22 | 585.9 | 584.01 | 574.56 | 612.36 | 578.34 | 189 |

FIG. 14A

NEGATIVE ELECTRODE CHARGE MEDIATOR USED: ACENAPHTHENE (NEGATIVE ELECTRODE ACTIVE MATERIAL: GRAPHITE)

| NEGATIVE ELECTRODE DISCHARGE MEDIATOR | 2,2'-BIPYRIDYL | trans-STILBENE | 4,4'-BIPYRIDYL | 2,4'-BIPYRIDYL | 2,3'-BIPYRIDYL | cis-STILBENE | ACETO-PHENONE | PROPIO-PHENONE | BUTYRO-PHENONE | VALERO-PHENONE | ETHYLENE-DIAMINE | BENZIL | TETRAPHENYL CYCLOPENTA DIENONE | BENZO-PHENONE |
|---|---|---|---|---|---|---|---|---|---|---|---|---|---|---|
| POTENTIAL OF POSITIVE ELECTRODE CHARGE MEDIATOR (TTF) | 3.7 | 3.7 | 3.7 | 3.7 | 3.7 | 3.7 | 3.7 | 3.7 | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 | 3.4 | 3.4 | 3.4 | 3.4 | 3.4 | 3.4 | 3.4 | 3.4 |
| POTENTIAL OF NEGATIVE ELECTRODE CHARGE MEDIATOR | 0.016 | 0.016 | 0.016 | 0.016 | 0.016 | 0.016 | 0.016 | 0.016 | 0.016 | 0.016 | 0.016 | 0.016 | 0.016 | 0.016 |
| POTENTIAL OF NEGATIVE ELECTRODE DISCHARGE MEDIATOR | 0.4 | 0.3 | 1.22 | 0.54 | 0.58 | 0.43 | 1.29 | 0.42 | 0.3 | 0.31 | 0.36 | 0.16 | 0.34 | 0.78 |
| CHARGE VOLTAGE OF FLOW BATTERY | 3.684 | 3.684 | 3.684 | 3.684 | 3.684 | 3.684 | 3.684 | 3.684 | 3.684 | 3.684 | 3.684 | 3.684 | 3.684 | 3.684 |
| DISCHARGE VOLTAGE OF FLOW BATTERY | 3 | 3.1 | 2.18 | 2.86 | 2.82 | 2.97 | 2.11 | 2.98 | 3.1 | 3.09 | 3.04 | 3.24 | 3.06 | 2.62 |
| THEORETICAL CAPACITY DENSITY OF FLOW BATTERY | 315 | 315 | 315 | 315 | 315 | 315 | 315 | 315 | 315 | 315 | 315 | 315 | 315 | 315 |
| THEORETICAL ENERGY DENSITY OF FLOW BATTERY | 945 | 976.5 | 686.7 | 900.9 | 888.3 | 935.55 | 664.65 | 938.7 | 976.5 | 973.35 | 957.6 | 1020.6 | 963.9 | 825.3 |
| VOLUME FILLING FACTOR OF POWER GENERATION ELEMENT | 0.6 | 0.6 | 0.6 | 0.6 | 0.6 | 0.6 | 0.6 | 0.6 | 0.6 | 0.6 | 0.6 | 0.6 | 0.6 | 0.6 |
| ENERGY DENSITY OF FLOW BATTERY | 567 | 585.9 | 412.02 | 540.54 | 532.98 | 561.33 | 398.79 | 563.22 | 585.9 | 584.01 | 574.56 | 612.36 | 578.34 | 495.18 |

FIG. 14B

NEGATIVE ELECTRODE CHARGE MEDIATOR USED: ACENAPHTHYLENE (NEGATIVE ELECTRODE ACTIVE MATERIAL: GRAPHITE)

| NEGATIVE ELECTRODE DISCHARGE MEDIATOR | 2,2'-BIPYRIDYL | trans-STILBENE | 4,4'-BIPYRIDYL | 2,4'-BIPYRIDYL | 2,3'-BIPYRIDYL | cis-STILBENE | ACETO-PHENONE | PROPIO-PHENONE | BUTYRO-PHENONE | VALERO-PHENONE | ETHYLENE-DIAMINE | BENZIL | TETRAPHENYL CYCLOPENTA DIENONE | BENZO-PHENONE |
|---|---|---|---|---|---|---|---|---|---|---|---|---|---|---|
| POTENTIAL OF POSITIVE ELECTRODE CHARGE MEDIATOR (TTF) | 3.7 | 3.7 | 3.7 | 3.7 | 3.7 | 3.7 | 3.7 | 3.7 | 3.7 | 3.7 | 3.7 | 3.7 | 3.7 | 3.7 |
| POTENTIAL OF POSITIVE ELECTRODE DISCHARGE CHARGE MEDIATOR (TTF) | 3.4 | 3.4 | 3.4 | 3.4 | 3.4 | 3.4 | 3.4 | 3.4 | 3.4 | 3.4 | 3.4 | 3.4 | 3.4 | 3.4 |
| POTENTIAL OF NEGATIVE ELECTRODE CHARGE MEDIATOR | 0.014 | 0.014 | 0.014 | 0.014 | 0.014 | 0.014 | 0.014 | 0.014 | 0.014 | 0.014 | 0.014 | 0.014 | 0.014 | 0.014 |
| POTENTIAL OF NEGATIVE ELECTRODE DISCHARGE MEDIATOR | 0.4 | 0.3 | 1.22 | 0.54 | 0.58 | 0.43 | 1.29 | 0.42 | 0.3 | 0.31 | 0.36 | 0.16 | 0.34 | 0.78 |
| CHARGE VOLTAGE OF FLOW BATTERY | 3.686 | 3.686 | 3.686 | 3.686 | 3.686 | 3.686 | 3.686 | 3.686 | 3.686 | 3.686 | 3.686 | 3.686 | 3.686 | 3.686 |
| DISCHARGE VOLTAGE OF FLOW BATTERY | 3 | 3.1 | 2.18 | 2.86 | 2.82 | 2.97 | 2.11 | 2.98 | 3.1 | 3.09 | 3.04 | 3.24 | 3.06 | 2.62 |
| THEORETICAL CAPACITY DENSITY OF FLOW BATTERY | 315 | 315 | 315 | 315 | 315 | 315 | 315 | 315 | 315 | 315 | 315 | 315 | 315 | 315 |
| THEORETICAL ENERGY DENSITY OF FLOW BATTERY | 945 | 976.5 | 686.7 | 900.9 | 888.3 | 935.55 | 664.65 | 938.7 | 976.5 | 973.35 | 957.6 | 1020.6 | 963.9 | 825.3 |
| VOLUME FILLING FACTOR OF POWER GENERATION ELEMENT | 0.6 | 0.6 | 0.6 | 0.6 | 0.6 | 0.6 | 0.6 | 0.6 | 0.6 | 0.6 | 0.6 | 0.6 | 0.6 | 0.63 |
| ENERGY DENSITY OF FLOW BATTERY | 567 | 585.9 | 412.02 | 540.54 | 532.98 | 561.33 | 398.79 | 563.22 | 585.9 | 584.01 | 574.56 | 612.36 | 578.34 | 519.939 |

FIG. 15A

NEGATIVE ELECTRODE CHARGE MEDIATOR USED: FLUORANTHENE
(NEGATIVE ELECTRODE ACTIVE MATERIAL: GRAPHITE)

| NEGATIVE ELECTRODE DISCHARGE MEDIATOR | 2,2'-BIPYRIDYL | trans-STILBENE | 4,4'-BIPYRIDYL | 2,4'-BIPYRIDYL | 2,3'-BIPYRIDYL | cis-STILBENE | ACETO-PHENONE | PROPIO-PHENONE | BUTYRO-PHENONE | VALERO-PHENONE | ETHYLENE-DIAMINE | BENZIL | TETRAPHENYL CYCLOPENTA DIENONE | BENZO-PHENONE |
|---|---|---|---|---|---|---|---|---|---|---|---|---|---|---|
| POTENTIAL OF POSITIVE ELECTRODE CHARGE MEDIATOR (TTF) | 3.7 | 3.7 | 3.7 | 3.7 | 3.7 | 3.7 | 3.7 | 3.7 | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 | 3.4 | 3.4 | 3.4 | 3.4 | 3.4 | 3.4 | 3.4 | 3.4 |
| POTENTIAL OF NEGATIVE ELECTRODE CHARGE MEDIATOR | 0.014 | 0.014 | 0.014 | 0.014 | 0.014 | 0.014 | 0.014 | 0.014 | 0.014 | 0.014 | 0.014 | 0.014 | 0.014 | 0.014 |
| POTENTIAL OF NEGATIVE ELECTRODE DISCHARGE MEDIATOR | 0.4 | 0.3 | 1.22 | 0.54 | 0.58 | 0.43 | 1.29 | 0.42 | 0.3 | 0.31 | 0.36 | 0.16 | 0.34 | 0.78 |
| CHARGE VOLTAGE OF FLOW BATTERY | 3.686 | 3.686 | 3.686 | 3.686 | 3.686 | 3.686 | 3.686 | 3.686 | 3.686 | 3.686 | 3.686 | 3.686 | 3.686 | 3.686 |
| DISCHARGE VOLTAGE OF FLOW BATTERY | 3 | 3.1 | 2.18 | 2.86 | 2.82 | 2.97 | 2.11 | 2.98 | 3.1 | 3.09 | 3.04 | 3.24 | 3.06 | 2.62 |
| THEORETICAL CAPACITY DENSITY OF FLOW BATTERY | 315 | 315 | 315 | 315 | 315 | 315 | 315 | 315 | 315 | 315 | 315 | 315 | 315 | 315 |
| THEORETICAL ENERGY DENSITY OF FLOW BATTERY | 945 | 976.5 | 686.7 | 900.9 | 888.3 | 935.55 | 664.65 | 938.7 | 976.5 | 973.35 | 957.6 | 1020.6 | 963.9 | 825.3 |
| VOLUME FILLING FACTOR OF POWER GENERATION ELEMENT | 0.6 | 0.6 | 0.6 | 0.6 | 0.6 | 0.6 | 0.6 | 0.6 | 0.6 | 0.6 | 0.6 | 0.6 | 0.6 | 0.6 |
| ENERGY DENSITY OF FLOW BATTERY | 567 | 585.9 | 412.02 | 540.54 | 532.98 | 561.33 | 398.79 | 563.22 | 585.9 | 584.01 | 574.56 | 612.36 | 578.34 | 495.18 |

FIG. 15B

NEGATIVE ELECTRODE CHARGE MEDIATOR USED: ANTHRACENE (NEGATIVE ELECTRODE ACTIVE MATERIAL: GRAPHITE)

| NEGATIVE ELECTRODE DISCHARGE MEDIATOR | 2,2'-BIPYRIDYL | trans-STILBENE | 4,4'-BIPYRIDYL | 2,4'-BIPYRIDYL | 2,3'-BIPYRIDYL | cis-STILBENE | ACETO-PHENONE | PROPIO-PHENONE | BUTYRO-PHENONE | VALERO-PHENONE | ETHYLENE-DIAMINE | BENZIL | TETRAPHENYL CYCLOPENTA DIENONE | BENZO-PHENONE |
|---|---|---|---|---|---|---|---|---|---|---|---|---|---|---|
| POTENTIAL OF POSITIVE ELECTRODE CHARGE MEDIATOR (TTF) | 3.7 | 3.7 | 3.7 | 3.7 | 3.7 | 3.7 | 3.7 | 3.7 | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 | 3.4 | 3.4 | 3.4 | 3.4 | 3.4 | 3.4 | 3.4 | 3.4 |
| POTENTIAL OF NEGATIVE ELECTRODE CHARGE MEDIATOR | 0.05 | 0.05 | 0.05 | 0.05 | 0.05 | 0.05 | 0.05 | 0.05 | 0.05 | 0.05 | 0.05 | 0.05 | 0.05 | 0.05 |
| POTENTIAL OF NEGATIVE ELECTRODE DISCHARGE MEDIATOR | 0.4 | 0.3 | 1.22 | 0.54 | 0.58 | 0.43 | 1.29 | 0.42 | 0.3 | 0.31 | 0.36 | 0.16 | 0.34 | 0.78 |
| CHARGE VOLTAGE OF FLOW BATTERY | 3.65 | 3.65 | 3.65 | 3.65 | 3.65 | 3.65 | 3.65 | 3.65 | 3.65 | 3.65 | 3.65 | 3.65 | 3.65 | 3.65 |
| DISCHARGE VOLTAGE OF FLOW BATTERY | 3 | 3.1 | 2.18 | 2.86 | 2.82 | 2.97 | 2.11 | 2.98 | 3.1 | 3.09 | 3.04 | 3.24 | 3.06 | 2.62 |
| THEORETICAL CAPACITY DENSITY OF FLOW BATTERY | 315 | 315 | 315 | 315 | 315 | 315 | 315 | 315 | 315 | 315 | 315 | 315 | 315 | 315 |
| THEORETICAL ENERGY DENSITY OF FLOW BATTERY | 945 | 976.5 | 686.7 | 900.9 | 888.3 | 935.55 | 664.65 | 938.7 | 976.5 | 973.35 | 957.6 | 1020.6 | 963.9 | 825.3 |
| VOLUME FILLING FACTOR OF POWER GENERATION ELEMENT | 0.6 | 0.6 | 0.6 | 0.6 | 0.6 | 0.6 | 0.6 | 0.6 | 0.6 | 0.6 | 0.6 | 0.6 | 0.6 | 0.6 |
| ENERGY DENSITY OF FLOW BATTERY | 567 | 585.9 | 412.02 | 540.54 | 532.98 | 561.33 | 398.79 | 563.22 | 585.9 | 584.01 | 574.56 | 612.36 | 578.34 | 495.18 |

FIG. 16A

NEGATIVE ELECTRODE CHARGE MEDIATOR USED: PHENANTHRENE (NEGATIVE ELECTRODE ACTIVE MATERIAL: Zn)

| NEGATIVE ELECTRODE DISCHARGE MEDIATOR | 2,2'-BIPYRIDYL | trans-STILBENE | 4,4'-BIPYRIDYL | 2,4'-BIPYRIDYL | 2,3'-BIPYRIDYL | cis-STILBENE | ACETO-PHENONE | PROPIO-PHENONE | BUTYRO-PHENONE | VALERO-PHENONE | ETHYLENE-DIAMINE | TETRAPHENYL CYCLOPENTA DIENONE | BENZO-PHENONE |
|---|---|---|---|---|---|---|---|---|---|---|---|---|---|
| POTENTIAL OF POSITIVE ELECTRODE CHARGE MEDIATOR (TTF) | 3.7 | 3.7 | 3.7 | 3.7 | 3.7 | 3.7 | 3.7 | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 | 3.4 | 3.4 | 3.4 | 3.4 | 3.4 | 3.4 | 3.4 |
| POTENTIAL OF NEGATIVE ELECTRODE CHARGE MEDIATOR | 0.03 | 0.03 | 0.03 | 0.03 | 0.03 | 0.03 | 0.03 | 0.03 | 0.03 | 0.03 | 0.03 | 0.03 | 0.03 |
| POTENTIAL OF NEGATIVE ELECTRODE DISCHARGE MEDIATOR | 0.4 | 0.3 | 1.22 | 0.54 | 0.58 | 0.43 | 1.29 | 0.42 | 0.3 | 0.31 | 0.36 | 0.34 | 0.78 |
| CHARGE VOLTAGE OF FLOW BATTERY | 3.67 | 3.67 | 3.67 | 3.67 | 3.67 | 3.67 | 3.67 | 3.67 | 3.67 | 3.67 | 3.67 | 3.67 | 3.67 |
| DISCHARGE VOLTAGE OF FLOW BATTERY | 3 | 3.1 | 2.18 | 2.86 | 2.82 | 2.97 | 2.11 | 2.98 | 3.1 | 3.09 | 3.04 | 3.06 | 2.62 |
| THEORETICAL CAPACITY DENSITY OF FLOW BATTERY | 433 | 433 | 433 | 433 | 433 | 433 | 433 | 433 | 433 | 433 | 433 | 433 | 434 |
| THEORETICAL ENERGY DENSITY OF FLOW BATTERY | 1299 | 1342.3 | 943.94 | 1238.38 | 1221.06 | 1286.01 | 913.63 | 1290.34 | 1342.3 | 1337.97 | 1316.32 | 1324.98 | 1137.08 |
| VOLUME FILLING FACTOR OF POWER GENERATION ELEMENT | 0.6 | 0.6 | 0.6 | 0.6 | 0.6 | 0.6 | 0.6 | 0.6 | 0.6 | 0.6 | 0.6 | 0.6 | 0.6 |
| ENERGY DENSITY OF FLOW BATTERY | 779.4 | 805.38 | 566.364 | 743.028 | 732.636 | 771.606 | 548.178 | 774.204 | 805.38 | 802.782 | 789.792 | 794.988 | 682.248 |

FIG. 16B

NEGATIVE ELECTRODE CHARGE MEDIATOR USED: BIPHENYL (NEGATIVE ELECTRODE ACTIVE MATERIAL: Zn)

| NEGATIVE ELECTRODE DISCHARGE MEDIATOR | 2,2'-BIPYRIDYL | trans-STILBENE | 4,4'-BIPYRIDYL | 2,4'-BIPYRIDYL | 2,3'-BIPYRIDYL | cis-STILBENE | ACETO-PHENONE | PROPIO-PHENONE | BUTYRO-PHENONE | VALERO-PHENONE | ETHYLENE-DIAMINE | TETRAPHENYL CYCLOPENTA DIENONE | BENZO-PHENONE |
|---|---|---|---|---|---|---|---|---|---|---|---|---|---|
| POTENTIAL OF POSITIVE ELECTRODE CHARGE MEDIATOR (TTF+) | 3.7 | 3.7 | 3.7 | 3.7 | 3.7 | 3.7 | 3.7 | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 | 3.4 | 3.4 | 3.4 | 3.4 | 3.4 | 3.4 | 3.4 |
| POTENTIAL OF NEGATIVE ELECTRODE CHARGE MEDIATOR | 0 | 0 | 0 | 0 | 0 | 0 | 0 | 0 | 0 | 0 | 0 | 0 | 0 |
| POTENTIAL OF NEGATIVE ELECTRODE DISCHARGE MEDIATOR | 0.4 | 0.3 | 1.22 | 0.54 | 0.58 | 0.43 | 1.29 | 0.42 | 0.3 | 0.31 | 0.36 | 0.34 | 0.78 |
| CHARGE VOLTAGE OF FLOW BATTERY | 3.7 | 3.7 | 3.7 | 3.7 | 3.7 | 3.7 | 3.7 | 3.7 | 3.7 | 3.7 | 3.7 | 3.7 | 3.7 |
| DISCHARGE VOLTAGE OF FLOW BATTERY | 3 | 3.1 | 2.18 | 2.86 | 2.82 | 2.97 | 2.11 | 2.98 | 3.1 | 3.09 | 3.04 | 3.06 | 2.62 |
| THEORETICAL CAPACITY DENSITY OF FLOW BATTERY | 433 | 433 | 433 | 433 | 433 | 433 | 433 | 433 | 433 | 433 | 433 | 433 | 434 |
| THEORETICAL ENERGY DENSITY OF FLOW BATTERY | 1299 | 1342.3 | 943.94 | 1238.38 | 1221.06 | 1286.01 | 913.63 | 1290.34 | 1342.3 | 1337.97 | 1316.32 | 1324.98 | 1137.08 |
| VOLUME FILLING FACTOR OF POWER GENERATION ELEMENT | 0.6 | 0.6 | 0.6 | 0.6 | 0.6 | 0.6 | 0.6 | 0.6 | 0.6 | 0.6 | 0.6 | 0.6 | 0.6 |
| ENERGY DENSITY OF FLOW BATTERY | 779.4 | 805.38 | 566.364 | 743.028 | 732.636 | 771.606 | 548.178 | 774.204 | 805.38 | 802.782 | 789.792 | 794.988 | 682.248 |

FIG. 16C

NEGATIVE ELECTRODE CHARGE MEDIATOR USED: TRIPHENYLENE  (NEGATIVE ELECTRODE ACTIVE MATERIAL: Zn)

| NEGATIVE ELECTRODE DISCHARGE MEDIATOR | 2,2'-BIPYRIDYL | trans-STILBENE | 4,4'-BIPYRIDYL | 2,4'-BIPYRIDYL | 2,3'-BIPYRIDYL | cis-STILBENE | ACETO-PHENONE | PROPIO-PHENONE | BUTYRO-PHENONE | VALERO-PHENONE | ETHYLENE-DIAMINE | TETRAPHENYL-CYCLOPENTA-DIENONE | BENZO-PHENONE |
|---|---|---|---|---|---|---|---|---|---|---|---|---|---|
| POTENTIAL OF POSITIVE ELECTRODE CHARGE MEDIATOR (TTF+) | 3.7 | 3.7 | 3.7 | 3.7 | 3.7 | 3.7 | 3.7 | 3.7 | 3.7 | 3.7 | 3.7 | 3.7 | 3.7 |
| POTENTIAL OF POSITIVE ELECTRODE DISCHARGE MEDIATOR (HTTP) | 3.4 | 3.4 | 3.4 | 3.4 | 3.4 | 3.4 | 3.4 | 3.4 | 3.4 | 3.4 | 3.4 | 3.4 | 3.4 |
| POTENTIAL OF NEGATIVE ELECTRODE CHARGE MEDIATOR | 0.01 | 0.01 | 0.01 | 0.01 | 0.01 | 0.01 | 0.01 | 0.01 | 0.01 | 0.01 | 0.01 | 0.01 | 0.01 |
| POTENTIAL OF NEGATIVE ELECTRODE DISCHARGE MEDIATOR | 0.4 | 0.3 | 1.22 | 0.54 | 0.58 | 0.43 | 1.29 | 0.42 | 0.3 | 0.31 | 0.36 | 0.34 | 0.78 |
| CHARGE VOLTAGE OF FLOW BATTERY | 3.69 | 3.69 | 3.69 | 3.69 | 3.69 | 3.69 | 3.69 | 3.69 | 3.69 | 3.69 | 3.69 | 3.69 | 3.69 |
| DISCHARGE VOLTAGE OF FLOW BATTERY | 3 | 3.1 | 2.18 | 2.86 | 2.82 | 2.97 | 2.11 | 2.98 | 3.1 | 3.09 | 3.04 | 3.06 | 2.62 |
| THEORETICAL CAPACITY DENSITY OF FLOW BATTERY | 433 | 433 | 433 | 433 | 433 | 433 | 433 | 433 | 433 | 433 | 433 | 433 | 434 |
| THEORETICAL ENERGY DENSITY OF FLOW BATTERY | 1299 | 1342.3 | 943.94 | 1238.38 | 1221.06 | 1286.01 | 913.63 | 1290.34 | 1342.3 | 1337.97 | 1316.32 | 1324.98 | 1137.08 |
| VOLUME FILLING FACTOR OF POWER GENERATION ELEMENT | 0.6 | 0.6 | 0.6 | 0.6 | 0.6 | 0.6 | 0.6 | 0.6 | 0.6 | 0.6 | 0.6 | 0.6 | 0.6 |
| ENERGY DENSITY OF FLOW BATTERY | 779.4 | 805.38 | 566.364 | 743.028 | 732.636 | 771.606 | 548.178 | 774.204 | 805.38 | 802.782 | 789.792 | 794.988 | 682.248 |

FIG. 16D

NEGATIVE ELECTRODE CHARGE MEDIATOR USED: o-TERPHENYL (NEGATIVE ELECTRODE ACTIVE MATERIAL: Zn)

| NEGATIVE ELECTRODE DISCHARGE MEDIATOR | 2,2'-BIPYRIDYL | trans-STILBENE | 4,4'-BIPYRIDYL | 2,4'-BIPYRIDYL | 2,3'-BIPYRIDYL | cis-STILBENE | ACETO-PHENONE | PROPIO-PHENONE | BUTYRO-PHENONE | VALERO-PHENONE | ETHYLENE-DIAMINE | TETRAPHENYL CYCLOPENTA DIENONE | BENZO-PHENONE |
|---|---|---|---|---|---|---|---|---|---|---|---|---|---|
| POTENTIAL OF POSITIVE ELECTRODE CHARGE MEDIATOR (TTF+) | 3.7 | 3.7 | 3.7 | 3.7 | 3.7 | 3.7 | 3.7 | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 | 3.4 | 3.4 | 3.4 | 3.4 | 3.4 | 3.4 | 3.4 |
| POTENTIAL OF NEGATIVE ELECTRODE CHARGE MEDIATOR | 0.15 | 0.15 | 0.15 | 0.15 | 0.15 | 0.15 | 0.15 | 0.15 | 0.15 | 0.15 | 0.15 | 0.15 | 0.15 |
| POTENTIAL OF NEGATIVE ELECTRODE DISCHARGE MEDIATOR | 0.4 | 0.3 | 1.22 | 0.54 | 0.58 | 0.43 | 1.29 | 0.42 | 0.3 | 0.31 | 0.36 | 0.34 | 0.78 |
| CHARGE VOLTAGE OF FLOW BATTERY | 3.55 | 3.55 | 3.55 | 3.55 | 3.55 | 3.55 | 3.55 | 3.55 | 3.55 | 3.55 | 3.55 | 3.55 | 3.55 |
| DISCHARGE VOLTAGE OF FLOW BATTERY | 3 | 3.1 | 2.18 | 2.86 | 2.82 | 2.97 | 2.11 | 2.98 | 3.1 | 3.09 | 3.04 | 3.06 | 2.62 |
| THEORETICAL CAPACITY DENSITY OF FLOW BATTERY | 433 | 433 | 433 | 433 | 433 | 433 | 433 | 433 | 433 | 433 | 433 | 433 | 434 |
| THEORETICAL ENERGY DENSITY OF FLOW BATTERY | 1299 | 1342.3 | 943.94 | 1238.38 | 1221.06 | 1286.01 | 913.63 | 1290.34 | 1342.3 | 1337.97 | 1316.32 | 1324.98 | 1137.08 |
| VOLUME FILLING FACTOR OF POWER GENERATION ELEMENT | 0.6 | 0.6 | 0.6 | 0.6 | 0.6 | 0.6 | 0.6 | 0.6 | 0.6 | 0.6 | 0.6 | 0.6 | 0.6 |
| ENERGY DENSITY OF FLOW BATTERY | 779.4 | 805.38 | 566.364 | 743.028 | 732.636 | 771.606 | 548.178 | 774.204 | 805.38 | 802.782 | 789.792 | 794.988 | 682.248 |

FIG. 17A

NEGATIVE ELECTRODE CHARGE MEDIATOR USED: ACENAPHTHENE (NEGATIVE ELECTRODE ACTIVE MATERIAL: Zn)

| NEGATIVE ELECTRODE DISCHARGE MEDIATOR | 2,2'-BIPYRIDYL | trans-STILBENE | 4,4'-BIPYRIDYL | 2,4'-BIPYRIDYL | 2,3'-BIPYRIDYL | cis-STILBENE | ACETO-PHENONE | PROPIO-PHENONE | BUTYRO-PHENONE | VALERO-PHENONE | ETHYLENE-DIAMINE | TETRAPHENYL CYCLOPENTA DIENONE | BENZO-PHENONE |
|---|---|---|---|---|---|---|---|---|---|---|---|---|---|
| POTENTIAL OF POSITIVE ELECTRODE CHARGE MEDIATOR (TTF) | 3.7 | 3.7 | 3.7 | 3.7 | 3.7 | 3.7 | 3.7 | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 | 3.4 | 3.4 | 3.4 | 3.4 | 3.4 | 3.4 | 3.4 |
| POTENTIAL OF NEGATIVE ELECTRODE CHARGE MEDIATOR | 0.016 | 0.016 | 0.016 | 0.016 | 0.016 | 0.016 | 0.016 | 0.016 | 0.016 | 0.016 | 0.016 | 0.016 | 0.016 |
| POTENTIAL OF NEGATIVE ELECTRODE DISCHARGE MEDIATOR | 0.4 | 0.3 | 1.22 | 0.54 | 0.58 | 0.43 | 1.29 | 0.42 | 0.3 | 0.31 | 0.36 | 0.34 | 0.78 |
| CHARGE VOLTAGE OF FLOW BATTERY | 3.684 | 3.684 | 3.684 | 3.684 | 3.684 | 3.684 | 3.684 | 3.684 | 3.684 | 3.684 | 3.684 | 3.684 | 3.684 |
| DISCHARGE VOLTAGE OF FLOW BATTERY | 3 | 3.1 | 2.18 | 2.86 | 2.82 | 2.97 | 2.11 | 2.98 | 3.1 | 3.09 | 3.04 | 3.06 | 2.62 |
| THEORETICAL CAPACITY DENSITY OF FLOW BATTERY | 433 | 433 | 433 | 433 | 433 | 433 | 433 | 433 | 433 | 433 | 433 | 433 | 434 |
| THEORETICAL ENERGY DENSITY OF FLOW BATTERY | 1299 | 1342.3 | 943.94 | 1238.38 | 1221.06 | 1286.01 | 913.63 | 1290.34 | 1342.3 | 1337.97 | 1316.32 | 1324.98 | 1137.08 |
| VOLUME FILLING FACTOR OF POWER GENERATION ELEMENT | 0.6 | 0.6 | 0.6 | 0.6 | 0.6 | 0.6 | 0.6 | 0.6 | 0.6 | 0.6 | 0.6 | 0.6 | 1.6 |
| ENERGY DENSITY OF FLOW BATTERY | 779.4 | 805.38 | 566.364 | 743.028 | 732.636 | 771.606 | 548.178 | 774.204 | 805.38 | 802.782 | 789.792 | 794.988 | 1819.328 |

FIG. 17B

NEGATIVE ELECTRODE CHARGE MEDIATOR USED: ACENAPHTHYLENE  (NEGATIVE ELECTRODE ACTIVE MATERIAL: Zn)

| NEGATIVE ELECTRODE DISCHARGE MEDIATOR | 2,2'-BIPYRIDYL | trans-STILBENE | 4,4'-BIPYRIDYL | 2,4'-BIPYRIDYL | 2,3'-BIPYRIDYL | cis-STILBENE | ACETO-PHENONE | PROPIO-PHENONE | BUTYRO-PHENONE | VALERO-PHENONE | ETHYLENE-DIAMINE | TETRAPHENYL CYCLOPENTA DIENONE | BENZO-PHENONE |
|---|---|---|---|---|---|---|---|---|---|---|---|---|---|
| POTENTIAL OF POSITIVE ELECTRODE CHARGE MEDIATOR (TTF) | 3.7 | 3.7 | 3.7 | 3.7 | 3.7 | 3.7 | 3.7 | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 | 3.4 | 3.4 | 3.4 | 3.4 | 3.4 | 3.4 | 3.4 |
| POTENTIAL OF NEGATIVE ELECTRODE CHARGE MEDIATOR | 0.014 | 0.014 | 0.014 | 0.014 | 0.014 | 0.014 | 0.014 | 0.014 | 0.014 | 0.014 | 0.014 | 0.014 | 0.014 |
| POTENTIAL OF NEGATIVE ELECTRODE DISCHARGE MEDIATOR | 0.4 | 0.3 | 1.22 | 0.54 | 0.58 | 0.43 | 1.29 | 0.42 | 0.3 | 0.31 | 0.36 | 0.34 | 0.78 |
| CHARGE VOLTAGE OF FLOW BATTERY | 3.686 | 3.686 | 3.686 | 3.686 | 3.686 | 3.686 | 3.686 | 3.686 | 3.686 | 3.686 | 3.686 | 3.686 | 3.686 |
| DISCHARGE VOLTAGE OF FLOW BATTERY | 3 | 3.1 | 2.18 | 2.86 | 2.82 | 2.97 | 2.11 | 2.98 | 3.1 | 3.09 | 3.04 | 3.06 | 2.62 |
| THEORETICAL CAPACITY DENSITY OF FLOW BATTERY | 433 | 433 | 433 | 433 | 433 | 433 | 433 | 433 | 433 | 433 | 433 | 433 | 434 |
| THEORETICAL ENERGY DENSITY OF FLOW BATTERY | 1299 | 1342.3 | 943.94 | 1238.38 | 1221.06 | 1286.01 | 913.63 | 1290.34 | 1342.3 | 1337.97 | 1316.32 | 1324.98 | 1137.08 |
| VOLUME FILLING FACTOR OF POWER GENERATION ELEMENT | 0.6 | 0.6 | 0.6 | 0.6 | 0.6 | 0.6 | 0.6 | 0.6 | 0.6 | 0.6 | 0.6 | 0.6 | 0.6 |
| ENERGY DENSITY OF FLOW BATTERY | 779.4 | 805.38 | 566.364 | 743.028 | 732.636 | 771.606 | 548.178 | 774.204 | 805.38 | 802.782 | 789.792 | 794.988 | 682.248 |

FIG. 17C

NEGATIVE ELECTRODE CHARGE MEDIATOR USED: FLUORANTHENE (NEGATIVE ELECTRODE ACTIVE MATERIAL: Zn)

| NEGATIVE ELECTRODE DISCHARGE MEDIATOR | 2,2'-BIPYRIDYL | trans-STILBENE | 4,4'-BIPYRIDYL | 2,4'-BIPYRIDYL | 2,3'-BIPYRIDYL | cis-STILBENE | ACETO-PHENONE | PROPIO-PHENONE | BUTYRO-PHENONE | VALERO-PHENONE | ETHYLENE-DIAMINE | TETRAPHENYL CYCLOPENTA DIENONE | BENZO-PHENONE |
|---|---|---|---|---|---|---|---|---|---|---|---|---|---|
| POTENTIAL OF POSITIVE ELECTRODE CHARGE MEDIATOR (TTF+) | 3.7 | 3.7 | 3.7 | 3.7 | 3.7 | 3.7 | 3.7 | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 | 3.4 | 3.4 | 3.4 | 3.4 | 3.4 | 3.4 | 3.4 |
| POTENTIAL OF NEGATIVE ELECTRODE CHARGE MEDIATOR | 0.014 | 0.014 | 0.014 | 0.014 | 0.014 | 0.014 | 0.014 | 0.014 | 0.014 | 0.014 | 0.014 | 0.014 | 0.014 |
| POTENTIAL OF NEGATIVE ELECTRODE DISCHARGE MEDIATOR | 0.4 | 0.3 | 1.22 | 0.54 | 0.58 | 0.43 | 1.29 | 0.42 | 0.3 | 0.31 | 0.36 | 0.34 | 0.78 |
| CHARGE VOLTAGE OF FLOW BATTERY | 3.686 | 3.686 | 3.686 | 3.686 | 3.686 | 3.686 | 3.686 | 3.686 | 3.686 | 3.686 | 3.686 | 3.686 | 3.686 |
| DISCHARGE VOLTAGE OF FLOW BATTERY | 3 | 3.1 | 2.18 | 2.86 | 2.82 | 2.97 | 2.11 | 2.98 | 3.1 | 3.09 | 3.04 | 3.06 | 2.62 |
| THEORETICAL CAPACITY DENSITY OF FLOW BATTERY | 433 | 433 | 433 | 433 | 433 | 433 | 433 | 433 | 433 | 433 | 433 | 433 | 434 |
| THEORETICAL ENERGY DENSITY OF FLOW BATTERY | 1299 | 1342.3 | 943.94 | 1238.38 | 1221.06 | 1286.01 | 913.63 | 1290.34 | 1342.3 | 1337.97 | 1316.32 | 1324.98 | 1137.08 |
| VOLUME FILLING FACTOR OF POWER GENERATION ELEMENT | 0.6 | 0.6 | 0.6 | 0.6 | 0.6 | 0.6 | 0.6 | 0.6 | 0.6 | 0.6 | 0.6 | 0.6 | 0.6 |
| ENERGY DENSITY OF FLOW BATTERY | 779.4 | 805.38 | 566.364 | 743.028 | 732.636 | 771.606 | 548.178 | 774.204 | 805.38 | 802.782 | 789.792 | 794.988 | 682.248 |

FIG. 18A

NEGATIVE ELECTRODE CHARGE MEDIATOR USED: PHENANTHRENE
(NEGATIVE ELECTRODE ACTIVE MATERIAL: Sn)

| NEGATIVE ELECTRODE DISCHARGE MEDIATOR | 1,10-PHENANTHROLINE | 4,4'-BIPYRIDYL | 3,3'-BIPYRIDYL | 2,4'-BIPYRIDYL | 2,3'-BIPYRIDYL | ACETOPHENONE |
|---|---|---|---|---|---|---|
| POTENTIAL OF POSITIVE ELECTRODE CHARGE MEDIATOR (TTF+) | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 |
| POTENTIAL OF NEGATIVE ELECTRODE CHARGE MEDIATOR | 0.03 | 0.03 | 0.03 | 0.03 | 0.03 | 0.03 |
| POTENTIAL OF NEGATIVE ELECTRODE DISCHARGE MEDIATOR | 1.78 | 1.22 | 2.5 | 0.54 | 0.58 | 1.29 |
| CHARGE VOLTAGE OF FLOW BATTERY | 3.67 | 3.67 | 3.67 | 3.67 | 3.67 | 3.67 |
| DISCHARGE VOLTAGE OF FLOW BATTERY | 1.62 | 2.18 | 0.9 | 2.86 | 2.82 | 2.11 |
| THEORETICAL CAPACITY DENSITY OF FLOW BATTERY | 465 | 465 | 465 | 465 | 465 | 465 |
| THEORETICAL ENERGY DENSITY OF FLOW BATTERY | 753.3 | 1013.7 | 418.5 | 1329.9 | 1311.3 | 981.15 |
| VOLUME FILLING FACTOR OF POWER GENERATION ELEMENT | 0.6 | 0.6 | 0.6 | 0.6 | 0.6 | 0.6 |
| ENERGY DENSITY OF FLOW BATTERY | 451.98 | 608.22 | 251.1 | 797.94 | 786.78 | 588.69 |

FIG. 18B

NEGATIVE ELECTRODE CHARGE MEDIATOR USED: BIPHENYL  (NEGATIVE ELECTRODE ACTIVE MATERIAL: Sn)

| NEGATIVE ELECTRODE DISCHARGE MEDIATOR | 1,10-PHENANTHROLINE | 4,4'-BIPYRIDYL | 3,3'-BIPYRIDYL | 2,4'-BIPYRIDYL | 2,3'-BIPYRIDYL | ACETOPHENONE |
|---|---|---|---|---|---|---|
| POTENTIAL OF POSITIVE ELECTRODE CHARGE MEDIATOR (TTF) | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 |
| POTENTIAL OF NEGATIVE ELECTRODE CHARGE MEDIATOR | 0 | 0 | 0 | 0 | 0 | 0 |
| POTENTIAL OF NEGATIVE ELECTRODE DISCHARGE MEDIATOR | 1.78 | 1.22 | 2.5 | 0.54 | 0.58 | 1.29 |
| CHARGE VOLTAGE OF FLOW BATTERY | 3.7 | 3.7 | 3.7 | 3.7 | 3.7 | 3.7 |
| DISCHARGE VOLTAGE OF FLOW BATTERY | 1.62 | 2.18 | 0.9 | 2.86 | 2.82 | 2.11 |
| THEORETICAL CAPACITY DENSITY OF FLOW BATTERY | 465 | 465 | 465 | 465 | 465 | 465 |
| THEORETICAL ENERGY DENSITY OF FLOW BATTERY | 753.3 | 1013.7 | 418.5 | 1329.9 | 1311.3 | 981.15 |
| VOLUME FILLING FACTOR OF POWER GENERATION ELEMENT | 0.6 | 0.6 | 0.6 | 0.6 | 0.6 | 0.6 |
| ENERGY DENSITY OF FLOW BATTERY | 451.98 | 608.22 | 251.1 | 797.94 | 786.78 | 588.69 |

FIG. 18C

NEGATIVE ELECTRODE CHARGE MEDIATOR USED: TRIPHENYLENE (NEGATIVE ELECTRODE ACTIVE MATERIAL: Sn)

| NEGATIVE ELECTRODE DISCHARGE MEDIATOR | 1,10-PHENANTHROLINE | 4,4'-BIPYRIDYL | 3,3'-BIPYRIDYL | 2,4'-BIPYRIDYL | 2,3'-BIPYRIDYL | ACETOPHENONE |
|---|---|---|---|---|---|---|
| POTENTIAL OF POSITIVE ELECTRODE CHARGE MEDIATOR (TTF+) | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 |
| POTENTIAL OF NEGATIVE ELECTRODE CHARGE MEDIATOR | 0.01 | 0.01 | 0.01 | 0.01 | 0.01 | 0.01 |
| POTENTIAL OF NEGATIVE ELECTRODE DISCHARGE MEDIATOR | 1.78 | 1.22 | 2.5 | 0.54 | 0.58 | 1.29 |
| CHARGE VOLTAGE OF FLOW BATTERY | 3.69 | 3.69 | 3.69 | 3.69 | 3.69 | 3.69 |
| DISCHARGE VOLTAGE OF FLOW BATTERY | 1.62 | 2.18 | 0.9 | 2.86 | 2.82 | 2.11 |
| THEORETICAL CAPACITY DENSITY OF FLOW BATTERY | 465 | 465 | 465 | 465 | 465 | 465 |
| THEORETICAL ENERGY DENSITY OF FLOW BATTERY | 753.3 | 1013.7 | 418.5 | 1329.9 | 1311.3 | 981.15 |
| VOLUME FILLING FACTOR OF POWER GENERATION ELEMENT | 0.6 | 0.6 | 0.6 | 0.6 | 0.6 | 0.6 |
| ENERGY DENSITY OF FLOW BATTERY | 451.98 | 608.22 | 251.1 | 797.94 | 786.78 | 588.69 |

FIG. 18D

NEGATIVE ELECTRODE CHARGE MEDIATOR USED: o-TERPHENYL  
(NEGATIVE ELECTRODE ACTIVE MATERIAL: Sn)

| NEGATIVE ELECTRODE DISCHARGE MEDIATOR | 1,10-PHENANTHROLINE | 4,4'-BIPYRIDYL | 3,3'-BIPYRIDYL | 2,4'-BIPYRIDYL | 2,3'-BIPYRIDYL | ACETOPHENONE |
|---|---|---|---|---|---|---|
| POTENTIAL OF POSITIVE ELECTRODE CHARGE MEDIATOR (TTF+) | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 |
| POTENTIAL OF NEGATIVE ELECTRODE CHARGE MEDIATOR | 0.15 | 0.15 | 0.15 | 0.15 | 0.15 | 0.15 |
| POTENTIAL OF NEGATIVE ELECTRODE DISCHARGE MEDIATOR | 1.78 | 1.22 | 2.5 | 0.54 | 0.58 | 1.29 |
| CHARGE VOLTAGE OF FLOW BATTERY | 3.55 | 3.55 | 3.55 | 3.55 | 3.55 | 3.55 |
| DISCHARGE VOLTAGE OF FLOW BATTERY | 1.62 | 2.18 | 0.9 | 2.86 | 2.82 | 2.11 |
| THEORETICAL CAPACITY DENSITY OF FLOW BATTERY | 465 | 465 | 465 | 465 | 465 | 465 |
| THEORETICAL ENERGY DENSITY OF FLOW BATTERY | 753.3 | 1013.7 | 418.5 | 1329.9 | 1311.3 | 981.15 |
| VOLUME FILLING FACTOR OF POWER GENERATION ELEMENT | 0.6 | 0.6 | 0.6 | 0.6 | 0.6 | 0.6 |
| ENERGY DENSITY OF FLOW BATTERY | 451.98 | 608.22 | 251.1 | 797.94 | 786.78 | 588.69 |

FIG. 19A

NEGATIVE ELECTRODE CHARGE MEDIATOR USED: ACENAPHTHENE                                                                           (NEGATIVE ELECTRODE ACTIVE MATERIAL: Sn)

| NEGATIVE ELECTRODE DISCHARGE MEDIATOR | 1,10-PHENANTHROLINE | 4,4'-BIPYRIDYL | 3,3'-BIPYRIDYL | 2,4'-BIPYRIDYL | 2,3'-BIPYRIDYL | ACETOPHENONE |
|---|---|---|---|---|---|---|
| POTENTIAL OF POSITIVE ELECTRODE CHARGE MEDIATOR (TTF⁺) | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 |
| POTENTIAL OF NEGATIVE ELECTRODE CHARGE MEDIATOR | 0.016 | 0.016 | 0.016 | 0.016 | 0.016 | 0.016 |
| POTENTIAL OF NEGATIVE ELECTRODE DISCHARGE MEDIATOR | 1.78 | 1.22 | 2.5 | 0.54 | 0.58 | 1.29 |
| CHARGE VOLTAGE OF FLOW BATTERY | 3.684 | 3.684 | 3.684 | 3.684 | 3.684 | 3.684 |
| DISCHARGE VOLTAGE OF FLOW BATTERY | 1.62 | 2.18 | 0.9 | 2.86 | 2.82 | 2.11 |
| THEORETICAL CAPACITY DENSITY OF FLOW BATTERY | 465 | 465 | 465 | 465 | 465 | 465 |
| THEORETICAL ENERGY DENSITY OF FLOW BATTERY | 753.3 | 1013.7 | 418.5 | 1329.9 | 1311.3 | 981.15 |
| VOLUME FILLING FACTOR OF POWER GENERATION ELEMENT | 0.6 | 0.6 | 0.6 | 0.6 | 0.6 | 0.6 |
| ENERGY DENSITY OF FLOW BATTERY | 451.98 | 608.22 | 251.1 | 797.94 | 786.78 | 588.69 |

FIG. 19B

NEGATIVE ELECTRODE CHARGE MEDIATOR USED: ACENAPHTHYLENE (NEGATIVE ELECTRODE ACTIVE MATERIAL: Sn)

| NEGATIVE ELECTRODE DISCHARGE MEDIATOR | 1,10-PHENANTHROLINE | 4,4'-BIPYRIDYL | 3,3'-BIPYRIDYL | 2,4'-BIPYRIDYL | 2,3'-BIPYRIDYL | ACETOPHENONE |
|---|---|---|---|---|---|---|
| POTENTIAL OF POSITIVE ELECTRODE CHARGE MEDIATOR (TTF+) | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 |
| POTENTIAL OF NEGATIVE ELECTRODE CHARGE MEDIATOR | 0.014 | 0.014 | 0.014 | 0.014 | 0.014 | 0.014 |
| POTENTIAL OF NEGATIVE ELECTRODE DISCHARGE MEDIATOR | 1.78 | 1.22 | 2.5 | 0.54 | 0.58 | 1.29 |
| CHARGE VOLTAGE OF FLOW BATTERY | 3.686 | 3.686 | 3.686 | 3.686 | 3.686 | 3.686 |
| DISCHARGE VOLTAGE OF FLOW BATTERY | 1.62 | 2.18 | 0.9 | 2.86 | 2.82 | 2.11 |
| THEORETICAL CAPACITY DENSITY OF FLOW BATTERY | 465 | 465 | 465 | 465 | 465 | 465 |
| THEORETICAL ENERGY DENSITY OF FLOW BATTERY | 753.3 | 1013.7 | 418.5 | 1329.9 | 1311.3 | 981.15 |
| VOLUME FILLING FACTOR OF POWER GENERATION ELEMENT | 0.6 | 0.6 | 0.6 | 0.6 | 0.6 | 0.6 |
| ENERGY DENSITY OF FLOW BATTERY | 451.98 | 608.22 | 251.1 | 797.94 | 786.78 | 588.69 |

FIG. 19C

NEGATIVE ELECTRODE CHARGE MEDIATOR USED: FLUORANTHENE (NEGATIVE ELECTRODE ACTIVE MATERIAL: Sn)

| NEGATIVE ELECTRODE DISCHARGE MEDIATOR | 1,10-PHENANTHROLINE | 4,4'-BIPYRIDYL | 3,3'-BIPYRIDYL | 2,4'-BIPYRIDYL | 2,3'-BIPYRIDYL | ACETOPHENONE |
|---|---|---|---|---|---|---|
| POTENTIAL OF POSITIVE ELECTRODE CHARGE MEDIATOR (TTF) | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 |
| POTENTIAL OF NEGATIVE ELECTRODE CHARGE MEDIATOR | 0.014 | 0.014 | 0.014 | 0.014 | 0.014 | 0.014 |
| POTENTIAL OF NEGATIVE ELECTRODE DISCHARGE MEDIATOR | 1.78 | 1.22 | 2.5 | 0.54 | 0.58 | 1.29 |
| CHARGE VOLTAGE OF FLOW BATTERY | 3.686 | 3.686 | 3.686 | 3.686 | 3.686 | 3.686 |
| DISCHARGE VOLTAGE OF FLOW BATTERY | 1.62 | 2.18 | 0.9 | 2.86 | 2.82 | 2.11 |
| THEORETICAL CAPACITY DENSITY OF FLOW BATTERY | 465 | 465 | 465 | 465 | 465 | 465 |
| THEORETICAL ENERGY DENSITY OF FLOW BATTERY | 753.3 | 1013.7 | 418.5 | 1329.9 | 1311.3 | 981.15 |
| VOLUME FILLING FACTOR OF POWER GENERATION ELEMENT | 0.6 | 0.6 | 0.6 | 0.6 | 0.6 | 0.6 |
| ENERGY DENSITY OF FLOW BATTERY | 451.98 | 608.22 | 251.1 | 797.94 | 786.78 | 588.69 |

FIG. 19D

NEGATIVE ELECTRODE CHARGE MEDIATOR USED: trans-STILBENE (NEGATIVE ELECTRODE ACTIVE MATERIAL: Sn)

| NEGATIVE ELECTRODE DISCHARGE MEDIATOR | 1,10-PHENANTHROLINE | 4,4'-BIPYRIDYL | 3,3'-BIPYRIDYL | 2,4'-BIPYRIDYL | 2,3'-BIPYRIDYL | ACETOPHENONE |
|---|---|---|---|---|---|---|
| POTENTIAL OF POSITIVE ELECTRODE CHARGE MEDIATOR (TTF+) | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 |
| POTENTIAL OF NEGATIVE ELECTRODE CHARGE MEDIATOR | 0.3 | 0.3 | 0.3 | 0.3 | 0.3 | 0.3 |
| POTENTIAL OF NEGATIVE ELECTRODE DISCHARGE MEDIATOR | 1.78 | 1.22 | 2.5 | 0.54 | 0.58 | 1.29 |
| CHARGE VOLTAGE OF FLOW BATTERY | 3.4 | 3.4 | 3.4 | 3.4 | 3.4 | 3.4 |
| DISCHARGE VOLTAGE OF FLOW BATTERY | 1.62 | 2.18 | 0.9 | 2.86 | 2.82 | 2.11 |
| THEORETICAL CAPACITY DENSITY OF FLOW BATTERY | 465 | 465 | 465 | 465 | 465 | 465 |
| THEORETICAL ENERGY DENSITY OF FLOW BATTERY | 753.3 | 1013.7 | 418.5 | 1329.9 | 1311.3 | 981.15 |
| VOLUME FILLING FACTOR OF POWER GENERATION ELEMENT | 0.6 | 0.6 | 0.6 | 0.6 | 0.6 | 0.6 |
| ENERGY DENSITY OF FLOW BATTERY | 451.98 | 608.22 | 251.1 | 797.94 | 786.78 | 588.69 |

FIG. 20A

NEGATIVE ELECTRODE CHARGE MEDIATOR USED: BUTYROPHENONE (NEGATIVE ELECTRODE ACTIVE MATERIAL: Sn)

| NEGATIVE ELECTRODE DISCHARGE MEDIATOR | 1,10-PHENANTHROLINE | 4,4'-BIPYRIDYL | 3,3'-BIPYRIDYL | 2,4'-BIPYRIDYL | 2,3'-BIPYRIDYL | ACETOPHENONE |
|---|---|---|---|---|---|---|
| POTENTIAL OF POSITIVE ELECTRODE CHARGE MEDIATOR (TTF+) | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 |
| POTENTIAL OF NEGATIVE ELECTRODE CHARGE MEDIATOR | 0.3 | 0.3 | 0.3 | 0.3 | 0.3 | 0.3 |
| POTENTIAL OF NEGATIVE ELECTRODE DISCHARGE MEDIATOR | 1.78 | 1.22 | 2.5 | 0.54 | 0.58 | 1.29 |
| CHARGE VOLTAGE OF FLOW BATTERY | 3.4 | 3.4 | 3.4 | 3.4 | 3.4 | 3.4 |
| DISCHARGE VOLTAGE OF FLOW BATTERY | 1.62 | 2.18 | 0.9 | 2.86 | 2.82 | 2.11 |
| THEORETICAL CAPACITY DENSITY OF FLOW BATTERY | 465 | 465 | 465 | 465 | 465 | 465 |
| THEORETICAL ENERGY DENSITY OF FLOW BATTERY | 753.3 | 1013.7 | 418.5 | 1329.9 | 1311.3 | 981.15 |
| VOLUME FILLING FACTOR OF POWER GENERATION ELEMENT | 0.6 | 0.6 | 0.6 | 0.6 | 0.6 | 0.6 |
| ENERGY DENSITY OF FLOW BATTERY | 451.98 | 608.22 | 251.1 | 797.94 | 786.78 | 588.69 |

FIG. 20B

NEGATIVE ELECTRODE CHARGE MEDIATOR USED: VALEROPHENONE
(NEGATIVE ELECTRODE ACTIVE MATERIAL: Sn)

| NEGATIVE ELECTRODE DISCHARGE MEDIATOR | 1,10-PHENANTHROLINE | 4,4'-BIPYRIDYL | 3,3'-BIPYRIDYL | 2,4'-BIPYRIDYL | 2,3'-BIPYRIDYL | ACETOPHENONE |
|---|---|---|---|---|---|---|
| POTENTIAL OF POSITIVE ELECTRODE CHARGE MEDIATOR (TTF+) | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 |
| POTENTIAL OF NEGATIVE ELECTRODE CHARGE MEDIATOR | 0.31 | 0.31 | 0.31 | 0.31 | 0.31 | 0.31 |
| POTENTIAL OF NEGATIVE ELECTRODE DISCHARGE MEDIATOR | 1.78 | 1.22 | 2.5 | 0.54 | 0.58 | 1.29 |
| CHARGE VOLTAGE OF FLOW BATTERY | 3.39 | 3.39 | 3.39 | 3.39 | 3.39 | 3.39 |
| DISCHARGE VOLTAGE OF FLOW BATTERY | 1.62 | 2.18 | 0.9 | 2.86 | 2.82 | 2.11 |
| THEORETICAL CAPACITY DENSITY OF FLOW BATTERY | 465 | 465 | 465 | 465 | 465 | 465 |
| THEORETICAL ENERGY DENSITY OF FLOW BATTERY | 753.3 | 1013.7 | 418.5 | 1329.9 | 1311.3 | 981.15 |
| VOLUME FILLING FACTOR OF POWER GENERATION ELEMENT | 0.6 | 0.6 | 0.6 | 0.6 | 0.6 | 0.6 |
| ENERGY DENSITY OF FLOW BATTERY | 451.98 | 608.22 | 251.1 | 797.94 | 786.78 | 588.69 |

FIG. 20C

NEGATIVE ELECTRODE CHARGE MEDIATOR USED: ETHYLENEDIAMINE (NEGATIVE ELECTRODE ACTIVE MATERIAL: Sn)

| NEGATIVE ELECTRODE DISCHARGE MEDIATOR | 1,10-PHENANTHROLINE | 4,4'-BIPYRIDYL | 3,3'-BIPYRIDYL | 2,4'-BIPYRIDYL | 2,3'-BIPYRIDYL | ACETOPHENONE |
|---|---|---|---|---|---|---|
| POTENTIAL OF POSITIVE ELECTRODE CHARGE MEDIATOR (TTF*) | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 |
| POTENTIAL OF NEGATIVE ELECTRODE CHARGE MEDIATOR | 0.36 | 0.36 | 0.36 | 0.36 | 0.36 | 0.36 |
| POTENTIAL OF NEGATIVE ELECTRODE DISCHARGE MEDIATOR | 1.78 | 1.22 | 2.5 | 0.54 | 0.58 | 1.29 |
| CHARGE VOLTAGE OF FLOW BATTERY | 3.34 | 3.34 | 3.34 | 3.34 | 3.34 | 3.34 |
| DISCHARGE VOLTAGE OF FLOW BATTERY | 1.62 | 2.18 | 0.9 | 2.86 | 2.82 | 2.11 |
| THEORETICAL CAPACITY DENSITY OF FLOW BATTERY | 465 | 465 | 465 | 465 | 465 | 465 |
| THEORETICAL ENERGY DENSITY OF FLOW BATTERY | 753.3 | 1013.7 | 418.5 | 1329.9 | 1311.3 | 981.15 |
| VOLUME FILLING FACTOR OF POWER GENERATION ELEMENT | 0.6 | 0.6 | 0.6 | 0.6 | 0.6 | 0.6 |
| ENERGY DENSITY OF FLOW BATTERY | 451.98 | 608.22 | 251.1 | 797.94 | 786.78 | 588.69 |

FIG. 20D

NEGATIVE ELECTRODE CHARGE MEDIATOR USED: BENZIL  (NEGATIVE ELECTRODE ACTIVE MATERIAL: Sn)

| NEGATIVE ELECTRODE DISCHARGE MEDIATOR | 1,10-PHENANTHROLINE | 4,4'-BIPYRIDYL | 3,3'-BIPYRIDYL | 2,4'-BIPYRIDYL | 2,3'-BIPYRIDYL | ACETOPHENONE |
|---|---|---|---|---|---|---|
| POTENTIAL OF POSITIVE ELECTRODE CHARGE MEDIATOR (TTF+) | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 |
| POTENTIAL OF NEGATIVE ELECTRODE CHARGE MEDIATOR | 0.16 | 0.16 | 0.16 | 0.16 | 0.16 | 0.16 |
| POTENTIAL OF NEGATIVE ELECTRODE DISCHARGE MEDIATOR | 1.78 | 1.22 | 2.5 | 0.54 | 0.58 | 1.29 |
| CHARGE VOLTAGE OF FLOW BATTERY | 3.54 | 3.54 | 3.54 | 3.54 | 3.54 | 3.54 |
| DISCHARGE VOLTAGE OF FLOW BATTERY | 1.62 | 2.18 | 0.9 | 2.86 | 2.82 | 2.11 |
| THEORETICAL CAPACITY DENSITY OF FLOW BATTERY | 465 | 465 | 465 | 465 | 465 | 465 |
| THEORETICAL ENERGY DENSITY OF FLOW BATTERY | 753.3 | 1013.7 | 418.5 | 1329.9 | 1311.3 | 981.15 |
| VOLUME FILLING FACTOR OF POWER GENERATION ELEMENT | 0.6 | 0.6 | 0.6 | 0.6 | 0.6 | 0.6 |
| ENERGY DENSITY OF FLOW BATTERY | 451.98 | 608.22 | 251.1 | 797.94 | 786.78 | 588.69 |

FIG. 21A

NEGATIVE ELECTRODE CHARGE MEDIATOR USED: TETRAPHENYLCYCLOPENTADIENONE  (NEGATIVE ELECTRODE ACTIVE MATERIAL: Sn)

| NEGATIVE ELECTRODE DISCHARGE MEDIATOR | 1,10-PHENANTHROLINE | 4,4'-BIPYRIDYL | 3,3'-BIPYRIDYL | 2,4'-BIPYRIDYL | 2,3'-BIPYRIDYL | ACETOPHENONE |
|---|---|---|---|---|---|---|
| POTENTIAL OF POSITIVE ELECTRODE CHARGE MEDIATOR (TTF) | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 |
| POTENTIAL OF NEGATIVE ELECTRODE CHARGE MEDIATOR | 0.34 | 0.34 | 0.34 | 0.34 | 0.34 | 0.34 |
| POTENTIAL OF NEGATIVE ELECTRODE DISCHARGE MEDIATOR | 1.78 | 1.22 | 2.5 | 0.54 | 0.58 | 1.29 |
| CHARGE VOLTAGE OF FLOW BATTERY | 3.36 | 3.36 | 3.36 | 3.36 | 3.36 | 3.36 |
| DISCHARGE VOLTAGE OF FLOW BATTERY | 1.62 | 2.18 | 0.9 | 2.86 | 2.82 | 2.11 |
| THEORETICAL CAPACITY DENSITY OF FLOW BATTERY | 465 | 465 | 465 | 465 | 465 | 465 |
| THEORETICAL ENERGY DENSITY OF FLOW BATTERY | 753.3 | 1013.7 | 418.5 | 1329.9 | 1311.3 | 981.15 |
| VOLUME FILLING FACTOR OF POWER GENERATION ELEMENT | 0.6 | 0.6 | 0.6 | 0.6 | 0.6 | 0.6 |
| ENERGY DENSITY OF FLOW BATTERY | 451.98 | 608.22 | 251.1 | 797.94 | 786.78 | 588.69 |

FIG. 21B

NEGATIVE ELECTRODE CHARGE MEDIATOR USED: 2,2'-BIPYRIDYL        (NEGATIVE ELECTRODE ACTIVE MATERIAL: Sn)

| NEGATIVE ELECTRODE DISCHARGE MEDIATOR | 1,10-PHENANTHROLINE | 4,4'-BIPYRIDYL | 3,3'-BIPYRIDYL | 2,4'-BIPYRIDYL | 2,3'-BIPYRIDYL | ACETOPHENONE |
|---|---|---|---|---|---|---|
| POTENTIAL OF POSITIVE ELECTRODE CHARGE MEDIATOR (TTF) | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 |
| POTENTIAL OF NEGATIVE ELECTRODE CHARGE MEDIATOR | 0.4 | 0.4 | 0.4 | 0.4 | 0.4 | 0.4 |
| POTENTIAL OF NEGATIVE ELECTRODE DISCHARGE MEDIATOR | 1.78 | 1.22 | 2.5 | 0.54 | 0.58 | 1.29 |
| CHARGE VOLTAGE OF FLOW BATTERY | 3.3 | 3.3 | 3.3 | 3.3 | 3.3 | 3.3 |
| DISCHARGE VOLTAGE OF FLOW BATTERY | 1.62 | 2.18 | 0.9 | 2.86 | 2.82 | 2.11 |
| THEORETICAL CAPACITY DENSITY OF FLOW BATTERY | 465 | 465 | 465 | 465 | 465 | 465 |
| THEORETICAL ENERGY DENSITY OF FLOW BATTERY | 753.3 | 1013.7 | 418.5 | 1329.9 | 1311.3 | 981.15 |
| VOLUME FILLING FACTOR OF POWER GENERATION ELEMENT | 0.6 | 0.6 | 0.6 | 0.6 | 0.6 | 0.6 |
| ENERGY DENSITY OF FLOW BATTERY | 451.98 | 608.22 | 251.1 | 797.94 | 786.78 | 588.69 |

FIG. 21C

NEGATIVE ELECTRODE CHARGE MEDIATOR USED: cis-STILBENE    (NEGATIVE ELECTRODE ACTIVE MATERIAL: Sn)

| NEGATIVE ELECTRODE DISCHARGE MEDIATOR | 1,10-PHENANTHROLINE | 4,4'-BIPYRIDYL | 3,3'-BIPYRIDYL | 2,4'-BIPYRIDYL | 2,3'-BIPYRIDYL | ACETOPHENONE |
|---|---|---|---|---|---|---|
| POTENTIAL OF POSITIVE ELECTRODE CHARGE MEDIATOR (TTF) | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 |
| POTENTIAL OF NEGATIVE ELECTRODE CHARGE MEDIATOR | 0.43 | 0.43 | 0.43 | 0.43 | 0.43 | 0.43 |
| POTENTIAL OF NEGATIVE ELECTRODE DISCHARGE MEDIATOR | 1.78 | 1.22 | 2.5 | 0.54 | 0.58 | 1.29 |
| CHARGE VOLTAGE OF FLOW BATTERY | 3.27 | 3.27 | 3.27 | 3.27 | 3.27 | 3.27 |
| DISCHARGE VOLTAGE OF FLOW BATTERY | 1.62 | 2.18 | 0.9 | 2.86 | 2.82 | 2.11 |
| THEORETICAL CAPACITY DENSITY OF FLOW BATTERY | 465 | 465 | 465 | 465 | 465 | 465 |
| THEORETICAL ENERGY DENSITY OF FLOW BATTERY | 753.3 | 1013.7 | 418.5 | 1329.9 | 1311.3 | 981.15 |
| VOLUME FILLING FACTOR OF POWER GENERATION ELEMENT | 0.6 | 0.6 | 0.6 | 0.6 | 0.6 | 0.6 |
| ENERGY DENSITY OF FLOW BATTERY | 451.98 | 608.22 | 251.1 | 797.94 | 786.78 | 588.69 |

FIG. 21D

NEGATIVE ELECTRODE CHARGE MEDIATOR USED: PROPIOPHENONE (NEGATIVE ELECTRODE ACTIVE MATERIAL: Sn)

| NEGATIVE ELECTRODE DISCHARGE MEDIATOR | 1,10-PHENANTHROLINE | 4,4'-BIPYRIDYL | 3,3'-BIPYRIDYL | 2,4'-BIPYRIDYL | 2,3'-BIPYRIDYL | ACETOPHENONE |
|---|---|---|---|---|---|---|
| POTENTIAL OF POSITIVE ELECTRODE CHARGE MEDIATOR (TTF+) | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 |
| POTENTIAL OF NEGATIVE ELECTRODE CHARGE MEDIATOR | 0.42 | 0.42 | 0.42 | 0.42 | 0.42 | 0.42 |
| POTENTIAL OF NEGATIVE ELECTRODE DISCHARGE MEDIATOR | 1.78 | 1.22 | 2.5 | 0.54 | 0.58 | 1.29 |
| CHARGE VOLTAGE OF FLOW BATTERY | 3.28 | 3.28 | 3.28 | 3.28 | 3.28 | 3.28 |
| DISCHARGE VOLTAGE OF FLOW BATTERY | 1.62 | 2.18 | 0.9 | 2.86 | 2.82 | 2.11 |
| THEORETICAL CAPACITY DENSITY OF FLOW BATTERY | 465 | 465 | 465 | 465 | 465 | 465 |
| THEORETICAL ENERGY DENSITY OF FLOW BATTERY | 753.3 | 1013.7 | 418.5 | 1329.9 | 1311.3 | 981.15 |
| VOLUME FILLING FACTOR OF POWER GENERATION ELEMENT | 0.6 | 0.6 | 0.6 | 0.6 | 0.6 | 0.6 |
| ENERGY DENSITY OF FLOW BATTERY | 451.98 | 608.22 | 251.1 | 797.94 | 786.78 | 588.69 |

FIG. 22A

NEGATIVE ELECTRODE CHARGE MEDIATOR USED: PHENANTHRENE (NEGATIVE ELECTRODE ACTIVE MATERIAL: C6)

| NEGATIVE ELECTRODE DISCHARGE MEDIATOR | 1,10-PHENANTHROLINE | 4,4'-BIPYRIDYL | 3,3'-BIPYRIDYL | 2,4'-BIPYRIDYL | 2,3'-BIPYRIDYL | ACETOPHENONE |
|---|---|---|---|---|---|---|
| POTENTIAL OF POSITIVE ELECTRODE CHARGE MEDIATOR (TTF) | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 |
| POTENTIAL OF NEGATIVE ELECTRODE CHARGE MEDIATOR | 0.03 | 0.03 | 0.03 | 0.03 | 0.03 | 0.03 |
| POTENTIAL OF NEGATIVE ELECTRODE DISCHARGE MEDIATOR | 1.78 | 1.22 | 2.5 | 0.54 | 0.58 | 1.29 |
| CHARGE VOLTAGE OF FLOW BATTERY | 3.67 | 3.67 | 3.67 | 3.67 | 3.67 | 3.67 |
| DISCHARGE VOLTAGE OF FLOW BATTERY | 1.62 | 2.18 | 0.9 | 2.86 | 2.82 | 2.11 |
| THEORETICAL CAPACITY DENSITY OF FLOW BATTERY | 456 | 456 | 456 | 456 | 456 | 456 |
| THEORETICAL ENERGY DENSITY OF FLOW BATTERY | 738.72 | 994.08 | 410.4 | 1304.16 | 1285.92 | 962.16 |
| VOLUME FILLING FACTOR OF POWER GENERATION ELEMENT | 0.6 | 0.6 | 0.6 | 0.6 | 0.6 | 0.6 |
| ENERGY DENSITY OF FLOW BATTERY | 443.232 | 596.448 | 246.24 | 782.496 | 771.552 | 577.296 |

FIG. 22B

NEGATIVE ELECTRODE CHARGE MEDIATOR USED: BIPHENYL        (NEGATIVE ELECTRODE ACTIVE MATERIAL: Ge)

| NEGATIVE ELECTRODE DISCHARGE MEDIATOR | 1,10-PHENANTHROLINE | 4,4'-BIPYRIDYL | 3,3'-BIPYRIDYL | 2,4'-BIPYRIDYL | 2,3'-BIPYRIDYL | ACETOPHENONE |
|---|---|---|---|---|---|---|
| POTENTIAL OF POSITIVE ELECTRODE CHARGE MEDIATOR (TTF+) | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 |
| POTENTIAL OF NEGATIVE ELECTRODE CHARGE MEDIATOR | 0 | 0 | 0 | 0 | 0 | 0 |
| POTENTIAL OF NEGATIVE ELECTRODE DISCHARGE MEDIATOR | 1.78 | 1.22 | 2.5 | 0.54 | 0.58 | 1.29 |
| CHARGE VOLTAGE OF FLOW BATTERY | 3.7 | 3.7 | 3.7 | 3.7 | 3.7 | 3.7 |
| DISCHARGE VOLTAGE OF FLOW BATTERY | 1.62 | 2.18 | 0.9 | 2.86 | 2.82 | 2.11 |
| THEORETICAL CAPACITY DENSITY OF FLOW BATTERY | 456 | 456 | 456 | 456 | 456 | 456 |
| THEORETICAL ENERGY DENSITY OF FLOW BATTERY | 738.72 | 994.08 | 410.4 | 1304.16 | 1285.92 | 962.16 |
| VOLUME FILLING FACTOR OF POWER GENERATION ELEMENT | 0.6 | 0.6 | 0.6 | 0.6 | 0.6 | 0.6 |
| ENERGY DENSITY OF FLOW BATTERY | 443.232 | 596.448 | 246.24 | 782.496 | 771.552 | 577.296 |

FIG. 22C

NEGATIVE ELECTRODE CHARGE MEDIATOR USED: TRIPHENYLENE　　　　　　　　　　　　　　　　　(NEGATIVE ELECTRODE ACTIVE MATERIAL: Ge)

| NEGATIVE ELECTRODE DISCHARGE MEDIATOR | 1,10-PHENANTHROLINE | 4,4'-BIPYRIDYL | 3,3'-BIPYRIDYL | 2,4'-BIPYRIDYL | 2,3'-BIPYRIDYL | ACETOPHENONE |
|---|---|---|---|---|---|---|
| POTENTIAL OF POSITIVE ELECTRODE CHARGE MEDIATOR (TTF1) | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 |
| POTENTIAL OF NEGATIVE ELECTRODE CHARGE MEDIATOR | 0.01 | 0.01 | 0.01 | 0.01 | 0.01 | 0.01 |
| POTENTIAL OF NEGATIVE ELECTRODE DISCHARGE MEDIATOR | 1.78 | 1.22 | 2.5 | 0.54 | 0.58 | 1.29 |
| CHARGE VOLTAGE OF FLOW BATTERY | 3.69 | 3.69 | 3.69 | 3.69 | 3.69 | 3.69 |
| DISCHARGE VOLTAGE OF FLOW BATTERY | 1.62 | 2.18 | 0.9 | 2.86 | 2.82 | 2.11 |
| THEORETICAL CAPACITY DENSITY OF FLOW BATTERY | 456 | 456 | 456 | 456 | 456 | 456 |
| THEORETICAL ENERGY DENSITY OF FLOW BATTERY | 738.72 | 994.08 | 410.4 | 1304.16 | 1285.92 | 962.16 |
| VOLUME FILLING FACTOR OF POWER GENERATION ELEMENT | 0.6 | 0.6 | 0.6 | 0.6 | 0.6 | 0.6 |
| ENERGY DENSITY OF FLOW BATTERY | 443.232 | 596.448 | 246.24 | 782.496 | 771.552 | 577.296 |

FIG. 22D

NEGATIVE ELECTRODE CHARGE MEDIATOR USED: o-TERPHENYL (NEGATIVE ELECTRODE ACTIVE MATERIAL: Ge)

| NEGATIVE ELECTRODE DISCHARGE MEDIATOR | 1,10-PHENANTHROLINE | 4,4'-BIPYRIDYL | 3,3'-BIPYRIDYL | 2,4'-BIPYRIDYL | 2,3'-BIPYRIDYL | ACETOPHENONE |
|---|---|---|---|---|---|---|
| POTENTIAL OF POSITIVE ELECTRODE CHARGE MEDIATOR (TTF⁺) | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 |
| POTENTIAL OF NEGATIVE ELECTRODE CHARGE MEDIATOR | 0.15 | 0.15 | 0.15 | 0.15 | 0.15 | 0.15 |
| POTENTIAL OF NEGATIVE ELECTRODE DISCHARGE MEDIATOR | 1.78 | 1.22 | 2.5 | 0.54 | 0.58 | 1.29 |
| CHARGE VOLTAGE OF FLOW BATTERY | 3.55 | 3.55 | 3.55 | 3.55 | 3.55 | 3.55 |
| DISCHARGE VOLTAGE OF FLOW BATTERY | 1.62 | 2.18 | 0.9 | 2.86 | 2.82 | 2.11 |
| THEORETICAL CAPACITY DENSITY OF FLOW BATTERY | 456 | 456 | 456 | 456 | 456 | 456 |
| THEORETICAL ENERGY DENSITY OF FLOW BATTERY | 738.72 | 994.08 | 410.4 | 1304.16 | 1285.92 | 962.16 |
| VOLUME FILLING FACTOR OF POWER GENERATION ELEMENT | 0.6 | 0.6 | 0.6 | 0.6 | 0.6 | 0.6 |
| ENERGY DENSITY OF FLOW BATTERY | 443.232 | 596.448 | 246.24 | 782.496 | 771.552 | 577.296 |

FIG. 23A (NEGATIVE ELECTRODE ACTIVE MATERIAL: Ge)

NEGATIVE ELECTRODE CHARGE MEDIATOR USED: ACENAPHTHENE

| NEGATIVE ELECTRODE DISCHARGE MEDIATOR | 1,10-PHENANTHROLINE | 4,4'-BIPYRIDYL | 3,3'-BIPYRIDYL | 2,4'-BIPYRIDYL | 2,3'-BIPYRIDYL | ACETOPHENONE |
|---|---|---|---|---|---|---|
| POTENTIAL OF POSITIVE ELECTRODE CHARGE MEDIATOR (TTF+) | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 |
| POTENTIAL OF NEGATIVE ELECTRODE CHARGE MEDIATOR | 0.016 | 0.016 | 0.016 | 0.016 | 0.016 | 0.016 |
| POTENTIAL OF NEGATIVE ELECTRODE DISCHARGE MEDIATOR | 1.78 | 1.22 | 2.5 | 0.54 | 0.58 | 1.29 |
| CHARGE VOLTAGE OF FLOW BATTERY | 3.684 | 3.684 | 3.684 | 3.684 | 3.684 | 3.684 |
| DISCHARGE VOLTAGE OF FLOW BATTERY | 1.62 | 2.18 | 0.9 | 2.86 | 2.82 | 2.11 |
| THEORETICAL CAPACITY DENSITY OF FLOW BATTERY | 456 | 456 | 456 | 456 | 456 | 456 |
| THEORETICAL ENERGY DENSITY OF FLOW BATTERY | 738.72 | 994.08 | 410.4 | 1304.16 | 1285.92 | 962.16 |
| VOLUME FILLING FACTOR OF POWER GENERATION ELEMENT | 0.6 | 0.6 | 0.6 | 0.6 | 0.6 | 0.6 |
| ENERGY DENSITY OF FLOW BATTERY | 443.232 | 596.448 | 246.24 | 782.496 | 771.552 | 577.296 |

FIG. 23B

NEGATIVE ELECTRODE CHARGE MEDIATOR USED: ACENAPHTHYLENE      (NEGATIVE ELECTRODE ACTIVE MATERIAL: Ge)

| NEGATIVE ELECTRODE DISCHARGE MEDIATOR | 1,10-PHENANTHROLINE | 4,4'-BIPYRIDYL | 3,3'-BIPYRIDYL | 2,4'-BIPYRIDYL | 2,3'-BIPYRIDYL | ACETOPHENONE |
|---|---|---|---|---|---|---|
| POTENTIAL OF POSITIVE ELECTRODE CHARGE MEDIATOR (TTF1) | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 |
| POTENTIAL OF NEGATIVE ELECTRODE CHARGE MEDIATOR | 0.014 | 0.014 | 0.014 | 0.014 | 0.014 | 0.014 |
| POTENTIAL OF NEGATIVE ELECTRODE DISCHARGE MEDIATOR | 1.78 | 1.22 | 2.5 | 0.54 | 0.58 | 1.29 |
| CHARGE VOLTAGE OF FLOW BATTERY | 3.686 | 3.686 | 3.686 | 3.686 | 3.686 | 3.686 |
| DISCHARGE VOLTAGE OF FLOW BATTERY | 1.62 | 2.18 | 0.9 | 2.86 | 2.82 | 2.11 |
| THEORETICAL CAPACITY DENSITY OF FLOW BATTERY | 456 | 456 | 456 | 456 | 456 | 456 |
| THEORETICAL ENERGY DENSITY OF FLOW BATTERY | 738.72 | 994.08 | 410.4 | 1304.16 | 1285.92 | 962.16 |
| VOLUME FILLING FACTOR OF POWER GENERATION ELEMENT | 0.6 | 0.6 | 0.6 | 0.6 | 0.6 | 0.6 |
| ENERGY DENSITY OF FLOW BATTERY | 443.232 | 596.448 | 246.24 | 782.496 | 771.552 | 577.296 |

FIG. 23C

NEGATIVE ELECTRODE CHARGE MEDIATOR USED: FLUORANTHENE (NEGATIVE ELECTRODE ACTIVE MATERIAL: Ge)

| NEGATIVE ELECTRODE DISCHARGE MEDIATOR | 1,10-PHENANTHROLINE | 4,4'-BIPYRIDYL | 3,3'-BIPYRIDYL | 2,4'-BIPYRIDYL | 2,3'-BIPYRIDYL | ACETOPHENONE |
|---|---|---|---|---|---|---|
| POTENTIAL OF POSITIVE ELECTRODE CHARGE MEDIATOR (TTF1) | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 |
| POTENTIAL OF NEGATIVE ELECTRODE CHARGE MEDIATOR | 0.014 | 0.014 | 0.014 | 0.014 | 0.014 | 0.014 |
| POTENTIAL OF NEGATIVE ELECTRODE DISCHARGE MEDIATOR | 1.78 | 1.22 | 2.5 | 0.54 | 0.58 | 1.29 |
| CHARGE VOLTAGE OF FLOW BATTERY | 3.686 | 3.686 | 3.686 | 3.686 | 3.686 | 3.686 |
| DISCHARGE VOLTAGE OF FLOW BATTERY | 1.62 | 2.18 | 0.9 | 2.86 | 2.82 | 2.11 |
| THEORETICAL CAPACITY DENSITY OF FLOW BATTERY | 456 | 456 | 456 | 456 | 456 | 456 |
| THEORETICAL ENERGY DENSITY OF FLOW BATTERY | 738.72 | 994.08 | 410.4 | 1304.16 | 1285.92 | 962.16 |
| VOLUME FILLING FACTOR OF POWER GENERATION ELEMENT | 0.6 | 0.6 | 0.6 | 0.6 | 0.6 | 0.6 |
| ENERGY DENSITY OF FLOW BATTERY | 443.232 | 596.448 | 246.24 | 782.496 | 771.552 | 577.296 |

FIG. 23D

NEGATIVE ELECTRODE CHARGE MEDIATOR USED: trans-STILBENE                                                     (NEGATIVE ELECTRODE ACTIVE MATERIAL: Ge)

| NEGATIVE ELECTRODE DISCHARGE MEDIATOR | 1,10-PHENANTHROLINE | 4,4'-BIPYRIDYL | 3,3'-BIPYRIDYL | 2,4'-BIPYRIDYL | 2,3'-BIPYRIDYL | ACETOPHENONE |
|---|---|---|---|---|---|---|
| POTENTIAL OF POSITIVE ELECTRODE CHARGE MEDIATOR (TTF) | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 |
| POTENTIAL OF NEGATIVE ELECTRODE CHARGE MEDIATOR | 0.3 | 0.3 | 0.3 | 0.3 | 0.3 | 0.3 |
| POTENTIAL OF NEGATIVE ELECTRODE DISCHARGE MEDIATOR | 1.78 | 1.22 | 2.5 | 0.54 | 0.58 | 1.29 |
| CHARGE VOLTAGE OF FLOW BATTERY | 3.4 | 3.4 | 3.4 | 3.4 | 3.4 | 3.4 |
| DISCHARGE VOLTAGE OF FLOW BATTERY | 1.62 | 2.18 | 0.9 | 2.86 | 2.82 | 2.11 |
| THEORETICAL CAPACITY DENSITY OF FLOW BATTERY | 456 | 456 | 456 | 456 | 456 | 456 |
| THEORETICAL ENERGY DENSITY OF FLOW BATTERY | 738.72 | 994.08 | 410.4 | 1304.16 | 1285.92 | 962.16 |
| VOLUME FILLING FACTOR OF POWER GENERATION ELEMENT | 0.6 | 0.6 | 0.6 | 0.6 | 0.6 | 0.6 |
| ENERGY DENSITY OF FLOW BATTERY | 443.232 | 596.448 | 246.24 | 782.496 | 771.552 | 577.296 |

FIG. 24A

NEGATIVE ELECTRODE CHARGE MEDIATOR USED: BUTYROPHENONE  
(NEGATIVE ELECTRODE ACTIVE MATERIAL: Ge)

| NEGATIVE ELECTRODE DISCHARGE MEDIATOR | 1,10-PHENANTHROLINE | 4,4'-BIPYRIDYL | 3,3'-BIPYRIDYL | 2,4'-BIPYRIDYL | 2,3'-BIPYRIDYL | ACETOPHENONE |
|---|---|---|---|---|---|---|
| POTENTIAL OF POSITIVE ELECTRODE CHARGE MEDIATOR (TTF⁺) | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 |
| POTENTIAL OF NEGATIVE ELECTRODE CHARGE MEDIATOR | 0.3 | 0.3 | 0.3 | 0.3 | 0.3 | 0.3 |
| POTENTIAL OF NEGATIVE ELECTRODE DISCHARGE MEDIATOR | 1.78 | 1.22 | 2.5 | 0.54 | 0.58 | 1.29 |
| CHARGE VOLTAGE OF FLOW BATTERY | 3.4 | 3.4 | 3.4 | 3.4 | 3.4 | 3.4 |
| DISCHARGE VOLTAGE OF FLOW BATTERY | 1.62 | 2.18 | 0.9 | 2.86 | 2.82 | 2.11 |
| THEORETICAL CAPACITY DENSITY OF FLOW BATTERY | 456 | 456 | 456 | 456 | 456 | 456 |
| THEORETICAL ENERGY DENSITY OF FLOW BATTERY | 738.72 | 994.08 | 410.4 | 1304.16 | 1285.92 | 962.16 |
| VOLUME FILLING FACTOR OF POWER GENERATION ELEMENT | 0.6 | 0.6 | 0.6 | 0.6 | 0.6 | 0.6 |
| ENERGY DENSITY OF FLOW BATTERY | 443.232 | 596.448 | 246.24 | 782.496 | 771.552 | 577.296 |

FIG. 24B

NEGATIVE ELECTRODE CHARGE MEDIATOR USED: VALEROPHENONE (NEGATIVE ELECTRODE ACTIVE MATERIAL: Ge)

| NEGATIVE ELECTRODE DISCHARGE MEDIATOR | 1,10-PHENANTHROLINE | 4,4'-BIPYRIDYL | 3,3'-BIPYRIDYL | 2,4'-BIPYRIDYL | 2,3'-BIPYRIDYL | ACETOPHENONE |
|---|---|---|---|---|---|---|
| POTENTIAL OF POSITIVE ELECTRODE CHARGE MEDIATOR (TTF+) | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 |
| POTENTIAL OF NEGATIVE ELECTRODE CHARGE MEDIATOR | 0.31 | 0.31 | 0.31 | 0.31 | 0.31 | 0.31 |
| POTENTIAL OF NEGATIVE ELECTRODE DISCHARGE MEDIATOR | 1.78 | 1.22 | 2.5 | 0.54 | 0.58 | 1.29 |
| CHARGE VOLTAGE OF FLOW BATTERY | 3.39 | 3.39 | 3.39 | 3.39 | 3.39 | 3.39 |
| DISCHARGE VOLTAGE OF FLOW BATTERY | 1.62 | 2.18 | 0.9 | 2.86 | 2.82 | 2.11 |
| THEORETICAL CAPACITY DENSITY OF FLOW BATTERY | 456 | 456 | 456 | 456 | 456 | 456 |
| THEORETICAL ENERGY DENSITY OF FLOW BATTERY | 738.72 | 994.08 | 410.4 | 1304.16 | 1285.92 | 962.16 |
| VOLUME FILLING FACTOR OF POWER GENERATION ELEMENT | 0.6 | 0.6 | 0.6 | 0.6 | 0.6 | 0.6 |
| ENERGY DENSITY OF FLOW BATTERY | 443.232 | 596.448 | 246.24 | 782.496 | 771.552 | 577.296 |

FIG. 24C

NEGATIVE ELECTRODE CHARGE MEDIATOR USED: ETHYLENEDIAMINE (NEGATIVE ELECTRODE ACTIVE MATERIAL: Ge)

| NEGATIVE ELECTRODE DISCHARGE MEDIATOR | 1,10-PHENANTHROLINE | 4,4'-BIPYRIDYL | 3,3'-BIPYRIDYL | 2,4'-BIPYRIDYL | 2,3'-BIPYRIDYL | ACETOPHENONE |
|---|---|---|---|---|---|---|
| POTENTIAL OF POSITIVE ELECTRODE CHARGE MEDIATOR (TTF+) | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 |
| POTENTIAL OF NEGATIVE ELECTRODE CHARGE MEDIATOR | 0.36 | 0.36 | 0.36 | 0.36 | 0.36 | 0.36 |
| POTENTIAL OF NEGATIVE ELECTRODE DISCHARGE MEDIATOR | 1.78 | 1.22 | 2.5 | 0.54 | 0.58 | 1.29 |
| CHARGE VOLTAGE OF FLOW BATTERY | 3.34 | 3.34 | 3.34 | 3.34 | 3.34 | 3.34 |
| DISCHARGE VOLTAGE OF FLOW BATTERY | 1.62 | 2.18 | 0.9 | 2.86 | 2.82 | 2.11 |
| THEORETICAL CAPACITY DENSITY OF FLOW BATTERY | 456 | 456 | 456 | 456 | 456 | 456 |
| THEORETICAL ENERGY DENSITY OF FLOW BATTERY | 738.72 | 994.08 | 410.4 | 1304.16 | 1285.92 | 962.16 |
| VOLUME FILLING FACTOR OF POWER GENERATION ELEMENT | 0.6 | 0.6 | 0.6 | 0.6 | 0.6 | 0.6 |
| ENERGY DENSITY OF FLOW BATTERY | 443.232 | 596.448 | 246.24 | 782.496 | 771.552 | 577.296 |

FIG. 24D

NEGATIVE ELECTRODE CHARGE MEDIATOR USED: BENZIL                                                            (NEGATIVE ELECTRODE ACTIVE MATERIAL: Ge)

| NEGATIVE ELECTRODE DISCHARGE MEDIATOR | 1,10-PHENANTHROLINE | 4,4'-BIPYRIDYL | 3,3'-BIPYRIDYL | 2,4'-BIPYRIDYL | 2,3'-BIPYRIDYL | ACETOPHENONE |
|---|---|---|---|---|---|---|
| POTENTIAL OF POSITIVE ELECTRODE CHARGE MEDIATOR (TTF+) | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 |
| POTENTIAL OF NEGATIVE ELECTRODE CHARGE MEDIATOR | 0.16 | 0.16 | 0.16 | 0.16 | 0.16 | 0.16 |
| POTENTIAL OF NEGATIVE ELECTRODE DISCHARGE MEDIATOR | 1.78 | 1.22 | 2.5 | 0.54 | 0.58 | 1.29 |
| CHARGE VOLTAGE OF FLOW BATTERY | 3.54 | 3.54 | 3.54 | 3.54 | 3.54 | 3.54 |
| DISCHARGE VOLTAGE OF FLOW BATTERY | 1.62 | 2.18 | 0.9 | 2.86 | 2.82 | 2.11 |
| THEORETICAL CAPACITY DENSITY OF FLOW BATTERY | 456 | 456 | 456 | 456 | 456 | 456 |
| THEORETICAL ENERGY DENSITY OF FLOW BATTERY | 738.72 | 994.08 | 410.4 | 1304.16 | 1285.92 | 962.16 |
| VOLUME FILLING FACTOR OF POWER GENERATION ELEMENT | 0.6 | 0.6 | 0.6 | 0.6 | 0.6 | 0.6 |
| ENERGY DENSITY OF FLOW BATTERY | 443.232 | 596.448 | 246.24 | 782.496 | 771.552 | 577.296 |

FIG. 25A

NEGATIVE ELECTRODE CHARGE MEDIATOR USED: TETRAPHENYLCYCLOPENTADIENONE  (NEGATIVE ELECTRODE ACTIVE MATERIAL: Ge)

| NEGATIVE ELECTRODE DISCHARGE MEDIATOR | 1,10-PHENANTHROLINE | 4,4'-BIPYRIDYL | 3,3'-BIPYRIDYL | 2,4'-BIPYRIDYL | 2,3'-BIPYRIDYL | ACETOPHENONE |
|---|---|---|---|---|---|---|
| POTENTIAL OF POSITIVE ELECTRODE CHARGE MEDIATOR (TTF) | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 |
| POTENTIAL OF NEGATIVE ELECTRODE CHARGE MEDIATOR | 0.34 | 0.34 | 0.34 | 0.34 | 0.34 | 0.34 |
| POTENTIAL OF NEGATIVE ELECTRODE DISCHARGE MEDIATOR | 1.78 | 1.22 | 2.5 | 0.54 | 0.58 | 1.29 |
| CHARGE VOLTAGE OF FLOW BATTERY | 3.36 | 3.36 | 3.36 | 3.36 | 3.36 | 3.36 |
| DISCHARGE VOLTAGE OF FLOW BATTERY | 1.62 | 2.18 | 0.9 | 2.86 | 2.82 | 2.11 |
| THEORETICAL CAPACITY DENSITY OF FLOW BATTERY | 456 | 456 | 456 | 456 | 456 | 456 |
| THEORETICAL ENERGY DENSITY OF FLOW BATTERY | 738.72 | 994.08 | 410.4 | 1304.16 | 1285.92 | 962.16 |
| VOLUME FILLING FACTOR OF POWER GENERATION ELEMENT | 0.6 | 0.6 | 0.6 | 0.6 | 0.6 | 0.6 |
| ENERGY DENSITY OF FLOW BATTERY | 443.232 | 596.448 | 246.24 | 782.496 | 771.552 | 577.296 |

FIG. 25B

NEGATIVE ELECTRODE CHARGE MEDIATOR USED: 2,2'-BIPYRIDYL                                                                                         (NEGATIVE ELECTRODE ACTIVE MATERIAL: Ge)

| NEGATIVE ELECTRODE DISCHARGE MEDIATOR | 1,10-PHENANTHROLINE | 4,4'-BIPYRIDYL | 3,3'-BIPYRIDYL | 2,4'-BIPYRIDYL | 2,3'-BIPYRIDYL | ACETOPHENONE |
|---|---|---|---|---|---|---|
| POTENTIAL OF POSITIVE ELECTRODE CHARGE MEDIATOR (TTF+) | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 |
| POTENTIAL OF NEGATIVE ELECTRODE CHARGE MEDIATOR | 0.4 | 0.4 | 0.4 | 0.4 | 0.4 | 0.4 |
| POTENTIAL OF NEGATIVE ELECTRODE DISCHARGE MEDIATOR | 1.78 | 1.22 | 2.5 | 0.54 | 0.58 | 1.29 |
| CHARGE VOLTAGE OF FLOW BATTERY | 3.3 | 3.3 | 3.3 | 3.3 | 3.3 | 3.3 |
| DISCHARGE VOLTAGE OF FLOW BATTERY | 1.62 | 2.18 | 0.9 | 2.86 | 2.82 | 2.11 |
| THEORETICAL CAPACITY DENSITY OF FLOW BATTERY | 424 | 424 | 424 | 424 | 424 | 424 |
| THEORETICAL ENERGY DENSITY OF FLOW BATTERY | 686.88 | 924.32 | 381.6 | 1212.64 | 1195.68 | 894.64 |
| VOLUME FILLING FACTOR OF POWER GENERATION ELEMENT | 0.6 | 0.6 | 0.6 | 0.6 | 0.6 | 0.6 |
| ENERGY DENSITY OF FLOW BATTERY | 412.128 | 554.592 | 228.96 | 727.584 | 717.408 | 536.784 |

FIG. 25C

NEGATIVE ELECTRODE CHARGE MEDIATOR USED: cis-STILBENE  (NEGATIVE ELECTRODE ACTIVE MATERIAL: Ge)

| NEGATIVE ELECTRODE DISCHARGE MEDIATOR | 1,10-PHENANTHROLINE | 4,4'-BIPYRIDYL | 3,3'-BIPYRIDYL | 2,4'-BIPYRIDYL | 2,3'-BIPYRIDYL | ACETOPHENONE |
|---|---|---|---|---|---|---|
| POTENTIAL OF POSITIVE ELECTRODE CHARGE MEDIATOR (TTF+) | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 |
| POTENTIAL OF NEGATIVE ELECTRODE CHARGE MEDIATOR | 0.43 | 0.43 | 0.43 | 0.43 | 0.43 | 0.43 |
| POTENTIAL OF NEGATIVE ELECTRODE DISCHARGE MEDIATOR | 1.78 | 1.22 | 2.5 | 0.54 | 0.58 | 1.29 |
| CHARGE VOLTAGE OF FLOW BATTERY | 3.27 | 3.27 | 3.27 | 3.27 | 3.27 | 3.27 |
| DISCHARGE VOLTAGE OF FLOW BATTERY | 1.62 | 2.18 | 0.9 | 2.86 | 2.82 | 2.11 |
| THEORETICAL CAPACITY DENSITY OF FLOW BATTERY | 424 | 424 | 424 | 424 | 424 | 424 |
| THEORETICAL ENERGY DENSITY OF FLOW BATTERY | 686.88 | 924.32 | 381.6 | 1212.64 | 1195.68 | 894.64 |
| VOLUME FILLING FACTOR OF POWER GENERATION ELEMENT | 0.6 | 0.6 | 0.6 | 0.6 | 0.6 | 0.6 |
| ENERGY DENSITY OF FLOW BATTERY | 412.128 | 554.592 | 228.96 | 727.584 | 717.408 | 536.784 |

FIG. 25D

NEGATIVE ELECTRODE CHARGE MEDIATOR USED: PROPIOPHENONE (NEGATIVE ELECTRODE ACTIVE MATERIAL: Ge)

| NEGATIVE ELECTRODE DISCHARGE MEDIATOR | 1,10-PHENANTHROLINE | 4,4'-BIPYRIDYL | 3,3'-BIPYRIDYL | 2,4'-BIPYRIDYL | 2,3'-BIPYRIDYL | ACETOPHENONE |
|---|---|---|---|---|---|---|
| POTENTIAL OF POSITIVE ELECTRODE CHARGE MEDIATOR (TTF+) | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 |
| POTENTIAL OF NEGATIVE ELECTRODE CHARGE MEDIATOR | 0.42 | 0.42 | 0.42 | 0.42 | 0.42 | 0.42 |
| POTENTIAL OF NEGATIVE ELECTRODE DISCHARGE MEDIATOR | 1.78 | 1.22 | 2.5 | 0.54 | 0.58 | 1.29 |
| CHARGE VOLTAGE OF FLOW BATTERY | 3.28 | 3.28 | 3.28 | 3.28 | 3.28 | 3.28 |
| DISCHARGE VOLTAGE OF FLOW BATTERY | 1.62 | 2.18 | 0.9 | 2.86 | 2.82 | 2.11 |
| THEORETICAL CAPACITY DENSITY OF FLOW BATTERY | 424 | 424 | 424 | 424 | 424 | 424 |
| THEORETICAL ENERGY DENSITY OF FLOW BATTERY | 686.88 | 924.32 | 381.6 | 1212.64 | 1195.68 | 894.64 |
| VOLUME FILLING FACTOR OF POWER GENERATION ELEMENT | 0.6 | 0.6 | 0.6 | 0.6 | 0.6 | 0.6 |
| ENERGY DENSITY OF FLOW BATTERY | 412.128 | 554.592 | 228.96 | 727.584 | 717.408 | 536.784 |

FIG. 26A

NEGATIVE ELECTRODE CHARGE MEDIATOR USED: PHENANTHRENE (NEGATIVE ELECTRODE ACTIVE MATERIAL: A)

| NEGATIVE ELECTRODE DISCHARGE MEDIATOR | 2,2'-BIPYRIDYL | 1,10-PHENANTHROLINE | 4,4'-BIPYRIDYL | 3,3'-BIPYRIDYL | 2,4'-BIPYRIDYL | 2,3'-BIPYRIDYL | cis-STILBENE | ACETOPHENONE | PROPIOPHENONE |
|---|---|---|---|---|---|---|---|---|---|
| POTENTIAL OF POSITIVE ELECTRODE CHARGE MEDIATOR (TTF+) | 3.7 | 3.7 | 3.7 | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 | 3.4 | 3.4 | 3.4 |
| POTENTIAL OF NEGATIVE ELECTRODE CHARGE MEDIATOR | 0.03 | 0.03 | 0.03 | 0.03 | 0.03 | 0.03 | 0.03 | 0.03 | 0.03 |
| POTENTIAL OF NEGATIVE ELECTRODE DISCHARGE MEDIATOR | 0.4 | 1.78 | 1.22 | 2.5 | 0.54 | 0.58 | 0.43 | 1.29 | 0.42 |
| CHARGE VOLTAGE OF FLOW BATTERY | 3.67 | 3.67 | 3.67 | 3.67 | 3.67 | 3.67 | 3.67 | 3.67 | 3.67 |
| DISCHARGE VOLTAGE OF FLOW BATTERY | 3 | 1.62 | 2.18 | 0.9 | 2.86 | 2.82 | 2.97 | 2.11 | 2.98 |
| THEORETICAL CAPACITY DENSITY OF FLOW BATTERY | 424 | 424 | 424 | 424 | 424 | 424 | 424 | 424 | 424 |
| THEORETICAL ENERGY DENSITY OF FLOW BATTERY | 1272 | 686.88 | 924.32 | 381.6 | 1212.64 | 1195.68 | 1259.28 | 894.64 | 1263.52 |
| VOLUME FILLING FACTOR OF POWER GENERATION ELEMENT | 0.6 | 0.6 | 0.6 | 0.6 | 0.6 | 0.6 | 0.6 | 0.6 | 0.6 |
| ENERGY DENSITY OF FLOW BATTERY | 763.2 | 412.128 | 554.592 | 228.96 | 727.584 | 717.408 | 755.568 | 536.784 | 758.112 |

FIG. 26B

NEGATIVE ELECTRODE CHARGE MEDIATOR USED: BIPHENYL (NEGATIVE ELECTRODE ACTIVE MATERIAL: Al)

| NEGATIVE ELECTRODE DISCHARGE MEDIATOR | 2,2'-BIPYRIDYL | 1,10-PHENANTHROLINE | 4,4'-BIPYRIDYL | 3,3'-BIPYRIDYL | 2,4'-BIPYRIDYL | 2,3'-BIPYRIDYL | cis-STILBENE | ACETOPHENONE | PROPIOPHENONE |
|---|---|---|---|---|---|---|---|---|---|
| POTENTIAL OF POSITIVE ELECTRODE CHARGE MEDIATOR (TTF) | 3.7 | 3.7 | 3.7 | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 | 3.4 | 3.4 | 3.4 |
| POTENTIAL OF NEGATIVE ELECTRODE CHARGE MEDIATOR | 0 | 0 | 0 | 0 | 0 | 0 | 0 | 0 | 0 |
| POTENTIAL OF NEGATIVE ELECTRODE DISCHARGE MEDIATOR | 0.4 | 1.78 | 1.22 | 2.5 | 0.54 | 0.58 | 0.43 | 1.29 | 0.42 |
| CHARGE VOLTAGE OF FLOW BATTERY | 3.7 | 3.7 | 3.7 | 3.7 | 3.7 | 3.7 | 3.7 | 3.7 | 3.7 |
| DISCHARGE VOLTAGE OF FLOW BATTERY | 3 | 1.62 | 2.18 | 0.9 | 2.86 | 2.82 | 2.97 | 2.11 | 2.98 |
| THEORETICAL CAPACITY DENSITY OF FLOW BATTERY | 424 | 424 | 424 | 424 | 424 | 424 | 424 | 424 | 424 |
| THEORETICAL ENERGY DENSITY OF FLOW BATTERY | 1272 | 686.88 | 924.32 | 381.6 | 1212.64 | 1195.68 | 1259.28 | 894.64 | 1263.52 |
| VOLUME FILLING FACTOR OF POWER GENERATION ELEMENT | 0.6 | 0.6 | 0.6 | 0.6 | 0.6 | 0.6 | 0.6 | 0.6 | 0.6 |
| ENERGY DENSITY OF FLOW BATTERY | 763.2 | 412.128 | 554.592 | 228.96 | 727.584 | 717.408 | 755.568 | 536.784 | 758.112 |

FIG. 26C

NEGATIVE ELECTRODE CHARGE MEDIATOR USED: TRIPHENYLENE  (NEGATIVE ELECTRODE ACTIVE MATERIAL: Al)

| NEGATIVE ELECTRODE DISCHARGE MEDIATOR | 2,2'-BIPYRIDYL | 1,10-PHENANTHROLINE | 4,4'-BIPYRIDYL | 3,3'-BIPYRIDYL | 2,4'-BIPYRIDYL | 2,3'-BIPYRIDYL | cis-STILBENE | ACETOPHENONE | PROPIOPHENONE |
|---|---|---|---|---|---|---|---|---|---|
| POTENTIAL OF POSITIVE ELECTRODE CHARGE MEDIATOR (TTF) | 3.7 | 3.7 | 3.7 | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 | 3.4 | 3.4 | 3.4 |
| POTENTIAL OF NEGATIVE ELECTRODE CHARGE MEDIATOR | 0.01 | 0.01 | 0.01 | 0.01 | 0.01 | 0.01 | 0.01 | 0.01 | 0.01 |
| POTENTIAL OF NEGATIVE ELECTRODE DISCHARGE MEDIATOR | 0.4 | 1.78 | 1.22 | 2.5 | 0.54 | 0.58 | 0.43 | 1.29 | 0.42 |
| CHARGE VOLTAGE OF FLOW BATTERY | 3.69 | 3.69 | 3.69 | 3.69 | 3.69 | 3.69 | 3.69 | 3.69 | 3.69 |
| DISCHARGE VOLTAGE OF FLOW BATTERY | 3 | 1.62 | 2.18 | 0.9 | 2.86 | 2.82 | 2.97 | 2.11 | 2.98 |
| THEORETICAL CAPACITY DENSITY OF FLOW BATTERY | 424 | 424 | 424 | 424 | 424 | 424 | 424 | 424 | 424 |
| THEORETICAL ENERGY DENSITY OF FLOW BATTERY | 1272 | 686.88 | 924.32 | 381.6 | 1212.64 | 1195.68 | 1259.28 | 894.64 | 1263.52 |
| VOLUME FILLING FACTOR OF POWER GENERATION ELEMENT | 0.6 | 0.6 | 0.6 | 0.6 | 0.6 | 0.6 | 0.6 | 0.6 | 0.6 |
| ENERGY DENSITY OF FLOW BATTERY | 763.2 | 412.128 | 554.592 | 228.96 | 727.584 | 717.408 | 755.568 | 536.784 | 758.112 |

FIG. 26D

NEGATIVE ELECTRODE CHARGE MEDIATOR USED: o-TERPHENYL (NEGATIVE ELECTRODE ACTIVE MATERIAL: Al)

| NEGATIVE ELECTRODE DISCHARGE MEDIATOR | 2,2'-BIPYRIDYL | 1,10-PHENANTHROLINE | 4,4'-BIPYRIDYL | 3,3'-BIPYRIDYL | 2,4'-BIPYRIDYL | 2,3'-BIPYRIDYL | cis-STILBENE | ACETOPHENONE | PROPIOPHENONE |
|---|---|---|---|---|---|---|---|---|---|
| POTENTIAL OF POSITIVE ELECTRODE CHARGE MEDIATOR (TTF) | 3.7 | 3.7 | 3.7 | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 | 3.4 | 3.4 | 3.4 |
| POTENTIAL OF NEGATIVE ELECTRODE CHARGE MEDIATOR | 0.15 | 0.15 | 0.15 | 0.15 | 0.15 | 0.15 | 0.15 | 0.15 | 0.15 |
| POTENTIAL OF NEGATIVE ELECTRODE DISCHARGE MEDIATOR | 0.4 | 1.78 | 1.22 | 2.5 | 0.54 | 0.58 | 0.43 | 1.29 | 0.42 |
| CHARGE VOLTAGE OF FLOW BATTERY | 3.55 | 3.55 | 3.55 | 3.55 | 3.55 | 3.55 | 3.55 | 3.55 | 3.55 |
| DISCHARGE VOLTAGE OF FLOW BATTERY | 3 | 1.62 | 2.18 | 0.9 | 2.86 | 2.82 | 2.97 | 2.11 | 2.98 |
| THEORETICAL CAPACITY DENSITY OF FLOW BATTERY | 424 | 424 | 424 | 424 | 424 | 424 | 424 | 424 | 424 |
| THEORETICAL ENERGY DENSITY OF FLOW BATTERY | 1272 | 686.88 | 924.32 | 381.6 | 1212.64 | 1195.68 | 1259.28 | 894.64 | 1263.52 |
| VOLUME FILLING FACTOR OF POWER GENERATION ELEMENT | 0.6 | 0.6 | 0.6 | 0.6 | 0.6 | 0.6 | 0.6 | 0.6 | 0.6 |
| ENERGY DENSITY OF FLOW BATTERY | 763.2 | 412.128 | 554.592 | 228.96 | 727.584 | 717.408 | 755.568 | 536.784 | 758.112 |

FIG. 27A

NEGATIVE ELECTRODE CHARGE MEDIATOR USED: ACENAPHTHENE (NEGATIVE ELECTRODE ACTIVE MATERIAL: Al)

| NEGATIVE ELECTRODE DISCHARGE MEDIATOR | 2,2'-BIPYRIDYL | 1,10-PHENANTHROLINE | 4,4'-BIPYRIDYL | 3,3'-BIPYRIDYL | 2,4'-BIPYRIDYL | 2,3'-BIPYRIDYL | cis-STILBENE | ACETOPHENONE | PROPIOPHENONE |
|---|---|---|---|---|---|---|---|---|---|
| POTENTIAL OF POSITIVE ELECTRODE CHARGE MEDIATOR (TTF) | 3.7 | 3.7 | 3.7 | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 | 3.4 | 3.4 | 3.4 |
| POTENTIAL OF NEGATIVE ELECTRODE CHARGE MEDIATOR | 0.016 | 0.016 | 0.016 | 0.016 | 0.016 | 0.016 | 0.016 | 0.016 | 0.016 |
| POTENTIAL OF NEGATIVE ELECTRODE DISCHARGE MEDIATOR | 0.4 | 1.78 | 1.22 | 2.5 | 0.54 | 0.58 | 0.43 | 1.29 | 0.42 |
| CHARGE VOLTAGE OF FLOW BATTERY | 3.684 | 3.684 | 3.684 | 3.684 | 3.684 | 3.684 | 3.684 | 3.684 | 3.684 |
| DISCHARGE VOLTAGE OF FLOW BATTERY | 3 | 1.62 | 2.18 | 0.9 | 2.86 | 2.82 | 2.97 | 2.11 | 2.98 |
| THEORETICAL CAPACITY DENSITY OF FLOW BATTERY | 424 | 424 | 424 | 424 | 424 | 424 | 424 | 424 | 424 |
| THEORETICAL ENERGY DENSITY OF FLOW BATTERY | 1272 | 686.88 | 924.32 | 381.6 | 1212.64 | 1195.68 | 1259.28 | 894.64 | 1263.52 |
| VOLUME FILLING FACTOR OF POWER GENERATION ELEMENT | 0.6 | 0.6 | 0.6 | 0.6 | 0.6 | 0.6 | 0.6 | 0.6 | 0.6 |
| ENERGY DENSITY OF FLOW BATTERY | 763.2 | 412.128 | 554.592 | 228.96 | 727.584 | 717.408 | 755.568 | 536.784 | 758.112 |

FIG. 27B

NEGATIVE ELECTRODE CHARGE MEDIATOR USED: ACENAPHTHYLENE        (NEGATIVE ELECTRODE ACTIVE MATERIAL: A1)

| NEGATIVE ELECTRODE DISCHARGE MEDIATOR | 2,2'-BIPYRIDYL | 1,10-PHENANTHROLINE | 4,4'-BIPYRIDYL | 3,3'-BIPYRIDYL | 2,4'-BIPYRIDYL | 2,3'-BIPYRIDYL | cis-STILBENE | ACETOPHENONE | PROPIOPHENONE |
|---|---|---|---|---|---|---|---|---|---|
| POTENTIAL OF POSITIVE ELECTRODE CHARGE MEDIATOR (TTF1) | 3.7 | 3.7 | 3.7 | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 | 3.4 | 3.4 | 3.4 |
| POTENTIAL OF NEGATIVE ELECTRODE CHARGE MEDIATOR | 0.014 | 0.014 | 0.014 | 0.014 | 0.014 | 0.014 | 0.014 | 0.014 | 0.014 |
| POTENTIAL OF NEGATIVE ELECTRODE DISCHARGE MEDIATOR | 0.4 | 1.78 | 1.22 | 2.5 | 0.54 | 0.58 | 0.43 | 1.29 | 0.42 |
| CHARGE VOLTAGE OF FLOW BATTERY | 3.686 | 3.686 | 3.686 | 3.686 | 3.686 | 3.686 | 3.686 | 3.686 | 3.686 |
| DISCHARGE VOLTAGE OF FLOW BATTERY | 3 | 1.62 | 2.18 | 0.9 | 2.86 | 2.82 | 2.97 | 2.11 | 2.98 |
| THEORETICAL CAPACITY DENSITY OF FLOW BATTERY | 424 | 424 | 424 | 424 | 424 | 424 | 424 | 424 | 424 |
| THEORETICAL ENERGY DENSITY OF FLOW BATTERY | 1272 | 686.88 | 924.32 | 381.6 | 1212.64 | 1195.68 | 1259.28 | 894.64 | 1263.52 |
| VOLUME FILLING FACTOR OF POWER GENERATION ELEMENT | 0.6 | 0.6 | 0.6 | 0.6 | 0.6 | 0.6 | 0.6 | 0.6 | 0.6 |
| ENERGY DENSITY OF FLOW BATTERY | 763.2 | 412.128 | 554.592 | 228.96 | 727.584 | 717.408 | 755.568 | 536.784 | 758.112 |

FIG. 27C

NEGATIVE ELECTRODE CHARGE MEDIATOR USED: FLUORANTHENE (NEGATIVE ELECTRODE ACTIVE MATERIAL: A1)

| NEGATIVE ELECTRODE DISCHARGE MEDIATOR | 2,2'-BIPYRIDYL | 1,10-PHENANTHROLINE | 4,4'-BIPYRIDYL | 3,3'-BIPYRIDYL | 2,4'-BIPYRIDYL | 2,3'-BIPYRIDYL | cis-STILBENE | ACETOPHENONE | PROPIOPHENONE |
|---|---|---|---|---|---|---|---|---|---|
| POTENTIAL OF POSITIVE ELECTRODE CHARGE MEDIATOR (TTF) | 3.7 | 3.7 | 3.7 | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 | 3.4 | 3.4 | 3.4 |
| POTENTIAL OF NEGATIVE ELECTRODE CHARGE MEDIATOR | 0.014 | 0.014 | 0.014 | 0.014 | 0.014 | 0.014 | 0.014 | 0.014 | 0.014 |
| POTENTIAL OF NEGATIVE ELECTRODE DISCHARGE MEDIATOR | 0.4 | 1.78 | 1.22 | 2.5 | 0.54 | 0.58 | 0.43 | 1.29 | 0.42 |
| CHARGE VOLTAGE OF FLOW BATTERY | 3.686 | 3.686 | 3.686 | 3.686 | 3.686 | 3.686 | 3.686 | 3.686 | 3.686 |
| DISCHARGE VOLTAGE OF FLOW BATTERY | 3 | 1.62 | 2.18 | 0.9 | 2.86 | 2.82 | 2.97 | 2.11 | 2.98 |
| THEORETICAL CAPACITY DENSITY OF FLOW BATTERY | 424 | 424 | 424 | 424 | 424 | 424 | 424 | 424 | 424 |
| THEORETICAL ENERGY DENSITY OF FLOW BATTERY | 1272 | 686.88 | 924.32 | 381.6 | 1212.64 | 1195.68 | 1259.28 | 894.64 | 1263.52 |
| VOLUME FILLING FACTOR OF POWER GENERATION ELEMENT | 0.6 | 0.6 | 0.6 | 0.6 | 0.6 | 0.6 | 0.6 | 0.6 | 0.6 |
| ENERGY DENSITY OF FLOW BATTERY | 763.2 | 412.128 | 554.592 | 228.96 | 727.584 | 717.408 | 755.568 | 536.784 | 758.112 |

FIG. 27D

NEGATIVE ELECTRODE CHARGE MEDIATOR USED: trans-STILBENE    (NEGATIVE ELECTRODE ACTIVE MATERIAL: Al)

| NEGATIVE ELECTRODE DISCHARGE MEDIATOR | 2,2'-BIPYRIDYL | 1,10-PHENANTHROLINE | 4,4'-BIPYRIDYL | 3,3'-BIPYRIDYL | 2,4'-BIPYRIDYL | 2,3'-BIPYRIDYL | cis-STILBENE | ACETOPHENONE | PROPIOPHENONE |
|---|---|---|---|---|---|---|---|---|---|
| POTENTIAL OF POSITIVE ELECTRODE CHARGE MEDIATOR (TTF) | 3.7 | 3.7 | 3.7 | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 | 3.4 | 3.4 | 3.4 |
| POTENTIAL OF NEGATIVE ELECTRODE CHARGE MEDIATOR | 0.3 | 0.3 | 0.3 | 0.3 | 0.3 | 0.3 | 0.3 | 0.3 | 0.3 |
| POTENTIAL OF NEGATIVE ELECTRODE DISCHARGE MEDIATOR | 0.4 | 1.78 | 1.22 | 2.5 | 0.54 | 0.58 | 0.43 | 1.29 | 0.42 |
| CHARGE VOLTAGE OF FLOW BATTERY | 3.4 | 3.4 | 3.4 | 3.4 | 3.4 | 3.4 | 3.4 | 3.4 | 3.4 |
| DISCHARGE VOLTAGE OF FLOW BATTERY | 3 | 1.62 | 2.18 | 0.9 | 2.86 | 2.82 | 2.97 | 2.11 | 2.98 |
| THEORETICAL CAPACITY DENSITY OF FLOW BATTERY | 424 | 424 | 424 | 424 | 424 | 424 | 424 | 424 | 424 |
| THEORETICAL ENERGY DENSITY OF FLOW BATTERY | 1272 | 686.88 | 924.32 | 381.6 | 1212.64 | 1195.68 | 1259.28 | 894.64 | 1263.52 |
| VOLUME FILLING FACTOR OF POWER GENERATION ELEMENT | 0.6 | 0.6 | 0.6 | 0.6 | 0.6 | 0.6 | 0.6 | 0.6 | 0.6 |
| ENERGY DENSITY OF FLOW BATTERY | 763.2 | 412.128 | 554.592 | 228.96 | 727.584 | 717.408 | 755.568 | 536.784 | 758.112 |

FIG. 28A

NEGATIVE ELECTRODE CHARGE MEDIATOR USED: BUTYROPHENONE (NEGATIVE ELECTRODE ACTIVE MATERIAL: A1)

| NEGATIVE ELECTRODE DISCHARGE MEDIATOR | 2,2'-BIPYRIDYL | 1,10-PHENANTHROLINE | 4,4'-BIPYRIDYL | 3,3'-BIPYRIDYL | 2,4'-BIPYRIDYL | 2,3'-BIPYRIDYL | cis-STILBENE | ACETOPHENONE | PROPIOPHENONE |
|---|---|---|---|---|---|---|---|---|---|
| POTENTIAL OF POSITIVE ELECTRODE CHARGE MEDIATOR (TTF) | 3.7 | 3.7 | 3.7 | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 | 3.4 | 3.4 | 3.4 |
| POTENTIAL OF NEGATIVE ELECTRODE CHARGE MEDIATOR | 0.3 | 0.3 | 0.3 | 0.3 | 0.3 | 0.3 | 0.3 | 0.3 | 0.3 |
| POTENTIAL OF NEGATIVE ELECTRODE DISCHARGE MEDIATOR | 0.4 | 1.78 | 1.22 | 2.5 | 0.54 | 0.58 | 0.43 | 1.29 | 0.42 |
| CHARGE VOLTAGE OF FLOW BATTERY | 3.4 | 3.4 | 3.4 | 3.4 | 3.4 | 3.4 | 3.4 | 3.4 | 3.4 |
| DISCHARGE VOLTAGE OF FLOW BATTERY | 3 | 1.62 | 2.18 | 0.9 | 2.86 | 2.82 | 2.97 | 2.11 | 2.98 |
| THEORETICAL CAPACITY DENSITY OF FLOW BATTERY | 424 | 424 | 424 | 424 | 424 | 424 | 424 | 424 | 424 |
| THEORETICAL ENERGY DENSITY OF FLOW BATTERY | 1272 | 686.88 | 924.32 | 381.6 | 1212.64 | 1195.68 | 1259.28 | 894.64 | 1263.52 |
| VOLUME FILLING FACTOR OF POWER GENERATION ELEMENT | 0.6 | 0.6 | 0.6 | 0.6 | 0.6 | 0.6 | 0.6 | 0.6 | 0.6 |
| ENERGY DENSITY OF FLOW BATTERY | 763.2 | 412.128 | 554.592 | 228.96 | 727.584 | 717.408 | 755.568 | 536.784 | 758.112 |

FIG. 28B (NEGATIVE ELECTRODE ACTIVE MATERIAL: Al)

NEGATIVE ELECTRODE CHARGE MEDIATOR USED: VALEROPHENONE

| NEGATIVE ELECTRODE DISCHARGE MEDIATOR | 2,2'-BIPYRIDYL | 1,10-PHENANTHROLINE | 4,4'-BIPYRIDYL | 3,3'-BIPYRIDYL | 2,4'-BIPYRIDYL | 2,3'-BIPYRIDYL | cis-STILBENE | ACETOPHENONE | PROPIOPHENONE |
|---|---|---|---|---|---|---|---|---|---|
| POTENTIAL OF POSITIVE ELECTRODE CHARGE MEDIATOR (TTF) | 3.7 | 3.7 | 3.7 | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 | 3.4 | 3.4 | 3.4 |
| POTENTIAL OF NEGATIVE ELECTRODE CHARGE MEDIATOR | 0.31 | 0.31 | 0.31 | 0.31 | 0.31 | 0.31 | 0.31 | 0.31 | 0.31 |
| POTENTIAL OF NEGATIVE ELECTRODE DISCHARGE MEDIATOR | 0.4 | 1.78 | 1.22 | 2.5 | 0.54 | 0.58 | 0.43 | 1.29 | 0.42 |
| CHARGE VOLTAGE OF FLOW BATTERY | 3.39 | 3.39 | 3.39 | 3.39 | 3.39 | 3.39 | 3.39 | 3.39 | 3.39 |
| DISCHARGE VOLTAGE OF FLOW BATTERY | 3 | 1.62 | 2.18 | 0.9 | 2.86 | 2.82 | 2.97 | 2.11 | 2.98 |
| THEORETICAL CAPACITY DENSITY OF FLOW BATTERY | 424 | 424 | 424 | 424 | 424 | 424 | 424 | 424 | 424 |
| THEORETICAL ENERGY DENSITY OF FLOW BATTERY | 1272 | 686.88 | 924.32 | 381.6 | 1212.64 | 1195.68 | 1259.28 | 894.64 | 1263.52 |
| VOLUME FILLING FACTOR OF POWER GENERATION ELEMENT | 0.6 | 0.6 | 0.6 | 0.6 | 0.6 | 0.6 | 0.6 | 0.6 | 0.6 |
| ENERGY DENSITY OF FLOW BATTERY | 763.2 | 412.128 | 554.592 | 228.96 | 727.584 | 717.408 | 755.568 | 536.784 | 758.112 |

FIG. 28C

NEGATIVE ELECTRODE CHARGE MEDIATOR USED: ETHYLENEDIAMINE (NEGATIVE ELECTRODE ACTIVE MATERIAL: Al)

| NEGATIVE ELECTRODE DISCHARGE MEDIATOR | 2,2'-BIPYRIDYL | 1,10-PHENANTHROLINE | 4,4'-BIPYRIDYL | 3,3'-BIPYRIDYL | 2,4'-BIPYRIDYL | 2,3'-BIPYRIDYL | cis-STILBENE | ACETOPHENONE | PROPIOPHENONE |
|---|---|---|---|---|---|---|---|---|---|
| POTENTIAL OF POSITIVE ELECTRODE CHARGE MEDIATOR (TTF) | 3.7 | 3.7 | 3.7 | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 | 3.4 | 3.4 | 3.4 |
| POTENTIAL OF NEGATIVE ELECTRODE CHARGE MEDIATOR | 0.36 | 0.36 | 0.36 | 0.36 | 0.36 | 0.36 | 0.36 | 0.36 | 0.36 |
| POTENTIAL OF NEGATIVE ELECTRODE DISCHARGE MEDIATOR | 0.4 | 1.78 | 1.22 | 2.5 | 0.54 | 0.58 | 0.43 | 1.29 | 0.42 |
| CHARGE VOLTAGE OF FLOW BATTERY | 3.34 | 3.34 | 3.34 | 3.34 | 3.34 | 3.34 | 3.34 | 3.34 | 3.34 |
| DISCHARGE VOLTAGE OF FLOW BATTERY | 3 | 1.62 | 2.18 | 0.9 | 2.86 | 2.82 | 2.97 | 2.11 | 2.98 |
| THEORETICAL CAPACITY DENSITY OF FLOW BATTERY | 424 | 424 | 424 | 424 | 424 | 424 | 424 | 424 | 424 |
| THEORETICAL ENERGY DENSITY OF FLOW BATTERY | 1272 | 686.88 | 924.32 | 381.6 | 1212.64 | 1195.68 | 1259.28 | 894.64 | 1263.52 |
| VOLUME FILLING FACTOR OF POWER GENERATION ELEMENT | 0.6 | 0.6 | 0.6 | 0.6 | 0.6 | 0.6 | 0.6 | 0.6 | 0.6 |
| ENERGY DENSITY OF FLOW BATTERY | 763.2 | 412.128 | 554.592 | 228.96 | 727.584 | 717.408 | 755.568 | 536.784 | 758.112 |

FIG. 28D

NEGATIVE ELECTRODE CHARGE MEDIATOR USED: BENZIL                                           (NEGATIVE ELECTRODE ACTIVE MATERIAL: AI)

| NEGATIVE ELECTRODE DISCHARGE MEDIATOR | 2,2'-BIPYRIDYL | 1,10-PHENANTHROLINE | 4,4'-BIPYRIDYL | 3,3'-BIPYRIDYL | 2,4'-BIPYRIDYL | 2,3'-BIPYRIDYL | cis-STILBENE | ACETOPHENONE | PROPIOPHENONE |
|---|---|---|---|---|---|---|---|---|---|
| POTENTIAL OF POSITIVE ELECTRODE CHARGE MEDIATOR (TTF) | 3.7 | 3.7 | 3.7 | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 | 3.4 | 3.4 | 3.4 |
| POTENTIAL OF NEGATIVE ELECTRODE CHARGE MEDIATOR | 0.16 | 0.16 | 0.16 | 0.16 | 0.16 | 0.16 | 0.16 | 0.16 | 0.16 |
| POTENTIAL OF NEGATIVE ELECTRODE DISCHARGE MEDIATOR | 0.4 | 1.78 | 1.22 | 2.5 | 0.54 | 0.58 | 0.43 | 1.29 | 0.42 |
| CHARGE VOLTAGE OF FLOW BATTERY | 3.54 | 3.54 | 3.54 | 3.54 | 3.54 | 3.54 | 3.54 | 3.54 | 3.54 |
| DISCHARGE VOLTAGE OF FLOW BATTERY | 3 | 1.62 | 2.18 | 0.9 | 2.86 | 2.82 | 2.97 | 2.11 | 2.98 |
| THEORETICAL CAPACITY DENSITY OF FLOW BATTERY | 424 | 424 | 424 | 424 | 424 | 424 | 424 | 424 | 424 |
| THEORETICAL ENERGY DENSITY OF FLOW BATTERY | 1272 | 686.88 | 924.32 | 381.6 | 1212.64 | 1195.68 | 1259.28 | 894.64 | 1263.52 |
| VOLUME FILLING FACTOR OF POWER GENERATION ELEMENT | 0.6 | 0.6 | 0.6 | 0.6 | 0.6 | 0.6 | 0.6 | 0.6 | 0.6 |
| ENERGY DENSITY OF FLOW BATTERY | 763.2 | 412.128 | 554.592 | 228.96 | 727.584 | 717.408 | 755.568 | 536.784 | 758.112 |

FIG. 29

NEGATIVE ELECTRODE CHARGE MEDIATOR USED: TETRAPHENYLCYCLOPENTADIENONE
(NEGATIVE ELECTRODE ACTIVE MATERIAL: Al)

| NEGATIVE ELECTRODE DISCHARGE MEDIATOR | 2,2'-BIPYRIDYL | 1,10-PHENANTHROLINE | 4,4'-BIPYRIDYL | 3,3'-BIPYRIDYL | 2,4'-BIPYRIDYL | 2,3'-BIPYRIDYL | cis-STILBENE | ACETOPHENONE | PROPIOPHENONE |
|---|---|---|---|---|---|---|---|---|---|
| POTENTIAL OF POSITIVE ELECTRODE CHARGE MEDIATOR (TTF⁺) | 3.7 | 3.7 | 3.7 | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 | 3.4 | 3.4 | 3.4 |
| POTENTIAL OF NEGATIVE ELECTRODE CHARGE MEDIATOR | 0.34 | 0.34 | 0.34 | 0.34 | 0.34 | 0.34 | 0.34 | 0.34 | 0.34 |
| POTENTIAL OF NEGATIVE ELECTRODE DISCHARGE MEDIATOR | 0.4 | 1.78 | 1.22 | 2.5 | 0.54 | 0.58 | 0.43 | 1.29 | 0.42 |
| CHARGE VOLTAGE OF FLOW BATTERY | 3.36 | 3.36 | 3.36 | 3.36 | 3.36 | 3.36 | 3.36 | 3.36 | 3.36 |
| DISCHARGE VOLTAGE OF FLOW BATTERY | 3 | 1.62 | 2.18 | 0.9 | 2.86 | 2.82 | 2.97 | 2.11 | 2.98 |
| THEORETICAL CAPACITY DENSITY OF FLOW BATTERY | 424 | 424 | 424 | 424 | 424 | 424 | 424 | 424 | 424 |
| THEORETICAL ENERGY DENSITY OF FLOW BATTERY | 1272 | 686.88 | 924.32 | 381.6 | 1212.64 | 1195.68 | 1259.28 | 894.64 | 1263.52 |
| VOLUME FILLING FACTOR OF POWER GENERATION ELEMENT | 0.6 | 0.6 | 0.6 | 0.6 | 0.6 | 0.6 | 0.6 | 0.6 | 0.6 |
| ENERGY DENSITY OF FLOW BATTERY | 763.2 | 412.128 | 554.592 | 228.96 | 727.584 | 717.408 | 755.568 | 536.784 | 758.112 |

FIG. 30A

NEGATIVE ELECTRODE CHARGE MEDIATOR USED: PHENANTHRENE (NEGATIVE ELECTRODE ACTIVE MATERIAL: Si)

| NEGATIVE ELECTRODE DISCHARGE MEDIATOR | 2,2'-BIPYRIDYL | 1,10-PHENANTHROLINE | 4,4'-BIPYRIDYL | 3,3'-BIPYRIDYL | 2,4'-BIPYRIDYL | 2,3'-BIPYRIDYL | cis-STILBENE | ACETOPHENONE | PROPIOPHENONE |
|---|---|---|---|---|---|---|---|---|---|
| POTENTIAL OF POSITIVE ELECTRODE CHARGE MEDIATOR (TTF+) | 3.7 | 3.7 | 3.7 | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 | 3.4 | 3.4 | 3.4 |
| POTENTIAL OF NEGATIVE ELECTRODE CHARGE MEDIATOR | 0.03 | 0.03 | 0.03 | 0.03 | 0.03 | 0.03 | 0.03 | 0.03 | 0.03 |
| POTENTIAL OF NEGATIVE ELECTRODE DISCHARGE MEDIATOR | 0.4 | 1.78 | 1.22 | 2.5 | 0.54 | 0.58 | 0.43 | 1.29 | 0.42 |
| CHARGE VOLTAGE OF FLOW BATTERY | 3.67 | 3.67 | 3.67 | 3.67 | 3.67 | 3.67 | 3.67 | 3.67 | 3.67 |
| DISCHARGE VOLTAGE OF FLOW BATTERY | 3 | 1.62 | 2.18 | 0.9 | 2.86 | 2.82 | 2.97 | 2.11 | 2.98 |
| THEORETICAL CAPACITY DENSITY OF FLOW BATTERY | 469 | 469 | 469 | 469 | 469 | 469 | 469 | 469 | 469 |
| THEORETICAL ENERGY DENSITY OF FLOW BATTERY | 1407 | 759.78 | 1022.42 | 422.1 | 1341.34 | 1322.58 | 1392.93 | 989.59 | 1397.62 |
| VOLUME FILLING FACTOR OF POWER GENERATION ELEMENT | 0.6 | 0.6 | 0.6 | 0.6 | 0.6 | 0.6 | 0.6 | 0.6 | 0.6 |
| ENERGY DENSITY OF FLOW BATTERY | 844.2 | 455.868 | 613.452 | 253.26 | 804.804 | 793.548 | 835.758 | 593.754 | 838.572 |

FIG. 30B

NEGATIVE ELECTRODE CHARGE MEDIATOR USED: BIPHENYL (NEGATIVE ELECTRODE ACTIVE MATERIAL: Si)

| NEGATIVE ELECTRODE DISCHARGE MEDIATOR | 2,2'-BIPYRIDYL | 1,10-PHENANTHROLINE | 4,4'-BIPYRIDYL | 3,3'-BIPYRIDYL | 2,4'-BIPYRIDYL | 2,3'-BIPYRIDYL | cis-STILBENE | ACETOPHENONE | PROPIOPHENONE |
|---|---|---|---|---|---|---|---|---|---|
| POTENTIAL OF POSITIVE ELECTRODE CHARGE MEDIATOR (TTF) | 3.7 | 3.7 | 3.7 | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 | 3.4 | 3.4 | 3.4 |
| POTENTIAL OF NEGATIVE ELECTRODE CHARGE MEDIATOR | 0 | 0 | 0 | 0 | 0 | 0 | 0 | 0 | 0 |
| POTENTIAL OF NEGATIVE ELECTRODE DISCHARGE MEDIATOR | 0.4 | 1.78 | 1.22 | 2.5 | 0.54 | 0.58 | 0.43 | 1.29 | 0.42 |
| CHARGE VOLTAGE OF FLOW BATTERY | 3.7 | 3.7 | 3.7 | 3.7 | 3.7 | 3.7 | 3.7 | 3.7 | 3.7 |
| DISCHARGE VOLTAGE OF FLOW BATTERY | 3 | 1.62 | 2.18 | 0.9 | 2.86 | 2.82 | 2.97 | 2.11 | 2.98 |
| THEORETICAL CAPACITY DENSITY OF FLOW BATTERY | 469 | 469 | 469 | 469 | 469 | 469 | 469 | 469 | 469 |
| THEORETICAL ENERGY DENSITY OF FLOW BATTERY | 1407 | 759.78 | 1022.42 | 422.1 | 1341.34 | 1322.58 | 1392.93 | 989.59 | 1397.62 |
| VOLUME FILLING FACTOR OF POWER GENERATION ELEMENT | 0.6 | 0.6 | 0.6 | 0.6 | 0.6 | 0.6 | 0.6 | 0.6 | 0.6 |
| ENERGY DENSITY OF FLOW BATTERY | 844.2 | 455.868 | 613.452 | 253.26 | 804.804 | 793.548 | 835.758 | 593.754 | 838.572 |

FIG. 30C

NEGATIVE ELECTRODE CHARGE MEDIATOR USED: TRIPHENYLENE
(NEGATIVE ELECTRODE ACTIVE MATERIAL: Si)

| NEGATIVE ELECTRODE DISCHARGE MEDIATOR | 2,2'-BIPYRIDYL | 1,10-PHENANTHROLINE | 4,4'-BIPYRIDYL | 3,3'-BIPYRIDYL | 2,4'-BIPYRIDYL | 2,3'-BIPYRIDYL | cis-STILBENE | ACETOPHENONE | PROPIOPHENONE |
|---|---|---|---|---|---|---|---|---|---|
| POTENTIAL OF POSITIVE ELECTRODE CHARGE MEDIATOR (TTF+) | 3.7 | 3.7 | 3.7 | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 | 3.4 | 3.4 | 3.4 |
| POTENTIAL OF NEGATIVE ELECTRODE CHARGE MEDIATOR | 0.01 | 0.01 | 0.01 | 0.01 | 0.01 | 0.01 | 0.01 | 0.01 | 0.01 |
| POTENTIAL OF NEGATIVE ELECTRODE DISCHARGE MEDIATOR | 0.4 | 1.78 | 1.22 | 2.5 | 0.54 | 0.58 | 0.43 | 1.29 | 0.42 |
| CHARGE VOLTAGE OF FLOW BATTERY | 3.69 | 3.69 | 3.69 | 3.69 | 3.69 | 3.69 | 3.69 | 3.69 | 3.69 |
| DISCHARGE VOLTAGE OF FLOW BATTERY | 3 | 1.62 | 2.18 | 0.9 | 2.86 | 2.82 | 2.97 | 2.11 | 2.98 |
| THEORETICAL CAPACITY DENSITY OF FLOW BATTERY | 469 | 469 | 469 | 469 | 469 | 469 | 469 | 469 | 469 |
| THEORETICAL ENERGY DENSITY OF FLOW BATTERY | 1407 | 759.78 | 1022.42 | 422.1 | 1341.34 | 1322.58 | 1392.93 | 989.59 | 1397.62 |
| VOLUME FILLING FACTOR OF POWER GENERATION ELEMENT | 0.6 | 0.6 | 0.6 | 0.6 | 0.6 | 0.6 | 0.6 | 0.6 | 0.6 |
| ENERGY DENSITY OF FLOW BATTERY | 844.2 | 455.868 | 613.452 | 253.26 | 804.804 | 793.548 | 835.758 | 593.754 | 838.572 |

FIG. 30D

NEGATIVE ELECTRODE CHARGE MEDIATOR USED: o-TERPHENYL (NEGATIVE ELECTRODE ACTIVE MATERIAL: Si)

| NEGATIVE ELECTRODE DISCHARGE MEDIATOR | 2,2'-BIPYRIDYL | 1,10-PHENANTHROLINE | 4,4'-BIPYRIDYL | 3,3'-BIPYRIDYL | 2,4'-BIPYRIDYL | 2,3'-BIPYRIDYL | cis-STILBENE | ACETOPHENONE | PROPIOPHENONE |
|---|---|---|---|---|---|---|---|---|---|
| POTENTIAL OF POSITIVE ELECTRODE CHARGE MEDIATOR (TTF+) | 3.7 | 3.7 | 3.7 | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 | 3.4 | 3.4 | 3.4 |
| POTENTIAL OF NEGATIVE ELECTRODE CHARGE MEDIATOR | 0.15 | 0.15 | 0.15 | 0.15 | 0.15 | 0.15 | 0.15 | 0.15 | 0.15 |
| POTENTIAL OF NEGATIVE ELECTRODE DISCHARGE MEDIATOR | 0.4 | 1.78 | 1.22 | 2.5 | 0.54 | 0.58 | 0.43 | 1.29 | 0.42 |
| CHARGE VOLTAGE OF FLOW BATTERY | 3.55 | 3.55 | 3.55 | 3.55 | 3.55 | 3.55 | 3.55 | 3.55 | 3.55 |
| DISCHARGE VOLTAGE OF FLOW BATTERY | 3 | 1.62 | 2.18 | 0.9 | 2.86 | 2.82 | 2.97 | 2.11 | 2.98 |
| THEORETICAL CAPACITY DENSITY OF FLOW BATTERY | 469 | 469 | 469 | 469 | 469 | 469 | 469 | 469 | 469 |
| THEORETICAL ENERGY DENSITY OF FLOW BATTERY | 1407 | 759.78 | 1022.42 | 422.1 | 1341.34 | 1322.58 | 1392.93 | 989.59 | 1397.62 |
| VOLUME FILLING FACTOR OF POWER GENERATION ELEMENT | 0.6 | 0.6 | 0.6 | 0.6 | 0.6 | 0.6 | 0.6 | 0.6 | 0.6 |
| ENERGY DENSITY OF FLOW BATTERY | 844.2 | 455.868 | 613.452 | 253.26 | 804.804 | 793.548 | 835.758 | 593.754 | 838.572 |

FIG. 31A

NEGATIVE ELECTRODE CHARGE MEDIATOR USED: ACENAPHTHENE
(NEGATIVE ELECTRODE ACTIVE MATERIAL: Si)

| NEGATIVE ELECTRODE DISCHARGE MEDIATOR | 2,2'-BIPYRIDYL | 1,10-PHENANTHROLINE | 4,4'-BIPYRIDYL | 3,3'-BIPYRIDYL | 2,4'-BIPYRIDYL | 2,3'-BIPYRIDYL | cis-STILBENE | ACETOPHENONE | PROPIOPHENONE |
|---|---|---|---|---|---|---|---|---|---|
| POTENTIAL OF POSITIVE ELECTRODE CHARGE MEDIATOR (TTF) | 3.7 | 3.7 | 3.7 | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 | 3.4 | 3.4 | 3.4 |
| POTENTIAL OF NEGATIVE ELECTRODE CHARGE MEDIATOR | 0.016 | 0.016 | 0.016 | 0.016 | 0.016 | 0.016 | 0.016 | 0.016 | 0.016 |
| POTENTIAL OF NEGATIVE ELECTRODE DISCHARGE MEDIATOR | 0.4 | 1.78 | 1.22 | 2.5 | 0.54 | 0.58 | 0.43 | 1.29 | 0.42 |
| CHARGE VOLTAGE OF FLOW BATTERY | 3.684 | 3.684 | 3.684 | 3.684 | 3.684 | 3.684 | 3.684 | 3.684 | 3.684 |
| DISCHARGE VOLTAGE OF FLOW BATTERY | 3 | 1.62 | 2.18 | 0.9 | 2.86 | 2.82 | 2.97 | 2.11 | 2.98 |
| THEORETICAL CAPACITY DENSITY OF FLOW BATTERY | 469 | 469 | 469 | 469 | 469 | 469 | 469 | 469 | 469 |
| THEORETICAL ENERGY DENSITY OF FLOW BATTERY | 1407 | 759.78 | 1022.42 | 422.1 | 1341.34 | 1322.58 | 1392.93 | 989.59 | 1397.62 |
| VOLUME FILLING FACTOR OF POWER GENERATION ELEMENT | 0.6 | 0.6 | 0.6 | 0.6 | 0.6 | 0.6 | 0.6 | 0.6 | 0.6 |
| ENERGY DENSITY OF FLOW BATTERY | 844.2 | 455.868 | 613.452 | 253.26 | 804.804 | 793.548 | 835.758 | 593.754 | 838.572 |

FIG. 31B

NEGATIVE ELECTRODE CHARGE MEDIATOR USED: ACENAPHTHYLENE (NEGATIVE ELECTRODE ACTIVE MATERIAL: Si)

| NEGATIVE ELECTRODE DISCHARGE MEDIATOR | 2,2'-BIPYRIDYL | 1,10-PHENANTHROLINE | 4,4'-BIPYRIDYL | 3,3'-BIPYRIDYL | 2,4'-BIPYRIDYL | 2,3'-BIPYRIDYL | cis-STILBENE | ACETOPHENONE | PROPIOPHENONE |
|---|---|---|---|---|---|---|---|---|---|
| POTENTIAL OF POSITIVE ELECTRODE CHARGE MEDIATOR (TTF) | 3.7 | 3.7 | 3.7 | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 | 3.4 | 3.4 | 3.4 |
| POTENTIAL OF NEGATIVE ELECTRODE CHARGE MEDIATOR | 0.014 | 0.014 | 0.014 | 0.014 | 0.014 | 0.014 | 0.014 | 0.014 | 0.014 |
| POTENTIAL OF NEGATIVE ELECTRODE DISCHARGE MEDIATOR | 0.4 | 1.78 | 1.22 | 2.5 | 0.54 | 0.58 | 0.43 | 1.29 | 0.42 |
| CHARGE VOLTAGE OF FLOW BATTERY | 3.686 | 3.686 | 3.686 | 3.686 | 3.686 | 3.686 | 3.686 | 3.686 | 3.686 |
| DISCHARGE VOLTAGE OF FLOW BATTERY | 3 | 1.62 | 2.18 | 0.9 | 2.86 | 2.82 | 2.97 | 2.11 | 2.98 |
| THEORETICAL CAPACITY DENSITY OF FLOW BATTERY | 469 | 469 | 469 | 469 | 469 | 469 | 469 | 469 | 469 |
| THEORETICAL ENERGY DENSITY OF FLOW BATTERY | 1407 | 759.78 | 1022.42 | 422.1 | 1341.34 | 1322.58 | 1392.93 | 989.59 | 1397.62 |
| VOLUME FILLING FACTOR OF POWER GENERATION ELEMENT | 0.6 | 0.6 | 0.6 | 0.6 | 0.6 | 0.6 | 0.6 | 0.6 | 0.6 |
| ENERGY DENSITY OF FLOW BATTERY | 844.2 | 455.868 | 613.452 | 253.26 | 804.804 | 793.548 | 835.758 | 593.754 | 838.572 |

FIG. 31C

NEGATIVE ELECTRODE CHARGE MEDIATOR USED: FLUORANTHENE (NEGATIVE ELECTRODE ACTIVE MATERIAL: Si)

| NEGATIVE ELECTRODE DISCHARGE MEDIATOR | 2,2'-BIPYRIDYL | 1,10-PHENANTHROLINE | 4,4'-BIPYRIDYL | 3,3'-BIPYRIDYL | 2,4'-BIPYRIDYL | 2,3'-BIPYRIDYL | cis-STILBENE | ACETOPHENONE | PROPIOPHENONE |
|---|---|---|---|---|---|---|---|---|---|
| POTENTIAL OF POSITIVE ELECTRODE CHARGE MEDIATOR (TTF) | 3.7 | 3.7 | 3.7 | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 | 3.4 | 3.4 | 3.4 |
| POTENTIAL OF NEGATIVE ELECTRODE CHARGE MEDIATOR | 0.014 | 0.014 | 0.014 | 0.014 | 0.014 | 0.014 | 0.014 | 0.014 | 0.014 |
| POTENTIAL OF NEGATIVE ELECTRODE DISCHARGE MEDIATOR | 0.4 | 1.78 | 1.22 | 2.5 | 0.54 | 0.58 | 0.43 | 1.29 | 0.42 |
| CHARGE VOLTAGE OF FLOW BATTERY | 3.686 | 3.686 | 3.686 | 3.686 | 3.686 | 3.686 | 3.686 | 3.686 | 3.686 |
| DISCHARGE VOLTAGE OF FLOW BATTERY | 3 | 1.62 | 2.18 | 0.9 | 2.86 | 2.82 | 2.97 | 2.11 | 2.98 |
| THEORETICAL CAPACITY DENSITY OF FLOW BATTERY | 469 | 469 | 469 | 469 | 469 | 469 | 469 | 469 | 469 |
| THEORETICAL ENERGY DENSITY OF FLOW BATTERY | 1407 | 759.78 | 1022.42 | 422.1 | 1341.34 | 1322.58 | 1392.93 | 989.59 | 1397.62 |
| VOLUME FILLING FACTOR OF POWER GENERATION ELEMENT | 0.6 | 0.6 | 0.6 | 0.6 | 0.6 | 0.6 | 0.6 | 0.6 | 0.6 |
| ENERGY DENSITY OF FLOW BATTERY | 844.2 | 455.868 | 613.452 | 253.26 | 804.804 | 793.548 | 835.758 | 593.754 | 838.572 |

FIG. 31D

NEGATIVE ELECTRODE CHARGE MEDIATOR USED: trans-STILBENE      (NEGATIVE ELECTRODE ACTIVE MATERIAL: Si)

| NEGATIVE ELECTRODE DISCHARGE MEDIATOR | 2,2'-BIPYRIDYL | 1,10-PHENANTHROLINE | 4,4'-BIPYRIDYL | 3,3'-BIPYRIDYL | 2,4'-BIPYRIDYL | 2,3'-BIPYRIDYL | cis-STILBENE | ACETOPHENONE | PROPIOPHENONE |
|---|---|---|---|---|---|---|---|---|---|
| POTENTIAL OF POSITIVE ELECTRODE CHARGE MEDIATOR (TTF) | 3.7 | 3.7 | 3.7 | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 | 3.4 | 3.4 | 3.4 |
| POTENTIAL OF NEGATIVE ELECTRODE CHARGE MEDIATOR | 0.3 | 0.3 | 0.3 | 0.3 | 0.3 | 0.3 | 0.3 | 0.3 | 0.3 |
| POTENTIAL OF NEGATIVE ELECTRODE DISCHARGE MEDIATOR | 0.4 | 1.78 | 1.22 | 2.5 | 0.54 | 0.58 | 0.43 | 1.29 | 0.42 |
| CHARGE VOLTAGE OF FLOW BATTERY | 3.4 | 3.4 | 3.4 | 3.4 | 3.4 | 3.4 | 3.4 | 3.4 | 3.4 |
| DISCHARGE VOLTAGE OF FLOW BATTERY | 3 | 1.62 | 2.18 | 0.9 | 2.86 | 2.82 | 2.97 | 2.11 | 2.98 |
| THEORETICAL CAPACITY DENSITY OF FLOW BATTERY | 469 | 469 | 469 | 469 | 469 | 469 | 469 | 469 | 469 |
| THEORETICAL ENERGY DENSITY OF FLOW BATTERY | 1407 | 759.78 | 1022.42 | 422.1 | 1341.34 | 1322.58 | 1392.93 | 989.59 | 1397.62 |
| VOLUME FILLING FACTOR OF POWER GENERATION ELEMENT | 0.6 | 0.6 | 0.6 | 0.6 | 0.6 | 0.6 | 0.6 | 0.6 | 0.6 |
| ENERGY DENSITY OF FLOW BATTERY | 844.2 | 455.868 | 613.452 | 253.26 | 804.804 | 793.548 | 835.758 | 593.754 | 838.572 |

FIG. 32A

NEGATIVE ELECTRODE CHARGE MEDIATOR USED: BUTYROPHENONE (NEGATIVE ELECTRODE ACTIVE MATERIAL: Si)

| NEGATIVE ELECTRODE DISCHARGE MEDIATOR | 2,2'-BIPYRIDYL | 1,10-PHENANTHROLINE | 4,4'-BIPYRIDYL | 3,3'-BIPYRIDYL | 2,4'-BIPYRIDYL | 2,3'-BIPYRIDYL | cis-STILBENE | ACETOPHENONE | PROPIOPHENONE |
|---|---|---|---|---|---|---|---|---|---|
| POTENTIAL OF POSITIVE ELECTRODE CHARGE MEDIATOR (TTF+) | 3.7 | 3.7 | 3.7 | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 | 3.4 | 3.4 | 3.4 |
| POTENTIAL OF NEGATIVE ELECTRODE CHARGE MEDIATOR | 0.3 | 0.3 | 0.3 | 0.3 | 0.3 | 0.3 | 0.3 | 0.3 | 0.3 |
| POTENTIAL OF NEGATIVE ELECTRODE DISCHARGE MEDIATOR | 0.4 | 1.78 | 1.22 | 2.5 | 0.54 | 0.58 | 0.43 | 1.29 | 0.42 |
| CHARGE VOLTAGE OF FLOW BATTERY | 3.4 | 3.4 | 3.4 | 3.4 | 3.4 | 3.4 | 3.4 | 3.4 | 3.4 |
| DISCHARGE VOLTAGE OF FLOW BATTERY | 3 | 1.62 | 2.18 | 0.9 | 2.86 | 2.82 | 2.97 | 2.11 | 2.98 |
| THEORETICAL CAPACITY DENSITY OF FLOW BATTERY | 469 | 469 | 469 | 469 | 469 | 469 | 469 | 469 | 469 |
| THEORETICAL ENERGY DENSITY OF FLOW BATTERY | 1407 | 759.78 | 1022.42 | 422.1 | 1341.34 | 1322.58 | 1392.93 | 989.59 | 1397.62 |
| VOLUME FILLING FACTOR OF POWER GENERATION ELEMENT | 0.6 | 0.6 | 0.6 | 0.6 | 0.6 | 0.6 | 0.6 | 0.6 | 0.6 |
| ENERGY DENSITY OF FLOW BATTERY | 844.2 | 455.868 | 613.452 | 253.26 | 804.804 | 793.548 | 835.758 | 593.754 | 838.572 |

FIG. 32B

NEGATIVE ELECTRODE CHARGE MEDIATOR USED: VALEROPHENONE (NEGATIVE ELECTRODE ACTIVE MATERIAL: Si)

| NEGATIVE ELECTRODE DISCHARGE MEDIATOR | 2,2'-BIPYRIDYL | 1,10-PHENANTHROLINE | 4,4'-BIPYRIDYL | 3,3'-BIPYRIDYL | 2,4'-BIPYRIDYL | 2,3'-BIPYRIDYL | cis-STILBENE | ACETOPHENONE | PROPIOPHENONE |
|---|---|---|---|---|---|---|---|---|---|
| POTENTIAL OF POSITIVE ELECTRODE CHARGE MEDIATOR (TTF) | 3.7 | 3.7 | 3.7 | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 | 3.4 | 3.4 | 3.4 |
| POTENTIAL OF NEGATIVE ELECTRODE CHARGE MEDIATOR | 0.31 | 0.31 | 0.31 | 0.31 | 0.31 | 0.31 | 0.31 | 0.31 | 0.31 |
| POTENTIAL OF NEGATIVE ELECTRODE DISCHARGE MEDIATOR | 0.4 | 1.78 | 1.22 | 2.5 | 0.54 | 0.58 | 0.43 | 1.29 | 0.42 |
| CHARGE VOLTAGE OF FLOW BATTERY | 3.39 | 3.39 | 3.39 | 3.39 | 3.39 | 3.39 | 3.39 | 3.39 | 3.39 |
| DISCHARGE VOLTAGE OF FLOW BATTERY | 3 | 1.62 | 2.18 | 0.9 | 2.86 | 2.82 | 2.97 | 2.11 | 2.98 |
| THEORETICAL CAPACITY DENSITY OF FLOW BATTERY | 469 | 469 | 469 | 469 | 469 | 469 | 469 | 469 | 469 |
| THEORETICAL ENERGY DENSITY OF FLOW BATTERY | 1407 | 759.78 | 1022.42 | 422.1 | 1341.34 | 1322.58 | 1392.93 | 989.59 | 1397.62 |
| VOLUME FILLING FACTOR OF POWER GENERATION ELEMENT | 0.6 | 0.6 | 0.6 | 0.6 | 0.6 | 0.6 | 0.6 | 0.6 | 0.6 |
| ENERGY DENSITY OF FLOW BATTERY | 844.2 | 455.868 | 613.452 | 253.26 | 804.804 | 793.548 | 835.758 | 593.754 | 838.572 |

FIG. 32C

NEGATIVE ELECTRODE CHARGE MEDIATOR USED: ETHYLENEDIAMINE (NEGATIVE ELECTRODE ACTIVE MATERIAL: G)

| NEGATIVE ELECTRODE DISCHARGE MEDIATOR | 2,2'-BIPYRIDYL | 1,10-PHENANTHROLINE | 4,4'-BIPYRIDYL | 3,3'-BIPYRIDYL | 2,4'-BIPYRIDYL | 2,3'-BIPYRIDYL | cis-STILBENE | ACETOPHENONE | PROPIOPHENONE |
|---|---|---|---|---|---|---|---|---|---|
| POTENTIAL OF POSITIVE ELECTRODE CHARGE MEDIATOR (TTF) | 3.7 | 3.7 | 3.7 | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 | 3.4 | 3.4 | 3.4 |
| POTENTIAL OF NEGATIVE ELECTRODE CHARGE MEDIATOR | 0.36 | 0.36 | 0.36 | 0.36 | 0.36 | 0.36 | 0.36 | 0.36 | 0.36 |
| POTENTIAL OF NEGATIVE ELECTRODE DISCHARGE MEDIATOR | 0.4 | 1.78 | 1.22 | 2.5 | 0.54 | 0.58 | 0.43 | 1.29 | 0.42 |
| CHARGE VOLTAGE OF FLOW BATTERY | 3.34 | 3.34 | 3.34 | 3.34 | 3.34 | 3.34 | 3.34 | 3.34 | 3.34 |
| DISCHARGE VOLTAGE OF FLOW BATTERY | 3 | 1.62 | 2.18 | 0.9 | 2.86 | 2.82 | 2.97 | 2.11 | 2.98 |
| THEORETICAL CAPACITY DENSITY OF FLOW BATTERY | 469 | 469 | 469 | 469 | 469 | 469 | 469 | 469 | 469 |
| THEORETICAL ENERGY DENSITY OF FLOW BATTERY | 1407 | 759.78 | 1022.42 | 422.1 | 1341.34 | 1322.58 | 1392.93 | 989.59 | 1397.62 |
| VOLUME FILLING FACTOR OF POWER GENERATION ELEMENT | 0.6 | 0.6 | 0.6 | 0.6 | 0.6 | 0.6 | 0.6 | 0.6 | 0.6 |
| ENERGY DENSITY OF FLOW BATTERY | 844.2 | 455.868 | 613.452 | 253.26 | 804.804 | 793.548 | 835.758 | 593.754 | 838.572 |

FIG. 32D

NEGATIVE ELECTRODE CHARGE MEDIATOR USED: BENZIL (NEGATIVE ELECTRODE ACTIVE MATERIAL: Si)

| NEGATIVE ELECTRODE DISCHARGE MEDIATOR | 2,2'-BIPYRIDYL | 1,10-PHENANTHROLINE | 4,4'-BIPYRIDYL | 3,3'-BIPYRIDYL | 2,4'-BIPYRIDYL | 2,3'-BIPYRIDYL | cis-STILBENE | ACETOPHENONE | PROPIOPHENONE |
|---|---|---|---|---|---|---|---|---|---|
| POTENTIAL OF POSITIVE ELECTRODE CHARGE MEDIATOR (TTF) | 3.7 | 3.7 | 3.7 | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 | 3.4 | 3.4 | 3.4 |
| POTENTIAL OF NEGATIVE ELECTRODE CHARGE MEDIATOR | 0.16 | 0.16 | 0.16 | 0.16 | 0.16 | 0.16 | 0.16 | 0.16 | 0.16 |
| POTENTIAL OF NEGATIVE ELECTRODE DISCHARGE MEDIATOR | 0.4 | 1.78 | 1.22 | 2.5 | 0.54 | 0.58 | 0.43 | 1.29 | 0.42 |
| CHARGE VOLTAGE OF FLOW BATTERY | 3.54 | 3.54 | 3.54 | 3.54 | 3.54 | 3.54 | 3.54 | 3.54 | 3.54 |
| DISCHARGE VOLTAGE OF FLOW BATTERY | 3 | 1.62 | 2.18 | 0.9 | 2.86 | 2.82 | 2.97 | 2.11 | 2.98 |
| THEORETICAL CAPACITY DENSITY OF FLOW BATTERY | 469 | 469 | 469 | 469 | 469 | 469 | 469 | 469 | 469 |
| THEORETICAL ENERGY DENSITY OF FLOW BATTERY | 1407 | 759.78 | 1022.42 | 422.1 | 1341.34 | 1322.58 | 1392.93 | 989.59 | 1397.62 |
| VOLUME FILLING FACTOR OF POWER GENERATION ELEMENT | 0.6 | 0.6 | 0.6 | 0.6 | 0.6 | 0.6 | 0.6 | 0.6 | 0.6 |
| ENERGY DENSITY OF FLOW BATTERY | 844.2 | 455.868 | 613.452 | 253.26 | 804.804 | 793.548 | 835.758 | 593.754 | 838.572 |

FIG. 33

NEGATIVE ELECTRODE CHARGE MEDIATOR USED: TETRAPHENYLCYCLOPENTADIENONE (NEGATIVE ELECTRODE ACTIVE MATERIAL: Si)

| NEGATIVE ELECTRODE DISCHARGE MEDIATOR | 2,2'-BIPYRIDYL | 1,10-PHENANTHROLINE | 4,4'-BIPYRIDYL | 3,3'-BIPYRIDYL | 2,4'-BIPYRIDYL | 2,3'-BIPYRIDYL | cis-STILBENE | ACETOPHENONE | PROPIOPHENONE |
|---|---|---|---|---|---|---|---|---|---|
| POTENTIAL OF POSITIVE ELECTRODE CHARGE MEDIATOR (TTF⁺) | 3.7 | 3.7 | 3.7 | 3.7 | 3.7 | 3.7 | 3.7 | 3.7 | 3.7 |
| POTENTIAL OF POSITIVE ELECTRODE DISCHARGE MEDIATOR (TTF) | 3.4 | 3.4 | 3.4 | 3.4 | 3.4 | 3.4 | 3.4 | 3.4 | 3.4 |
| POTENTIAL OF NEGATIVE ELECTRODE CHARGE MEDIATOR | 0.34 | 0.34 | 0.34 | 0.34 | 0.34 | 0.34 | 0.34 | 0.34 | 0.34 |
| POTENTIAL OF NEGATIVE ELECTRODE DISCHARGE MEDIATOR | 0.4 | 1.78 | 1.22 | 2.5 | 0.54 | 0.58 | 0.43 | 1.29 | 0.42 |
| CHARGE VOLTAGE OF FLOW BATTERY | 3.36 | 3.36 | 3.36 | 3.36 | 3.36 | 3.36 | 3.36 | 3.36 | 3.36 |
| DISCHARGE VOLTAGE OF FLOW BATTERY | 3 | 1.62 | 2.18 | 0.9 | 2.86 | 2.82 | 2.97 | 2.11 | 2.98 |
| THEORETICAL CAPACITY DENSITY OF FLOW BATTERY | 469 | 469 | 469 | 469 | 469 | 469 | 469 | 469 | 469 |
| THEORETICAL ENERGY DENSITY OF FLOW BATTERY | 1407 | 759.78 | 1022.42 | 422.1 | 1341.34 | 1322.58 | 1392.93 | 989.59 | 1397.62 |
| VOLUME FILLING FACTOR OF POWER GENERATION ELEMENT | 0.6 | 0.6 | 0.6 | 0.6 | 0.6 | 0.6 | 0.6 | 0.6 | 0.6 |
| ENERGY DENSITY OF FLOW BATTERY | 844.2 | 455.868 | 613.452 | 253.26 | 804.804 | 793.548 | 835.758 | 593.754 | 838.572 |

FIG. 34

| SAMPLE NAME | BIPHENYL CONCENTRATION [M] | LiBF$_4$ CONCENTRATION [M] | POTENTIAL [V vs. (Li/Li$^+$)] |
|---|---|---|---|
| SAMPLE A1 | 0.1 | 1 | 1.2 |
| SAMPLE A2 | 0.1 | 0.7 | 1.1 |
| SAMPLE A3 | 0.1 | 0.5 | 0.87 |
| SAMPLE A4 | 0.1 | 0.2 | 0.21 |
| SAMPLE A5 | 0.1 | 0.1 | 0.006 |
| SAMPLE A6 | 0.1 | 0.05 | 0.003 |
| SAMPLE A7 | 0.1 | 0.025 | 0.003 |
| SAMPLE A8 | 0.1 | 0 | 0.002 |
| SAMPLE A9 | 1 | 1 | 0.004 |
| SAMPLE A10 | 1 | 0.5 | 0 |
| SAMPLE A11 | 1 | 0.1 | 0 |

FIG. 35

| SAMPLE NAME | BIPHENYL CONCENTRATION [M] | LiN(SO$_2$CF$_3$)$_2$ CONCENTRATION [M] | POTENTIAL [V vs. (Li/Li$^+$)] |
|---|---|---|---|
| SAMPLE B1 | 0.1 | 0.5 | 1.95 |
| SAMPLE B2 | 0.1 | 0.1 | 0.007 |
| SAMPLE B3 | 0.1 | 0.05 | 0.003 |
| SAMPLE B4 | 0.1 | 0.0 | 0 |

FIG. 36

| SAMPLE NAME | BIPHENYL CONCENTRATION [M] | LiN(SO$_2$F)$_2$ CONCENTRATION [M] | POTENTIAL [V vs. (Li/Li$^+$)] |
|---|---|---|---|
| SAMPLE C1 | 0.1 | 0.5 | 2.5 |
| SAMPLE C2 | 0.1 | 0.1 | 0.17 |
| SAMPLE C3 | 0.1 | 0.05 | 0.08 |
| SAMPLE C4 | 0.1 | 0.0 | 0 |

FIG. 37

| SAMPLE NAME | BIPHENYL CONCENTRATION [M] | LiCF$_3$SO$_3$ CONCENTRATION [M] | POTENTIAL [V vs. (Li/Li$^+$)] |
|---|---|---|---|
| SAMPLE D1 | 0.1 | 0.5 | 0.78 |
| SAMPLE D2 | 0.1 | 0.1 | 0.002 |
| SAMPLE D3 | 0.1 | 0.05 | 0.002 |
| SAMPLE D4 | 0.1 | 0.0 | 0 |

FIG. 38

| SAMPLE NAME | trans-STILBENE CONCENTRATION [M] | LiBF$_4$ CONCENTRATION [M] | POTENTIAL [V vs. (Li/Li$^+$)] |
|---|---|---|---|
| SAMPLE E1 | 0.1 | 1 | 1.32 |
| SAMPLE E2 | 0.1 | 0.4 | 1.28 |
| SAMPLE E3 | 0.1 | 0.2 | 1.0 |
| SAMPLE E4 | 0.1 | 0.1 | 0.42 |
| SAMPLE E5 | 0.1 | 0.05 | 0.33 |
| SAMPLE E6 | 0.1 | 0 | 0.3 |
| SAMPLE E7 | 0.4 | 0.4 | 0.56 |
| SAMPLE E8 | 0.4 | 0.2 | 0.28 |
| SAMPLE E9 | 0.4 | 0.1 | 0.25 |

FIG. 39

| | COMPUTATIONAL EXAMPLE A | COMPUTATIONAL EXAMPLE B | COMPUTATIONAL EXAMPLE C | COMPUTATIONAL EXAMPLE D |
|---|---|---|---|---|
| POTENTIAL OF BIPHENYL SERVING AS NEGATIVE ELECTRODE CHARGE MEDIATOR [V vs. Li/Li$^+$] | 0 | 0.003 | 0.006 | 1.2 |
| POTENTIAL OF trans-STILBENE SERVING AS NEGATIVE ELECTRODE DISCHARGE MEDIATOR [V vs. Li/Li$^+$] | 0.3 | 0.33 | 0.42 | 1.3 |
| POTENTIAL OF TTF$^+$ SERVING AS POSITIVE ELECTRODE CHARGE MEDIATOR [V vs. Li/Li$^+$] | 3.7 | 3.7 | 3.7 | 3.7 |
| POTENTIAL OF TTF SERVING AS POSITIVE ELECTRODE DISCHARGE MEDIATOR [V vs. Li/Li$^+$] | 3.4 | 3.4 | 3.4 | 3.4 |
| CHARGE VOLTAGE OF FLOW BATTERY [V] | 3.7 | 3.697 | 3.694 | 2.5 |
| DISCHARGE VOLTAGE OF FLOW BATTERY [V] | 3.1 | 3.07 | 2.98 | 2.1 |
| THEORETICAL CAPACITY DENSITY OF FLOW BATTERY [Ah/L] | 317 | 317 | 317 | 5.4 |
| THEORETICAL ENERGY DENSITY OF FLOW BATTERY [Wh/L] | 982 | 973 | 945 | 10.7 |
| VOLUME FILLING FACTOR OF POWER GENERATION ELEMENT | 0.6 | 0.6 | 0.6 | 0.6 |
| ENERGY DENSITY OF FLOW BATTERY [Wh/L] | 589 | 584 | 567 | 6.4 |

FIG. 40

| SAMPLE NAME | BIPHENYL CONCENTRATION [M] | LiPF$_6$ CONCENTRATION [M] | POTENTIAL [V vs. (Li/Li$^+$)] |
|---|---|---|---|
| SAMPLE F1 | 0.1 | 1 | 0.001 |
| SAMPLE F2 | 0.1 | 0.5 | 0.000 |
| SAMPLE F3 | 0.1 | 0.1 | 0.006 |
| SAMPLE F4 | 0.1 | 0.05 | 0.009 |
| SAMPLE F5 | 0.1 | 0.0 | 0 |

FIG. 41

| SAMPLE NAME | trans-STILBENE CONCENTRATION [M] | LiPF$_6$ CONCENTRATION [M] | POTENTIAL [V vs. (Li/Li$^+$)] |
|---|---|---|---|
| SAMPLE G1 | 0.1 | 1 | 0.29 |
| SAMPLE G2 | 0.1 | 0.5 | 0.26 |
| SAMPLE G3 | 0.1 | 0.1 | 0.25 |
| SAMPLE G4 | 0.1 | 0.05 | 0.24 |
| SAMPLE G5 | 0.1 | 0.0 | 0.3 |

FIG. 42

| | COMPUTATIONAL EXAMPLE E | COMPUTATIONAL EXAMPLE F | COMPUTATIONAL EXAMPLE G |
|---|---|---|---|
| POTENTIAL OF BIPHENYL SERVING AS NEGATIVE ELECTRODE CHARGE MEDIATOR [V vs. Li/Li$^+$] | 0 | 0.001 | 0.006 |
| POTENTIAL OF trans-STILBENE SERVING AS NEGATIVE ELECTRODE DISCHARGE MEDIATOR [V vs. Li/Li$^+$] | 0.3 | 0.29 | 0.25 |
| POTENTIAL OF TTF$^+$ SERVING AS POSITIVE ELECTRODE CHARGE MEDIATOR [V vs. Li/Li$^+$] | 3.7 | 3.7 | 3.7 |
| POTENTIAL OF TTF SERVING AS POSITIVE ELECTRODE DISCHARGE MEDIATOR [V vs. Li/Li$^+$] | 3.4 | 3.4 | 3.4 |
| CHARGE VOLTAGE OF FLOW BATTERY [V] | 3.7 | 3.699 | 3.694 |
| DISCHARGE VOLTAGE OF FLOW BATTERY [V] | 3.1 | 3.11 | 3.15 |
| THEORETICAL CAPACITY DENSITY OF FLOW BATTERY [Ah/L] | 317 | 317 | 317 |
| THEORETICAL ENERGY DENSITY OF FLOW BATTERY [Wh/L] | 982 | 985 | 998 |
| VOLUME FILLING FACTOR OF POWER GENERATION ELEMENT | 0.6 | 0.6 | 0.6 |
| ENERGY DENSITY OF FLOW BATTERY [Wh/L] | 589 | 591 | 599 |

FIG. 43

| SAMPLE NAME | SOLVENT | DISSOLUTION OF LITHIUM METAL | INTERCALATION OF LITHIUM INTO GRAPHITE |
|---|---|---|---|
| SAMPLE S-A1 | TETRAHYDROFURAN | ◯ | ◯ |
| SAMPLE S-A2 | 2-METHYLTETRAHYDROFURAN | ◯ | ◯ |
| SAMPLE S-A3 | 1,2-DIMETHOXYETHANE | ◯ | ◯ |
| SAMPLE S-A4 | 2,5-DIMETHYLTETRAHYDROFURAN | ◯ | ◯ |
| SAMPLE S-A5 | DIETHOXYETHANE | ◯ | ◯ |
| SAMPLE S-A6 | DIBUTOXYETHANE | ◯ | ◯ |
| SAMPLE S-A7 | DIETHYLENE GLYCOL DIMETHYL ETHER | ◯ | ◯ |
| SAMPLE S-A8 | TRIETHYLENE GLYCOL DIMETHYL ETHER | ◯ | ◯ |
| SAMPLE S-A9 | TETRAETHYLENE GLYCOL DIMETHYL ETHER | ◯ | ◯ |
| SAMPLE S-A10 | DIETHYLENE GLYCOL ETHYL METHYL ETHER | ◯ | ◯ |
| SAMPLE S-A11 | 3-METHYLSULFOLANE | ◯ | ◯ |
| SAMPLE S-A12 | TETRAHYDROFURFURYLAMINE | ◯ | × |
| SAMPLE S-A13 | 2-METHYLTETRAHYDROFURAN-3-ONE | × | × |
| SAMPLE S-A14 | TETRAHYDROFURFURYL BUTYRATE | × | × |
| SAMPLE S-A15 | DIPHENYL ETHER | × | × |
| SAMPLE S-A16 | VINYLENE CARBONATE | × | × |
| SAMPLE S-A17 | DIBUTOXYMETHANE | × | × |
| SAMPLE S-A18 | ANISOLE | × | × |
| SAMPLE S-A19 | PHENETOLE | × | × |
| SAMPLE S-A20 | 2,5-DIMETHOXYTETRAHYDROFURAN | × | × |

FIG. 44

| SAMPLE NAME | SOLVENT X | SOLVENT Y | VOLUME MIXING RATIO (X:Y) | DISSOLUTION OF LITHIUM METAL | INTERCALATION OF LITHIUM INTO GRAPHITE |
|---|---|---|---|---|---|
| SAMPLE S-B1 | DIBUTOXYETHANE | 2-METHYLTETRAHYDROFURAN | 3:7 | ○ | ○ |
| SAMPLE S-B2 | DIBUTOXYETHANE | 2-METHYLTETRAHYDROFURAN | 2:8 | ○ | ○ |
| SAMPLE S-B3 | DIBUTOXYETHANE | 2,5-DIMETHOXYTETRAHYDROFURAN | 3:7 | ○ | ○ |
| SAMPLE S-B4 | DIBUTOXYETHANE | 2,5-DIMETHOXYTETRAHYDROFURAN | 2:8 | ○ | ○ |
| SAMPLE S-B5 | DIBUTOXYMETHANE | DIBUTOXYETHANE | 2:8 | ○ | ○ |
| SAMPLE S-B6 | ANISOLE | DIBUTOXYETHANE | 2:8 | ○ | ○ |
| SAMPLE S-B7 | PHENETOLE | DIBUTOXYETHANE | 2:8 | ○ | ○ |
| SAMPLE S-B8 | 2,5-DIMETHOXYTETRAHYDROFURAN | DIETHYLENE GLYCOL DIBUTYL ETHER | 2:8 | ○ | ○ |
| SAMPLE S-B9 | 3-METHYLSULFOLANE | DIETHYLENE GLYCOL DIBUTYL ETHER | 2:8 | ○ | × |

FLOW BATTERY

BACKGROUND

1. Technical Field

The present disclosure relates to a flow battery.

2. Description of the Related Art

Japanese Patent No. 5417441 discloses a redox flow battery that uses a negative electrode slurry solution containing a non-aqueous solvent and metal particles serving as solid negative electrode active material particles.

SUMMARY

There is a need in the related art to provide a high-energy density flow battery.

In one general aspect, the techniques disclosed here feature a flow battery including: a first liquid containing dissolved therein a charge mediator and a discharge mediator; a first electrode immersed in the first liquid; and a first active material immersed in the first liquid. The equilibrium potential of the charge mediator is lower than the equilibrium potential of the first active material, and the equilibrium potential of the discharge mediator is higher than the equilibrium potential of the first active material.

The present disclosure can provide a high-energy density flow battery.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2 is a table showing the results of measurement of the potentials of condensed aromatic compounds usable as a charge mediator;

FIG. 3 is a table showing the results of measurement of the potentials of condensed aromatic compounds usable as a discharge mediator;

FIG. 6 is a table showing the results of estimation of the energy densities of flow batteries in embodiment 3;

FIG. 7 is a schematic illustration showing a general structure of a flow battery in embodiment 4;

FIG. 8 is a table showing the results of measurement of the potentials of condensed aromatic compounds usable as the charge mediator;

FIG. 9 is a table showing the results of measurement of the potentials of condensed aromatic compounds usable as the discharge mediator;

FIG. 10 is a table showing the results of measurement of the potentials of condensed aromatic compounds usable as the charge mediator;

FIG. 11 is a table showing the results of measurement of the potentials of condensed aromatic compounds usable as the discharge mediator;

FIGS. 12A and 12B are tables showing the results of estimation of the energy densities of flow batteries in embodiment 3;

FIGS. 13A and 13B are tables showing the results of estimation of the energy densities of flow batteries in embodiment 3;

FIGS. 14A and 14B are tables showing the results of estimation of the energy densities of flow batteries in embodiment 3;

FIGS. 15A and 15B are tables showing the results of estimation of the energy densities of flow batteries in embodiment 3;

FIGS. 16A to 16D are tables showing the results of estimation of the energy densities of flow batteries in embodiment 5;

FIGS. 17A to 17C are tables showing the results of estimation of the energy densities of flow batteries in embodiment 5;

FIGS. 18A to 18D are tables showing the results of estimation of the energy densities of flow batteries in embodiment 6;

FIGS. 19A to 19D are tables showing the results of estimation of the energy densities of flow batteries in embodiment 6;

FIGS. 20A to 20D are tables showing the results of estimation of the energy densities of flow batteries in embodiment 6;

FIGS. 21A to 21D are tables showing the results of estimation of the energy densities of flow batteries in embodiment 6;

FIGS. 22A to 22D are tables showing the results of estimation of the energy densities of flow batteries in embodiment 7;

FIGS. 23A to 23D are tables showing the results of estimation of the energy densities of flow batteries in embodiment 7;

FIGS. 24A to 24D are tables showing the results of estimation of the energy densities of flow batteries in embodiment 7;

FIGS. 25A to 25D are tables showing the results of estimation of the energy densities of flow batteries in embodiment 7;

FIGS. 26A to 26D are tables showing the results of estimation of the energy densities of flow batteries in embodiment 8;

FIGS. 27A to 27D are tables showing the results of estimation of the energy densities of flow batteries in embodiment 8;

FIGS. 28A to 28D are tables showing the results of estimation of the energy densities of flow batteries in embodiment 8;

FIG. 29 is a table showing the results of estimation of the energy densities of flow batteries in embodiment 8;

FIGS. 30A to 30D are tables showing the results of estimation of the energy densities of flow batteries in embodiment 9;

FIGS. 31A to 31D are tables showing the results of estimation of the energy densities of flow batteries in embodiment 9;

FIGS. 32A to 32D are tables showing the results of estimation of the energy densities of flow batteries in embodiment 9;

FIG. 33 is a table showing the results of estimation of the energy densities of flow batteries in embodiment 9;

FIG. 34 is a table showing the results of measurement of the potentials of biphenyl solutions;

FIG. 35 is a table showing the results of measurement of the potentials of biphenyl solutions;

FIG. 36 is a table showing the results of measurement of the potentials of biphenyl solutions;

FIG. 37 is a table showing the results of measurement of the potentials of biphenyl solutions;

FIG. 38 is a table showing the results of measurement of the potentials of trans-stilbene solutions;

FIG. 39 is a table showing the results of estimation of the energy densities of flow batteries in embodiment 10;

FIG. 40 is a table showing the results of measurement of the potentials of biphenyl solutions;

FIG. 41 is a table showing the results of measurement of the potentials of trans-stilbene solutions;

FIG. 42 is a table showing the results of estimation of the energy densities of flow batteries in embodiment 11;

FIG. 43 is a table showing samples of a first liquid; and

FIG. 44 is a table showing other samples of the first liquid.

DETAILED DESCRIPTION

Embodiments of the present disclosure will next be described with reference to the drawings.

Embodiment 1

Figure 1:
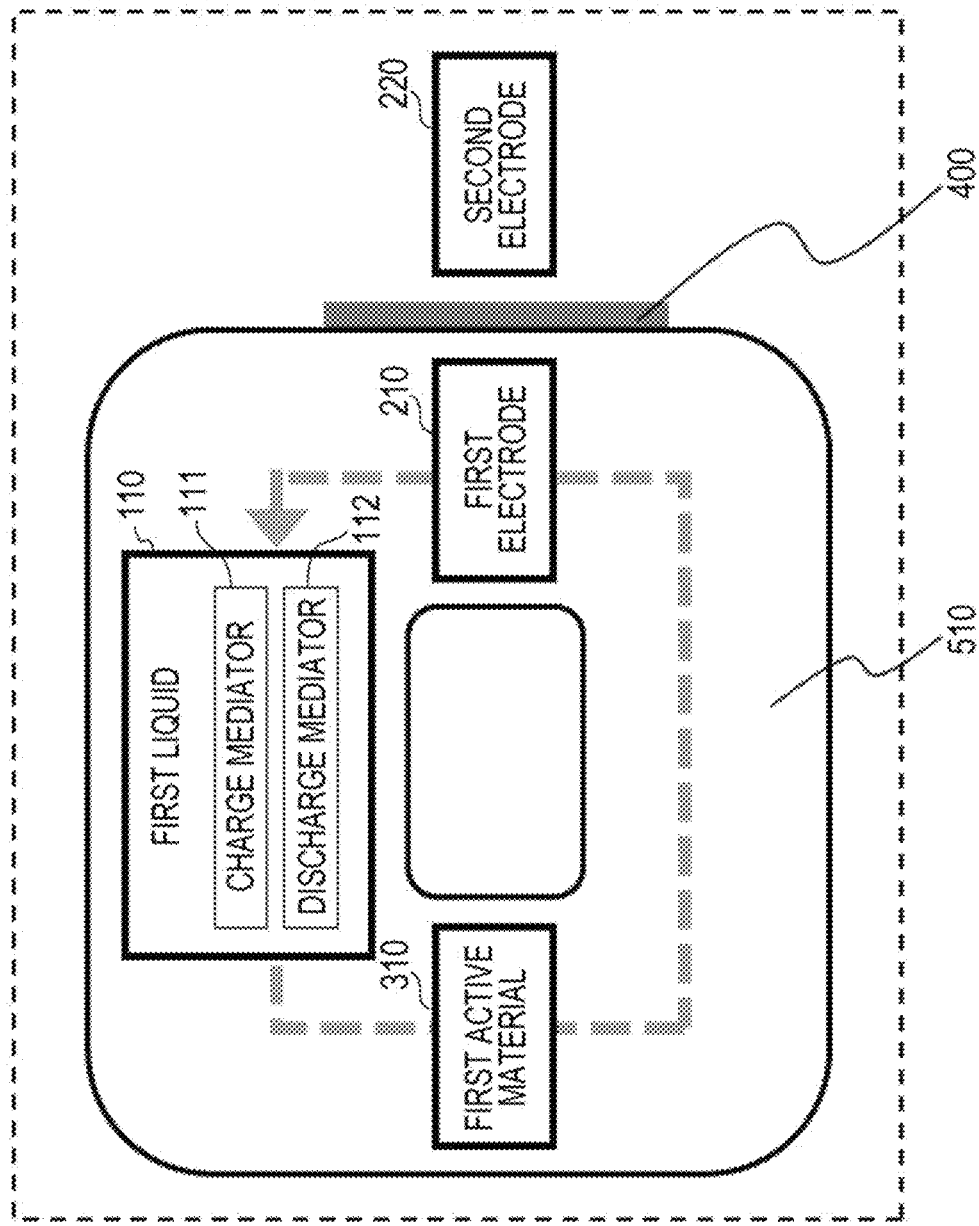
FIG. 1 is a block diagram showing a general structure of a flow battery in embodiment 1.

FIG. 1 is a block diagram showing a general structure of a flow battery 1000 in embodiment 1.

The flow battery 1000 in embodiment 1 includes a first liquid 110, a first electrode 210, and a first active material 310.

The first liquid 110 contains dissolved therein a charge mediator 111 and a discharge mediator 112.

The first electrode 210 is immersed in the first liquid 110.

The first active material 310 is immersed in the first liquid 110.

The equilibrium potential of the charge mediator 111 is lower than the equilibrium potential of the first active material 310.

The equilibrium potential of the discharge mediator 112 is higher than the equilibrium potential of the first active material 310.

The flow battery configured as above can have both a high energy density and a long cycle life.

Specifically, in the flow battery configured as above, although the active material is used, the active material itself is not circulated. Therefore, for example, a high-capacity powdery active material for charge and discharge reactions can be used as the first active material 310. This allows a high energy density and a high capacity to be achieved.

In the above structure, only the first liquid 110 containing dissolved therein the charge mediator 111 and the discharge mediator 112 can be circulated without circulation of the powdery active material itself. This can prevent the occurrence of, for example, clogging of pipes with the powdery active material. Therefore, the flow battery provided can have a long cycle life.

In the above structure, when the first active material 310 used is an active material having a relatively low equilibrium potential (vs. Li/Li$^+$) (e.g., graphite), a material having a relatively low equilibrium potential (vs. Li/Li$^+$) (e.g., a condensed aromatic compound) can be used as the discharge mediator 112. In this case, the flow battery negative electrode provided can have a lower potential. Therefore, the flow battery provided can have a high battery voltage (discharge voltage).

In the flow battery 1000 in embodiment 1, lithium may be dissolved in the first liquid 110.

The first active material 310 may be a material having the property of occluding and releasing lithium.

During charging of the flow battery 1000 (i.e., in a state in which electrons are supplied to the first electrode 210 from the outside of the flow battery 1000), the charge mediator 111 may be reduced on the first electrode 210. Then the charge mediator 111 reduced on the first electrode 210 may be oxidized by the first active material 310, and the first active material 310 may occlude lithium.

During discharging of the flow battery 1000 (i.e., in a state in which electrons are emitted from the first electrode 210 to the outside of the flow battery 1000), the first active material 310 containing lithium occluded therein may reduce the discharge mediator 112 and may release the lithium, and the discharge mediator 112 reduced by the first active material 310 may be oxidized on the first electrode 210.

In the above structure, the first active material 310 used may be, for example, an active material having the property of reversibly occluding and releasing lithium (e.g., lithium ions). In this case, the material design of the first active material 310 is facilitated. Moreover, a higher capacity can be achieved.

In the flow battery 1000 in embodiment 1, the discharge mediator 112 may be reduced on the first electrode 210 during charging.

During discharging, the charge mediator 111 may be oxidized on the first electrode 210.

With the above structure, a higher energy density and a higher capacity can be achieved. Specifically, when the discharge mediator 112 is reduced on the first electrode 210 during charging, the amount of the discharge mediator 112 to be oxidized on the first electrode 210 during discharging can be increased. When the charge mediator 111 is discharged on the first electrode 210 during discharging, the amount of the charge mediator 111 to be reduced on the first electrode 210 during charging can be increased. This allows the charge-discharge capacity to increase.

For example, when the first liquid 110 comes into contact with the first electrode 210, the charge mediator 111 and the discharge mediator 112 are oxidized or reduced on the first electrode 210.

For example, when the first liquid 110 comes into contact with the first active material 310, the discharge mediator 112 undergoes a reduction reaction with the first active material 310, or the charge mediator 111 undergoes an oxidation reaction with the first active material 310.

In the flow battery 1000 in embodiment 1, the charge mediator 111 and the discharge mediator 112 may be condensed aromatic compounds.

The first liquid 110 containing these condensed aromatic compounds dissolved therein has the property of causing lithium to release solvated electrons and dissolve as cations.

In the above structure, the charge mediator 111 and discharge mediator 112 provided can be electrochemically base. A solution (e.g., an ether solution) containing a condensed aromatic compound has the ability to dissolve lithium (e.g., lithium metal). Lithium easily releases electrons to form cations. Therefore, lithium donates electrons to the condensed aromatic compound in the solution and dissolves in the solution as cations. In this case, the condensed aromatic compound that has accepted the electrons solvates the electrons. The condensed aromatic compound solvating the electrons behaves as anions. Therefore, the condensed aromatic compound-containing solution itself has ion conductivity. In the condensed aromatic compound-containing solution, Li cations and electrons are present in equivalent amounts. Therefore, the condensed aromatic compound-containing solution itself can have strong reducing properties (in other words, can be electrochemically base).

For example, when an electrode that does not react with lithium is immersed in the first liquid 110 containing a condensed aromatic compound dissolved therein and then the potential with respect to lithium metal is measured, the potential measured is considerably low. The potential observed depends on the degree of solvation of electrons by the condensed aromatic compound (i.e., the type of condensed aromatic compound). Examples of the condensed aromatic compound that exhibits a low potential include phenanthrene, biphenyl, o-terphenyl, triphenylene, anthracene, acenaphthene, acenaphthylene, fluoranthene, 1,10-phenanthroline, 2,2'-bipyridyl, benzophenone, trans-stilbene, 4,4'-bipyridyl, 3,3'-bipyridyl, 2,4'-bipyridyl, 2,3'-bipyridyl, cis-stilbene, acetophenone, propiophenone, butyrophenone, valerophenone, ethylenediamine, benzil, and tetraphenylcyclopentadienone.

In the flow battery 1000 in embodiment 1, the charge mediator 111 may be at least one selected from the group consisting of phenanthrene, biphenyl, o-terphenyl, triphenylene, anthracene, acenaphthene, acenaphthylene, and fluoranthene.

In the above structure, the charge mediator 111 provided can be electrochemically base. More specifically, the charge mediator provided can have a lower potential (vs. Li/Li$^+$) than a specific first active material 310 (e.g., graphite).

In the flow battery 1000 in embodiment 1, the discharge mediator 112 may be at least one selected from the group consisting of 1,10-phenanthroline, 2,2'-bipyridyl, benzophenone, trans-stilbene, 4,4'-bipyridyl, 3,3'-bipyridyl, 2,4'-bipyridyl, 2,3'-bipyridyl, cis-stilbene, acetophenone, propiophenone, butyrophenone, valerophenone, ethylenediamine, benzil, and tetraphenylcyclopentadienone.

In the above structure, the discharge mediator 112 provided can be electrochemically noble. More specifically, the discharge mediator 112 provided can have a higher potential (vs. Li/Li$^+$) than a specific first active material 310 (e.g., graphite).

In the flow battery 1000 in embodiment 1, the discharge mediator 112 may be at least one selected from the group consisting of 2,2'-bipyridyl, trans-stilbene, 2,4'-bipyridyl, 2,3'-bipyridyl, cis-stilbene, propiophenone, butyrophenone, valerophenone, ethylenediamine, benzil, and tetraphenylcyclopentadienone.

In the above structure, the discharge mediator 112 provided can be electrochemically noble. More specifically, the discharge mediator 112 provided cab have a higher potential (vs. Li/Li$^+$) than a specific first active material 310 (e.g., graphite). Moreover, the discharge mediator 112 can have a relatively low equilibrium potential (vs. Li/Li$^+$). In this case, the flow battery negative electrode provided can have a lower potential. Therefore, the flow battery provided can have a high battery voltage (discharge voltage).

In the flow battery 1000 in embodiment 1, the first liquid 110 may be an ether solution.

In the above structure, the first liquid 110 provided may be an electrolyte solution containing the charge mediator 111 and the discharge mediator 112. Specifically, since the solvent for the charge mediator 111 and the discharge mediator 112 is an ether with no electronic conductivity, the ether solution itself can have the properties of an electrolyte solution.

The ether used may be tetrahydrofuran (THF), 2-methyltetrahydrofuran (2MeTHF), dimethoxyethane (DME), 1,3-dioxane (1,3DO), 4-methyl-1,3-dioxane (4Me1,3DO), etc.

In the flow battery 1000 in embodiment 1, the first active material 310 may contain graphite.

With the above structure, the first active material 310 can have a relatively low equilibrium potential (vs. Li/Li$^+$). Therefore, a material having a relatively low equilibrium potential (vs. Li/Li$^+$) (e.g., a condensed aromatic compound) can be used as the discharge mediator 112. In this case, the flow battery negative electrode provided can have a lower potential. Therefore, the flow battery provided can have a high battery voltage (discharge voltage).

In embodiment 1, the composition of graphite containing lithium occluded therein (i.e., a graphite intercalation compound generated during discharging) and used as the first active material 310 may be at least one of $C_{24}Li$, $C_{18}Li$, $C_{12}Li$, and $C_6Li$.

When the first active material 310 used is graphite ($C_6Li$), the graphite reacts with lithium and is fully reduced (i.e., the graphite occludes lithium to form $C_6Li$), and the charging is completed. In this case, the potential of $C_6Li$ is about 0.15 V vs. Li/Li$^+$. Therefore, a mediator-type negative electrode can be formed by using as the charge mediator a condensed aromatic compound having a lower potential than $C_6Li$ and using as the discharge mediator a condensed aromatic compound having a higher potential than $C_6Li$.

FIGS. 2, 8, and FIG. 10 are tables showing the results of measurement of the potentials of condensed aromatic compounds usable as the charge mediator 111.

FIGS. 3, 9, and 11 are tables showing the results of measurement of the potentials of condensed aromatic compounds usable as the discharge mediator 112.

A 2×2 cm copper foil was wrapped with a polypropylene-made porous separator, and the entire separator was wrapped with a large amount of lithium metal foil. A tab was attached to each of the copper foil and the lithium metal. Then a laminate exterior package was attached to the above product. 2MeTHF containing dissolved therein a condensed aromatic compound at a molar concentration (M) shown in one of FIGS. 2, 3, 8, 9, 10, and 11 was poured into the laminate exterior package, and the laminate exterior package was hermetically heat-sealed. A potential measurement cell was thereby prepared for each condensed aromatic compound. FIGS. 2, 3, 8, 9, 10, and 11 show the potentials (V vs. Li/Li$^+$) measured with respect to lithium metal using these potential measurement cells. In this measurement, the ether used was 2MeTHF, but other ethers can also be used.

Li metal was dissolved in a 2MeTHF solution containing dissolved therein a charge mediator at a concentration of 0.1M. Graphite was immersed in this solution for 4 days. A change in color indicating the change from graphite (black) to $C_6Li$ (gold) was observed. $C_6Li$ was immersed in a 2MeTHF solution containing dissolved therein a discharge mediator at a concentration of 0.1M for 4 days. A change in color indicating the change from $C_6Li$ (gold) to graphite (black) was observed.

FIGS. 2 and 3 show changes when $C_6Li$ and lithium metal were immersed in 2MeTHF containing a condensed aromatic compound dissolved therein.

As shown in FIGS. 2 and 3, all the solutions were colored, and lithium metal was found to dissolve in each of the charge mediators 111 and the discharge mediators 112.

As shown in FIG. 2, each charge mediator 111 has no ability to dissolve Li contained in $C_6Li$.

As shown in FIG. 3, each discharge mediator 112 has the ability to dissolve Li contained in $C_6Li$.

The difference in ability can be explained by the difference between the potential of each lithium metal solution and the potential of $C_6Li$. Specifically, a mediator having a higher potential than $C_6Li$ (about 0.15 V vs. $Li/Li^+$) has the ability to dissolve Li contained in $C_6Li$. A mediator having a lower potential than $C_6Li$ (about 0.15 V vs. $Li/Li^+$) has no ability to dissolve Li contained in $C_6Li$.

Therefore, a condensed aromatic compound having a potential lower than $C_6Li$ can be used as the charge mediator 111. A condensed aromatic compound having a potential higher than $C_6Li$ can be used as the discharge mediator 112.

The smaller the difference in potential between the condensed aromatic compound used and the first active material 310, the higher the charge-discharge energy efficiency. Therefore, when graphite ($C_6Li$) is used as the first active material 310, the charge mediator 111 used may be phenanthrene, triphenylene, or biphenyl. The discharge mediator 112 used may be trans-stilbene, butyrophenone, valerophenone, or ethylenediamine. This can further improve the charge-discharge energy efficiency.

The ether used may be an ether that is not co-intercalated with Li ions into graphite. In this case, the ether is not co-intercalated into graphite, and a further increase in capacity density can be achieved.

The first active material 310 used may be a powdery active material. By charging a tank with the first active material 310 in unprocessed powder form, production can be simplified, and the production cost can be reduced.

Alternatively, the first active material 310 used may be a pellet-like active material (prepared, for example, by forming a powder into pellets). By charging the tank with the first active material 310 in pellet form, the production can be simplified, and the production cost can be reduced.

Alternatively, the first active material 310 used may be an active material pelleted using a commonly known binder (such as polyvinylidene fluoride, polypropylene, polyethylene, or polyimide).

The first active material 310 may be a material that does not dissolve (i.e., is insoluble) in the first liquid 110. In the flow battery provided in this case, the charge mediator 111 and the discharge mediator 112 are circulated together with the first liquid 110, but the first active material 310 is not circulated.

In the flow battery 1000 in embodiment 1, the first electrode 210 may be a negative electrode, and a second electrode 220 may be a positive electrode.

When an electrode with a low relative potential is used as the second electrode 220, the first electrode 210 can serve as a positive electrode.

Specifically, the first electrode 210 may be a positive electrode, and the second electrode 220 may be a negative electrode.

The first electrode 210 may have a surface serving as a reaction field for the charge mediator 111 and the discharge mediator 112.

In this case, a material stable in the first liquid 110 may be used for the first electrode 210. The material used for the first electrode 210 may be stable during an electrode reaction, which is an electrochemical reaction. For example, a metal (such as stainless steel, iron, copper, or nickel), carbon, etc. may be used for the first electrode 210.

The first electrode 210 may have a structure with an increased surface area (e.g., a mesh, a nonwoven fabric, a surface roughened plate, or a sintered porous body). In this case, the first electrode 210 has a large specific surface area. This can facilitate the progress of the oxidation or reduction reaction of each of the charge mediator 111 and the discharge mediator 112.

The second electrode 220 may have a structure including a current collector and an active material disposed on the current collector. In this case, for example, a high-capacity active material can be used. A compound having the property of reversibly occluding and releasing lithium ions may be used as the active material for the second electrode 220.

Alternatively, the second electrode 220 may be lithium metal. When lithium metal is used for the second electrode 220, dissolution and precipitation of the metal serving as the positive electrode can be easily controlled, and a high capacity can be achieved.

The flow battery 1000 in embodiment 1 may further include a separator 400.

The separator 400 separates the first electrode 210 and the first liquid 110 from the second electrode 220.

The separator 400 may be a microporous membrane (porous body) used for known secondary batteries.

Alternatively, the separator 400 may be a porous membrane such as glass paper, which is a nonwoven fabric including glass fibers woven thereinto.

Alternatively, the separator 400 may be a separation membrane having ion conductivity (lithium ion conductivity). For example, the separator 400 may be an ion exchange resin membrane (such as a cation exchange membrane or an anion exchange membrane), a solid electrolyte membrane, etc.

The flow battery 1000 in embodiment 1 may further include a first circulator 510.

The first circulator 510 circulates the first liquid 110 between the first electrode 210 and the first active material 310.

With the above structure, the charge mediator 111 and the discharge mediator 112 can be circulated together with the first liquid 110 between the first electrode 210 and the first active material 310. This allows the oxidation and reduction reactions of the materials to proceed more efficiently.

The first circulator 510 may include, for example, a pipe, a tank, a pump, a valve, etc.

One specific example of the first circulator 510 is a structure described later in embodiment 2.

<Description of Charge and Discharge Processes>

Charge and discharge processes of the flow battery 1000 in embodiment 1 will next be described.

The charge and discharge processes will be specifically described while the following operation example is shown.

Specifically, in this operation example, the first electrode 210 is a negative electrode and is made of stainless steel.

In this operation example, the first liquid 110 is an ether solution containing dissolved therein the charge mediator 111 and the discharge mediator 112.

In this operation example, the charge mediator 111 is one condensed aromatic compound (hereinafter denoted by ChMd).

In this operation example, the discharge mediator 112 is one condensed aromatic compound (hereinafter denoted by DchMd).

In this operation example, the first active material 310 is graphite ($C_6Li$).

In this operation example, the second electrode 220 is a positive electrode and includes a current collector (stainless steel) and lithium iron phosphate ($LiFePO_4$) used as an active material disposed on the current collector.

[Description of Charge Process]

First, the charge reaction will be described.

A voltage is applied between the first electrode 210 and the second electrode 220 to perform charging.

(Reaction on Positive Electrode Side)

On the second electrode 220 serving as the positive electrode, the oxidation reaction of a positive electrode active material occurs when a voltage is applied. Specifically, lithium ions are released from the positive electrode active material. Electrons are thereby emitted from the second electrode 220 to the outside of the flow battery.

For example, in this operation example, the following reaction occurs.

$$LiFePO_4 \rightarrow FePO_4 + Li^+ + e^-$$

Part of the lithium ions (Li$^+$) generated can migrate to the first liquid 110 through the separator 400.

(Reaction on Negative Electrode Side)

When a voltage is applied, electrons are supplied from the outside of the flow battery to the first electrode 210 serving as the negative electrode. The reduction reactions of the charge mediator 111 and the discharge mediator 112 thereby occur on the first electrode 210.

For example, in this operation example, the following reactions occur.

$$ChMd + Li^+ + e^- \rightarrow ChMd \cdot Li$$

$$DchMd + Li^+ + e^- \rightarrow DchMd \cdot Li$$

The charge mediator 111 reduced on the first electrode 210 is transferred (supplied) through the first circulator 510 to a position in which the first active material 310 is disposed.

In this case, the charge mediator 111 reduced on the first electrode 210 is oxidized by the first active material 310. In other words, the first active material 310 is reduced by the charge mediator 111. The first active material 310 thereby occludes lithium and forms C$_6$Li.

For example, in this operation example, the following reaction occurs.

$$6C + ChMd \cdot Li \rightarrow C_6Li + ChMd$$

The charge mediator 111 oxidized by the first active material 310 is transferred (supplied) through the first circulator 510 to a position in which the first electrode 210 is disposed.

As described above, the charge mediator 111 is unchanged in the overall reaction including circulation.

However, the first active material 310 located in the position spaced apart from the first electrode 210 is brought to a charged state.

The above charge reaction may proceed until one of a fully charged state of the first active material 310 and a fully charged state of the active material on the positive electrode side is reached.

[Description of Discharge Process]

Next, a discharge reaction from full charge will be described.

In the full charge, the first active material 310 and the positive electrode active material are in their charged states.

During the discharge reaction, electric power is outputted through the first electrode 210 and the second electrode 220.

(Reaction on Positive Electrode Side)

During discharging of the battery, electrons are supplied from the outside of the flow battery to the second electrode 220 serving as the positive electrode. The reduction reaction of the active material thereby occurs on the second electrode 220.

For example, in this operation example, the following reaction occurs.

$$FePO_4 + Li^+ + e^- \rightarrow LiFePO_4$$

Part of the lithium ions (Li$^+$) may be supplied from the first liquid 110 through the separator 400.

(Reaction on Negative Electrode Side)

During discharging of the battery, the oxidation reactions of the charge mediator 111 and the discharge mediator 112 occur on the first electrode 210 serving as the negative electrode. Electrons are thereby emitted from the first electrode 210 to the outside of the flow battery.

For example, in this operation example, the following reactions occur.

$$DchMd \cdot Li \rightarrow DchMd + Li^+ + e^-$$

$$ChMd \cdot Li \rightarrow ChMd + Li^+ + e^-$$

The discharge mediator 112 oxidized on the first electrode 210 is transferred (supplied) through the first circulator 510 to the position in which the first active material 310 is disposed.

In this case, the discharge mediator 112 oxidized on the first electrode 210 is reduced by the first active material 310. In other words, the first active material 310 is oxidized by the discharge mediator 112. The first active material 310 thereby releases lithium.

For example, in this operation example, the following reaction occurs.

$$C_6Li + DchMd \rightarrow 6C + DchMd \cdot Li$$

The discharge mediator 112 reduced by the first active material 310 is transferred (supplied) through the first circulator 510 to the position in which the first electrode 210 is disposed.

As described above, the discharge mediator 112 is unchanged in the overall reaction including circulation.

However, the first active material 310 located in the position spaced apart from the first electrode 210 is brought to a discharged state.

The above discharge reaction may proceed until one of a fully discharged state of the first active material 310 and a fully discharged state of the active material on the positive electrode side is reached.

Embodiment 2

Embodiment 2 will be described. However, the description will be omitted as appropriate when it overlaps with that of embodiment 1 above.

Figure 4:
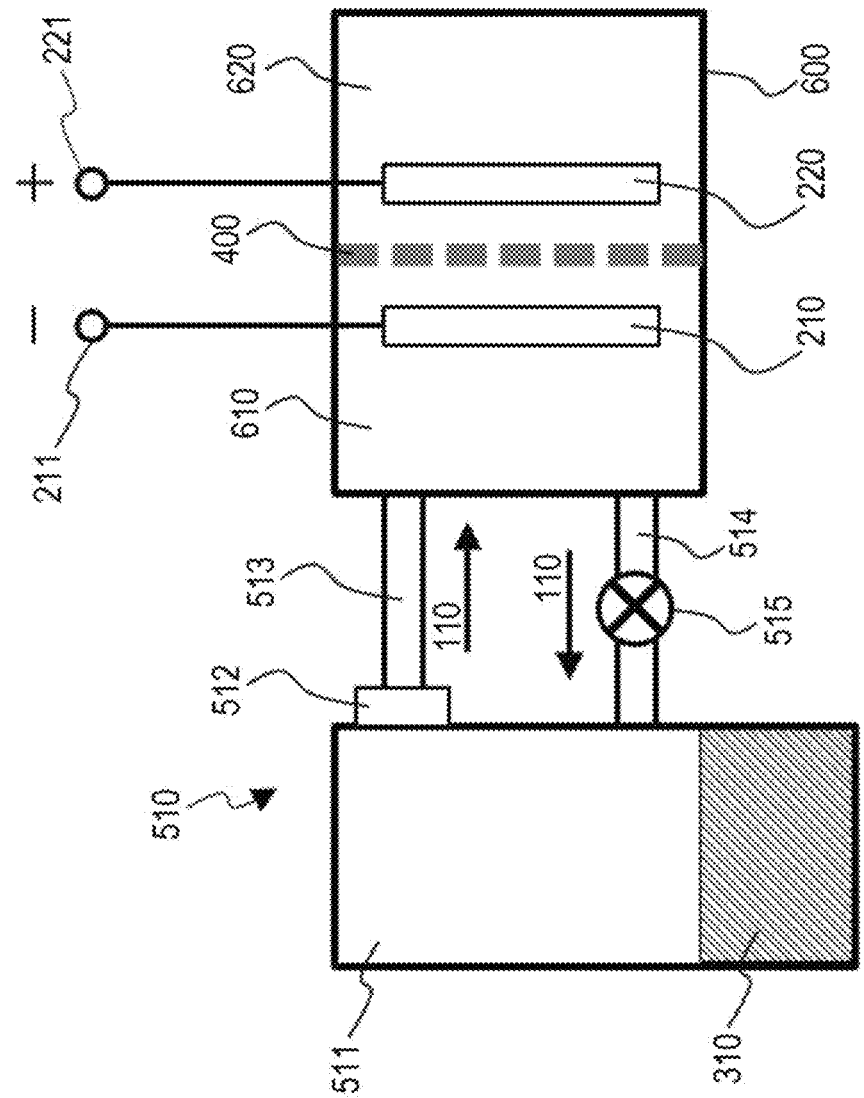
FIG. 4 is a schematic illustration showing a general structure of a flow battery in embodiment 2.

FIG. 4 is a schematic diagram showing a general structure of a flow battery 2000 in embodiment 2.

The flow battery 2000 in embodiment 2 includes, in addition to the structure of the flow battery 1000 in embodiment 1, the following structure.

Specifically, in the flow battery 2000 in embodiment 2, the first circulator 510 includes a first container 511.

The first active material 310 and the first liquid 110 are contained in the first container 511.

The first circulator 510 circulates the first liquid 110 between the first electrode 210 and the first container 511.

In the first container 511, the first active material 310 comes into contact with the first liquid 110. This causes at least one of the oxidation reaction of the charge mediator 111 by the first active material 310 and the reduction reaction of the discharge mediator 112 by the first active material 310 to proceed.

In the above structure, the first liquid 110 and the first active material 310 can come into contact with each other in the first container 511. In this case, for example, the area of contact between the first liquid 110 and the first active material 310 can be increased. Moreover, the time of contact between the first liquid 110 and the first active material 310 can be increased. This allows the oxidation reaction of the charge mediator 111 by the first active material 310 and the reduction reaction of the discharge mediator 112 by the first active material 310 to proceed more efficiently.

In embodiment 2, the first container 511 may be, for example, a tank.

In the first container 511, the first liquid 110 containing dissolved therein the charge mediator 111 and the discharge mediator 112 may be accommodated, for example, in spaces in the first active material 310 placed in the first container 511.

As shown in FIG. 4, the flow battery 2000 in embodiment 2 may further include an electrochemical reaction section 600, a positive electrode terminal 221, and a negative electrode terminal 211.

The electrochemical reaction section 600 is separated by the separator 400 into a negative electrode chamber 610 and a positive electrode chamber 620.

An electrode serving as the negative electrode (the first electrode 210 in the example shown in FIG. 4) is disposed in the negative electrode chamber 610.

The negative electrode terminal 211 is connected to the electrode serving as the negative electrode.

An electrode serving as the positive electrode (the second electrode 220 in the example shown in FIG. 4) is disposed in the positive electrode chamber 620.

The positive electrode terminal 221 is connected to the electrode serving as the positive electrode.

The negative electrode terminal 211 and the positive electrode terminal 221 are connected to, for example, a charge-discharge device. The charge-discharge device applies a voltage between the negative electrode terminal 211 and the positive electrode terminal 221 or collects electric power through the negative electrode terminal 211 and the positive electrode terminal 221.

As shown in FIG. 4, in the flow battery 2000 in embodiment 2, the first circulator 510 may include a pipe 514, a pipe 513, and a pump 515.

One end of the pipe 514 is connected to the negative electrode chamber 610 or the positive electrode chamber 620, whichever includes the first electrode 210 disposed therein (the negative electrode chamber 610 in the example shown in FIG. 4).

The other end of the pipe 514 is connected to an inlet of the first liquid 110 that is disposed in the first container 511.

One end of the pipe 513 is connected to an outlet of the first liquid 110 that is disposed in the first container 511.

The other end of the pipe 513 is connected to the negative electrode chamber 610 or the positive electrode chamber 620, whichever includes the first electrode 210 disposed therein (the negative electrode chamber 610 in the example shown in FIG. 4).

The pump 515 is disposed, for example, in the pipe 514. Alternatively, the pump 515 may be disposed in the pipe 513.

In the flow battery 2000 in embodiment 2, the first circulator 510 may include a first passage prevention member 512.

The first passage prevention member 512 prevents passage of the first active material 310.

The first passage prevention member 512 is disposed in a channel through which the first liquid 110 flows from the first container 511 to the first electrode 210 (the pipe 513 in the example shown in FIG. 4).

The above structure can prevent the first active material 310 from flowing out of the first container 511 (e.g., flowing into the first electrode 210 side). Specifically, the first active material 310 stays in the first container 511. Therefore, the flow battery provided can have a structure in which the first active material 310 itself is not circulated. This can prevent clogging of a component (e.g., a pipe) of the first circulator 510 with the first active material 310. Moreover, the occurrence of resistance loss caused by the first active material 310 flowing into the first electrode 210 side can be prevented.

The first passage prevention member 512 may be disposed, for example, at the joint between the first container 511 and the pipe 513.

The first passage prevention member 512 may be, for example, a filter that can filter out the first active material 310. In this case, the filter may be a member having pores smaller than the minimum diameter of the particles of the first active material 310. A material unreactive with the first active material 310, the first liquid 110, etc. can be used as the material of the filter. The filter may be formed of, for example, glass fiber filter paper, polypropylene nonwoven fabric, polyethylene nonwoven fabric, or a metal mesh unreactive with lithium metal.

With the above structure, even when the first active material 310 flows together with the first liquid 110 within the first container 511, the first active material 310 is prevented from flowing out of the first container 511.

In the example shown in FIG. 4, the first liquid 110 contained in the first container 511 passes through the first passage prevention member 512 and the pipe 513 and is then supplied to the negative electrode chamber 610.

The charge mediator 111 and the discharge mediator 112 dissolved in the first liquid 110 are thereby oxidized or reduced on the first electrode 210.

Then the first liquid 110 containing dissolved therein the charge mediator 111 and the discharge mediator 112 that have been oxidized or reduced passes through the pipe 514 and the pump 515 and is supplied to the first container 511.

Then the first liquid 110 containing dissolved therein the charge mediator 111 and the discharge mediator 112 undergoes at least one of the oxidation reaction of the charge mediator 111 by the first active material 310 and the reduction reaction of the discharge mediator 112 by the first active material 310.

For example, the pump 515 may be used to control the circulation of the first liquid 110. Specifically, the pump 515 may be used appropriately to start the supply of the first liquid 110, stop the supply, or control the amount of the supply.

Alternatively, a mechanism (e.g., a valve) different from the pump 515 may be used to control the circulation of the first liquid 110.

In the example in FIG. 4, the first electrode 210 is shown as the negative electrode, and the second electrode 220 is shown as the positive electrode.

When an electrode with a low relative potential is used as the second electrode 220, the first electrode 210 can serve as a positive electrode.

Specifically, the first electrode 210 may be a positive electrode, and the second electrode 220 may be a negative electrode.

Electrolyte solutions (solvents) used in the negative electrode chamber 610 and the positive electrode chamber 620 separated by the separator 400 may have different compositions.

Alternatively, the electrolyte solutions (solvents) used in the positive electrode chamber 620 and the negative electrode chamber 610 may have the same composition.

Embodiment 3

Embodiment 3 will be described. However, the description will be omitted as appropriate when it overlaps with that of embodiment 1 or 2 above.

In a structure shown in embodiment 3, electrolyte solutions circulate on both the first electrode side and the second electrode side.

Figure 5:
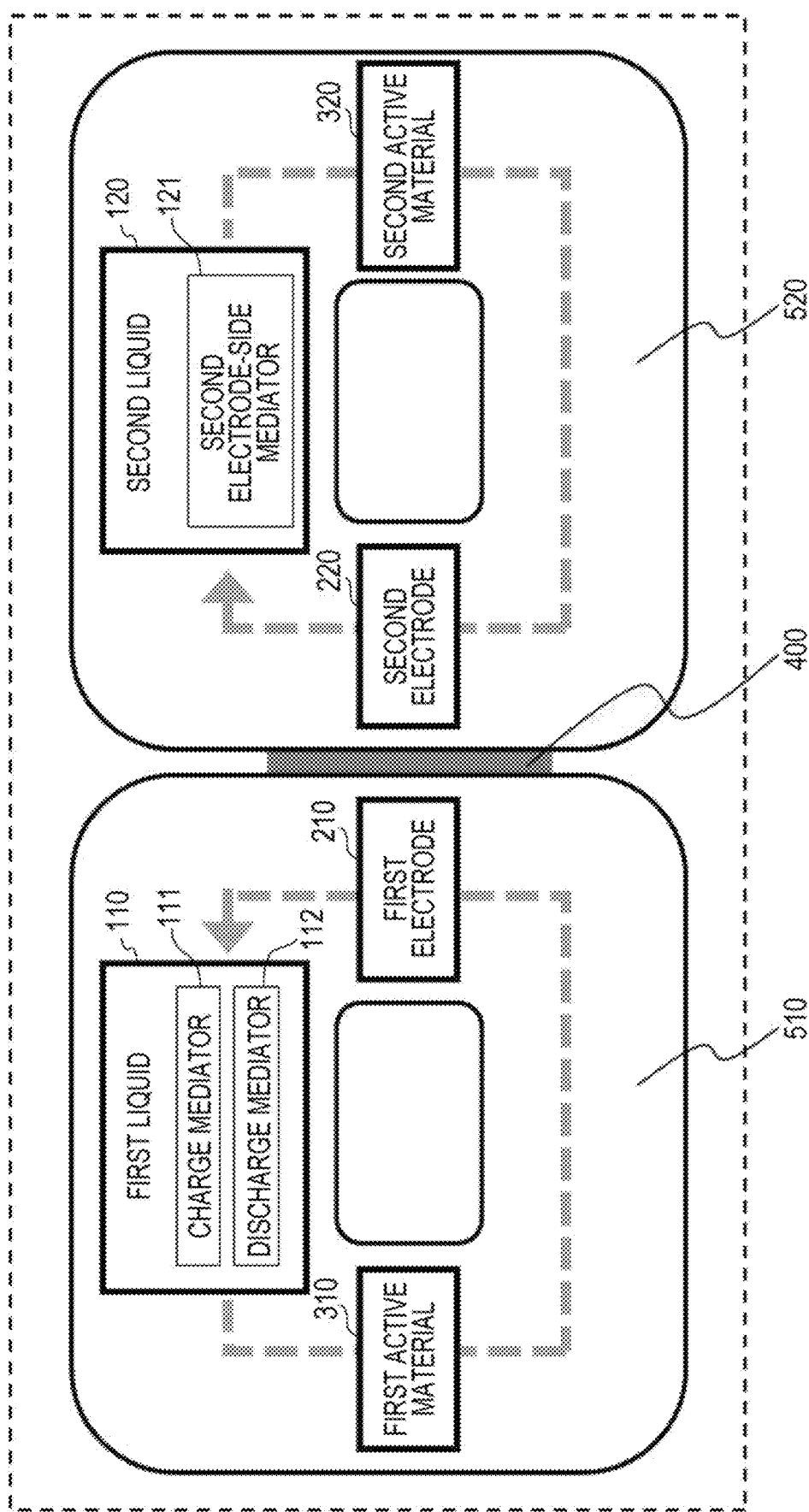
FIG. 5 is a bock diagram showing a general structure of a flow battery in embodiment 3.

FIG. 5 is a block diagram showing a general structure of a flow battery 3000 in embodiment 3.

The flow battery 3000 in embodiment 3 includes, in addition to the structure of the flow battery 1000 in embodiment 1, the following structure.

Specifically, the flow battery 3000 in embodiment 3 further includes a second liquid 120, the second electrode 220, and a second active material 320.

The second liquid 120 contains a second electrode-side mediator 121 dissolved therein.

The second electrode 220 is a counter electrode of the first electrode 210. The second electrode 220 is immersed in the second liquid 120.

The second active material 320 is immersed in the second liquid 120.

The second electrode-side mediator 121 is oxidized and reduced on the second electrode 220.

The second electrode-side mediator 121 is oxidized and reduced by the second active material 320.

The flow battery configured as above can have both a higher energy density and a longer cycle life.

Specifically, in the flow battery configured as above, although the active materials are used, these active materials themselves are not circulated. Therefore, for example, a high-capacity powdery active material for charge and discharge reactions can be used as the second active material 320. This allows a higher energy density and a higher capacity to be achieved. The battery capacity is determined by "positive electrode capacity density×negative electrode capacity density/(positive electrode capacity density+negative electrode capacity density)." Therefore, when a mediator-type flow battery structure is used for each of the first electrode 210 side and the second electrode 220 side, the capacity densities can be significantly improved.

In the above structure, only the second liquid 120 containing the second electrode-side mediator 121 dissolved therein can be circulated without circulation of the powdery active material itself. This can prevent the occurrence of, for example, clogging of pipes with the powdery active material. Therefore, the flow battery provided can have a longer cycle life.

In the above structure, when the second active material 320 used is an active material having a relatively high equilibrium potential (vs. Li/Li$^+$) (e.g., lithium iron phosphate), a material having a relatively high equilibrium potential (vs. Li/Li$^+$) (e.g., tetrathiafulvalene) can be used as the second electrode-side mediator 121. In this case, the flow battery positive electrode provided can have a higher potential. Therefore, the flow battery provided can have a higher battery voltage (discharge voltage).

In the flow battery 3000 in embodiment 3, lithium may be dissolved in the second liquid 120.

The second active material 320 may be a material having the property of occluding and releasing lithium.

During charging of the flow battery 3000 (i.e., in a state in which electrons are supplied to the first electrode 210 from the outside of the flow battery 3000 and electrons are emitted from the second electrode 220 to the outside of the flow battery 3000), the second electrode-side mediator 121 may be oxidized on the second electrode 220. Then the second electrode-side mediator 121 oxidized on the second electrode 220 may be reduced by the second active material 320, and the second active material 320 may release lithium.

During discharging of the flow battery 3000 (i.e., in a state in which electrons are emitted from the first electrode 210 to the outside of the flow battery 3000 and electrons are supplied from the outside of the flow battery 3000 to the second electrode 220), the second electrode-side mediator 121 may be reduced on the second electrode 220. Then the second electrode-side mediator 121 reduced on the second electrode 220 may be oxidized by the second active material 320, and the second active material 320 may occlude lithium.

In the above structure, the second active material 320 used may be, for example, an active material having the property of reversibly occluding and releasing lithium (e.g., lithium ions). In this case, the material design of the second active material 320 is facilitated. Moreover, a higher capacity can be achieved.

For example, when the second liquid 120 comes into contact with the second electrode 220, the second electrode-side mediator 121 is oxidized or reduced on the second electrode 220.

For example, when the second liquid 120 comes into contact with the second active material 320, the second electrode-side mediator 121 is oxidized or reduced by the second active material 320.

In the flow battery 3000 in embodiment 3, the redox potential range of the second electrode-side mediator 121 and the redox potential range of the second active material 320 may overlap each other.

In the above structure, the second active material 320 can oxidize and reduce the second electrode-side mediator 121.

In the flow battery 3000 in embodiment 3, the upper limit of the redox potential range of the second electrode-side mediator 121 may be higher than the upper limit of the redox potential range of the second active material 320.

In this case, the lower limit of the redox potential range of the second electrode-side mediator 121 may be lower than the lower limit of the redox potential range of the second active material 320.

With the above structure, the capacity of the second active material 320 can be sufficiently utilized (e.g., up to nearly 100%). Therefore, the flow battery provided can have a higher capacity.

One redox species having a plurality of redox potentials may be used as the second electrode-side mediator 121.

Alternatively, a mixture of a plurality of redox species each having a constant redox potential may be used as the second electrode-side mediator 121.

In the flow battery 3000 in embodiment 3, the second electrode-side mediator 121 may be an organic compound having oxidizing and reducing properties.

With the above structure, the solubility of the second electrode-side mediator 121 in the second liquid 120 (e.g., a nonaqueous solvent) can be increased.

In the flow battery 3000 in embodiment 3, the second electrode-side mediator 121 may be an organic compound having multiple redox potentials (e.g., two or more redox potentials).

Examples of such an organic compound capable of multi-stage redox include organic compounds having π conjugated electron clouds such as tetrathiafulvalene derivatives, quinone derivatives, and TCNQ.

In the flow battery 3000 in embodiment 3, the second electrode-side mediator 121 may be tetrathiafulvalene.

With the above structure, the second electrode-side mediator 121 provided can have relatively high two redox potentials (a lower limit of about 3.4 V and an upper limit of about 3.7 V versus the lithium reference potential). The flow battery positive electrode provided can thereby have a higher potential. Therefore, the flow battery provided can have a high battery voltage (discharge voltage).

In the flow battery 3000 in embodiment 3, the second active material 320 may be a material having the property of reversibly occluding and releasing lithium ions. For example, the second active material 320 used may be a commonly known active material for secondary batteries (such as a transition metal oxide, a fluoride, polyanions, fluorinated polyanions, or a transition metal sulfide).

In the flow battery 3000 in embodiment 3, the second active material 320 may contain lithium iron phosphate.

In the above structure, the second active material 320 can have a relatively high equilibrium potential (vs. Li/Li$^+$). Therefore, a material having a relatively high equilibrium potential (vs. Li/Li$^+$) (e.g., tetrathiafulvalene) can be used as the second electrode-side mediator 121. The flow battery positive electrode provided can thereby have a higher potential. Therefore, the flow battery provided can have a high battery voltage (discharge voltage).

A compound containing iron, manganese, or lithium (such as LiFePO$_4$ or LiMnO$_2$) and a vanadium-containing compound (such as V$_2$O$_5$) have a redox potential of 3.2 V to 3.7 V with respect to lithium. Therefore, when LiFePO$_4$, for example, is used as the second active material 320, tetrathiafulvalene may be used as the second electrode-side mediator 121.

In the flow battery 3000 in embodiment 3, the second electrode-side mediator 121 may be a quinone derivative. The quinone derivative may have multiple redox potentials of, for example, 1 V to 3 V with respect to lithium. In this case, a material having a redox potential of 1 V to 3 V with respect to lithium may be used as the second active material 320. Examples of the material having a redox potential of 1 V to 3 V with respect to lithium include compounds containing titanium, niobium, or lithium (such as Li$_4$Ti$_5$O$_{12}$ and LiNbO$_3$).

In the flow battery 3000 in embodiment 3, the second electrode-side mediator 121 may be metal-containing ions. Examples of the metal-containing ions include vanadium ions, manganese ions, and molybdenum ions that have multiple redox potentials. For example, vanadium ions have a variety of reaction stages (divalence and trivalence, trivalence and tetravalence, and tetravalence and pentavalence).

The second active material 320 used may be a powdery active material. By charging a tank with the second active material 320 in unprocessed powder form, production can be simplified, and the production cost can be reduced.

Alternatively, the second active material 320 used may be a pellet-like active material (prepared, for example, by forming a powder into pellets). By charging the tank with the second active material 320 in pellet form, the production can be simplified, and the production cost can be reduced.

Alternatively, the second active material 320 used may be an active material pelleted using a commonly known binder (such as polyvinylidene fluoride, polypropylene, polyethylene, or polyimide).

The second active material 320 used may be an active material in the form of a film fixed to a metal foil.

Alternatively, the second active material 320 used may be an active material mixed with a commonly known conductive assistant (such as carbon black or polyaniline) or an ion conductor (such as polymethyl methacrylate or polyethylene oxide).

The second active material 320 may be a material that does not dissolve (i.e., is insoluble) in the second liquid 120. In the flow battery provided in this case, the second electrode-side mediator 121 is circulated together with the second liquid 120, but the second active material 320 is not circulated.

The second liquid 120 may be, for example, a commonly known nonaqueous electrolyte solution for secondary batteries. In this case, the nonaqueous electrolyte solution is composed, for example, of a commonly known electrolyte salt (such as an electrolyte salt of a lithium ion and an anion) and a nonaqueous solvent containing the electrolyte salt dissolved therein.

The nonaqueous solvent used may be a commonly known nonaqueous solvent for secondary batteries. Specifically, the nonaqueous solvent used may be a cyclic or chain carbonate, a cyclic or chain ester, a cyclic or chain ether, a nitrile, a cyclic or chain sulfone, or a cyclic or chain sulfoxide.

Different solvents may be used for the first liquid 110 and the second liquid 120, or the same solvent may be used.

In the flow battery 3000 in embodiment 3, the first electrode 210 may be a negative electrode, and the second electrode 220 may be a positive electrode.

When an electrode with a low-relative potential is used as the second electrode 220, the first electrode 210 can server as a positive electrode.

Specifically, the first electrode 210 may be a positive electrode, and the second electrode 220 may be a negative electrode.

The second electrode 220 may have a surface serving as a reaction field for the second electrode-side mediator 121.

In this case, a material stable in the solvent for the second liquid 120 and the supporting electrolyte therefor may be used for the second electrode 220. The material used for the second electrode 220 may be stable during an electrode reaction, which is an electrochemical reaction. For example, a metal (such as stainless steel, iron, copper, or nickel), carbon, etc. may be used for the second electrode 220.

The second electrode 220 may have a structure with an increased surface area (e.g., a mesh, a nonwoven fabric, a surface roughened plate, or a sintered porous body). In this case, the second electrode 220 has a large specific surface area. This can facilitate the progress of the oxidation or reduction reaction of the second electrode-side mediator 121.

Different electrode materials may be used for the first electrode 210 and the second electrode 220, or the same electrode material may be used.

The flow battery 3000 in embodiment 3 may further include the separator 400.

The separator 400 separates the first electrode 210 and the first liquid 110 from the second electrode 220 and the second liquid 120.

The separator 400 used may have the structure shown in embodiment 1 above.

The flow battery 3000 in embodiment 3 may further include a second circulator 520.

The second circulator 520 circulates the second liquid 120 between the second electrode 220 and the second active material 320.

With the above structure, the second electrode-side mediator 121 can be circulated together with the second liquid 120 between the second electrode 220 and the second active material 320. This allows the oxidation and reduction reactions of materials to proceed more efficiently.

The second circulator 520 may include, for example, a pipe, a tank, a pump, a valve, etc.

One specific example of the second circulator 520 is a structure described later in embodiment 4.

<Description of Charge and Discharge Processes>

Charge and discharge processes of the flow battery 3000 in embodiment 3 will be described below.

The charge and discharge processes will be specifically described while the following operation example is shown.

Specifically, in this operation example, the first electrode 210 is a negative electrode and is made of stainless steel.

In this operation example, the first liquid 110 is an ether solution containing dissolved therein the charge mediator 111 and the discharge mediator 112.

In this operation example, the charge mediator 111 is one condensed aromatic compound (hereinafter denoted by ChMd).

In this operation example, the discharge mediator 112 is one condensed aromatic compound (hereinafter denoted by DchMd).

In this operation example, the first active material 310 is graphite ($C_6Li$).

In this operation example, the second electrode 220 is a positive electrode and is made of stainless steel.

In this operation example, the second liquid 120 is an ether solution containing the second electrode-side mediator 121 dissolved therein.

In this operation example, the second electrode-side mediator 121 is tetrathiafulvalene (hereinafter denoted by TTF).

In this operation example, the second active material 320 is lithium iron phosphate ($LiFePO_4$).

In this operation example, the separator 400 is a lithium ion conductive solid electrolyte membrane.

[Description of Charge Process]

First, the charge reaction will be described.

A voltage is applied between the first electrode 210 and the second electrode 220 to perform charging.

(Reaction on Positive Electrode Side)

On the second electrode 220 serving as the positive electrode, the oxidation reaction of the second electrode-side mediator 121 occurs when a voltage is applied. Specifically, the second electrode-side mediator 121 is oxidized on the surface of the second electrode 220. Electrons are thereby emitted from the second electrode 220 to the outside of the flow battery.

For example, in this operation example, the following reactions occur.

$$TTF \rightarrow TTF^+ + e^-$$

$$TTF^+ \rightarrow TTF^{2+} + e^-$$

The second electrode-side mediator 121 oxidized on the second electrode 220 is transferred (supplied) through the second circulator 520 to a position in which the second active material 320 is disposed.

In this case, the second electrode-side mediator 121 oxidized on the second electrode 220 is reduced by the second active material 320. Specifically, the second active material 320 is oxidized by the second electrode-side mediator 121. The second active material 320 thereby releases lithium.

For example, in this operation example, the following reaction occurs.

$$LiFePO_4 + TTF^{2+} \rightarrow FePO_4 + Li^+ + TTF^+$$

The second electrode-side mediator 121 reduced by the second active material 320 is transferred (supplied) through the second circulator 520 to a position in which the second electrode 220 is disposed.

In this case, the second electrode-side mediator 121 is oxidized on the surface of the second electrode 220.

For example, in this operation example, the following reaction occurs.

$$TTF^+ \rightarrow TTF^{2+} + e^-$$

Part of the lithium ions ($Li^+$) generated may be transferred to the first liquid 110 through the separator 400.

As described above, the second electrode-side mediator 121 is unchanged in the overall reaction including circulation.

However, the second active material 320 located in the position spaced apart from the second electrode 220 is brought to a charged state.

As described above, on the second electrode 220 side, $TTF^{2+}$ serves as a charge mediator.

In a fully charged state, $TTF^{2+}$ is present in the second liquid 120, and the second active material 320 is in the form of $FePO_4$. In this case, the charge potential is determined by the potential for oxidation to $TTF^{2+}$.

(Reaction on Negative Electrode Side)

When a voltage is applied, electrons are supplied from the outside of the flow battery to the first electrode 210 serving as the negative electrode. The reduction reactions of the charge mediator 111 and the discharge mediator 112 thereby occur on the first electrode 210.

For example, in this operation example, the following reactions occur.

$$ChMd + Li^+ + e^- \rightarrow ChMd \cdot Li$$

$$DchMd + Li^+ + e^- \rightarrow DchMd \cdot Li$$

The charge mediator 111 reduced on the first electrode 210 is transferred (supplied) through the first circulator 510 to a position in which the first active material 310 is disposed.

In this case, the charge mediator 111 reduced on the first electrode 210 is oxidized by the first active material 310. In other words, the first active material 310 is reduced by the charge mediator 111. The first active material 310 thereby occludes lithium and forms $C_6Li$.

For example, in this operation example, the following reaction occurs.

$$6C + ChMd \cdot Li \rightarrow C_6Li + ChMd$$

The charge mediator 111 oxidized by the first active material 310 is transferred (supplied) through the first circulator 510 to a position in which the first electrode 210 is disposed.

As described above, the charge mediator 111 is unchanged in the overall reaction including circulation.

However, the first active material 310 located in the position spaced apart from the first electrode 210 is brought to a charged state.

The above charge reaction may proceed until one of a fully charged state of the first active material 310 and a fully charged state of the second active material 320 is reached.

[Description of Discharge Process]

Next, a discharge reaction from full charge will be described.

In the full charge, the first active material 310 and the second active material 320 are in their charged states.

During the discharge reaction, electric power is outputted through the first electrode 210 and the second electrode 220.

(Reaction on Positive Electrode Side)

During discharging of the battery, electrons are supplied from the outside of the flow battery to the second electrode 220 serving as the positive electrode. The reduction reaction of the second electrode-side mediator 121 occurs on the second electrode 220. Specifically, the second electrode-side mediator 121 is reduced on the surface of the second electrode 220.

For example, in this operation example, the following reactions occur.

$$TTF^{2+}+e^-\rightarrow TTF^+$$

$$TTF^++e^-\rightarrow TTF$$

The second electrode-side mediator 121 reduced on the second electrode 220 is transferred (supplied) through the second circulator 520 to the position in which the second active material 320 is disposed.

In this case, the second electrode-side mediator 121 reduced on the second electrode 220 is oxidized by the second active material 320. In other words, the second active material 320 is reduced by the second electrode-side mediator 121. The second active material 320 thereby occludes lithium.

For example, in this operation example, the following reaction occurs.

$$FePO_4+Li^++TTF\rightarrow LiFePO_4+TTF^+$$

The second electrode-side mediator 121 oxidized by the second active material 320 is transferred (supplied) through the second circulator 520 to the position in which the second electrode 220 is disposed.

In this case, the second electrode-side mediator 121 is reduced on the surface of the second electrode 220.

For example, in this operation example, the following reaction occurs.

$$TTF^++e^-\rightarrow TTF$$

Part of the lithium ions (Li$^+$) may be supplied from the first liquid 110 through the separator 400.

As described above, the second electrode-side mediator 121 is unchanged in the overall reaction including circulation.

However, the second active material 320 located in the position spaced apart from the second electrode 220 is brought to a discharged state.

As described above, on the second electrode 220 side, TTF serves as a discharge mediator.

In a fully discharged state, TTF is present in the second liquid 120, and the second active material 320 is in the form of LiFePO$_4$. In this case, the discharge potential is determined by the potential for reduction to TTF.

(Reaction on Negative Electrode Side)

During discharging of the battery, the oxidation reactions of the charge mediator 111 and the discharge mediator 112 occur on the first electrode 210 serving as the negative electrode. Electrons are thereby emitted from the first electrode 210 to the outside of the flow battery.

For example, in this operation example, the following reactions occur.

$$DchMd\cdot Li\rightarrow DchMd+Li^++e^-$$

$$ChMd\cdot Li\rightarrow ChMd+Li^++e^-$$

The discharge mediator 112 oxidized on the first electrode 210 is transferred (supplied) through the first circulator 510 to the position in which the first active material 310 is disposed.

In this case, the discharge mediator 112 oxidized on the first electrode 210 is reduced by the first active material 310. In other words, the first active material 310 is oxidized by the discharge mediator 112. The first active material 310 thereby releases lithium.

For example, in this operation example, the following reaction occurs.

$$C_6Li+DchMd\rightarrow 6C+DchMd\cdot Li$$

The discharge mediator 112 reduced by the first active material 310 is transferred (supplied) through the first circulator 510 to the position in which the first electrode 210 is disposed.

As described above, the discharge mediator 112 is unchanged in the overall reaction including circulation.

However, the first active material 310 located in the position spaced apart from the first electrode 210 is brought to a discharged state.

The above discharge reaction may proceed until one of a fully discharged state of the first active material 310 and a fully discharged state of the second active material 320 is reached.

<Estimation of Energy Densities>

The results of estimation of the energy densities of flow batteries 3000 in embodiment 3 will be described below.

FIGS. 6, 12A, 12B, 13A, 13B, 14A, and 14B, and 15A and 15B are tables showing the results of estimation of the energy densities of the flow batteries 3000 in embodiment 3. These tables show the potential (V vs. Li/Li$^+$) of each mediator, the charge and discharge voltages (V) of each flow battery, the theoretical capacity density (Ah/L) of the flow battery, the theoretical energy density (Wh/L) of the flow battery, the volume filling factor of a power generation element, and the energy density (Wh/L) of the flow battery.

FIGS. 6, 12A, and 12B show the results of estimation of the energy densities of flow batteries 3000 in embodiment 3 under the conditions described above in the operation example when the charge mediator 111 is biphenyl or phenanthrene and the discharge mediator 112 is 2,2'-bipyridyl or trans-stilbene.

When the charge mediator 111 is biphenyl or phenanthrene and the discharge mediator 112 is 2,2'-bipyridyl, the estimated energy density of the flow battery is 570 Wh/L.

When the charge mediator 111 is biphenyl or phenanthrene and the discharge mediator 112 is trans-stilbene, the estimated energy density of the flow battery is 589 Wh/L.

The theoretical energy density of a conventional flow battery (vanadium is used) is about 38 Wh/L. As can be seen from these results, the theoretical energy density of the flow battery of the present disclosure is significantly higher than that of the conventional flow battery.

Embodiment 4

Embodiment 4 will be described. However, the description will be omitted as appropriate when it overlaps with that of any of embodiments 1 to 3 above.

FIG. 7 is a schematic illustration showing a general structure of a flow battery 4000 in embodiment 4.

The flow battery 4000 in embodiment 4 includes, in addition to the structure of the flow battery 3000 in embodiment 3, the following structure.

The flow battery 4000 in embodiment 4 includes the structure of the first circulator 510 shown in embodiment 2 above.

The flow battery 4000 in embodiment 4 further includes the electrochemical reaction section 600, the positive electrode terminal 221, and the negative electrode terminal 211 shown in embodiment 2 above.

In the flow battery 4000 in embodiment 4, the second circulator 520 includes a second container 521.

The second active material 320 and the second liquid 120 are contained in the second container 521.

The second circulator 520 circulates the second liquid 120 between the second electrode 220 and the second container 521.

In the second container 521, the second active material 320 comes into contact with the second liquid 120. This allows the second electrode-side mediator 121 to be oxidized and reduced by the second active material 320.

In the above structure, the second liquid 120 and the second active material 320 can come into contact with each other in the second container 521. In this case, for example, the area of contact between the second liquid 120 and the second active material 320 can be increased. Moreover, the time of contact between the second liquid 120 and the second active material 320 can be increased. This allows the oxidation and reduction reactions of the second electrode-side mediator 121 by the second active material 320 to proceed more efficiently.

In embodiment 4, the second container 521 may be, for example, a tank.

In the second container 521, the second liquid 120 containing the second electrode-side mediator 121 dissolved therein may be accommodated, for example, in spaces in the second active material 320 placed in the second container 521.

As shown in FIG. 7, in the flow battery 4000 in embodiment 4, the second circulator 520 may include a pipe 523, a pipe 524, and a pump 525.

One end of the pipe 524 is connected to the positive electrode chamber 620 or the negative electrode chamber 610, whichever includes the second electrode 220 disposed therein (the positive electrode chamber 620 in the example shown in FIG. 7).

The other end of the pipe 524 is connected to an inlet of the second liquid 120 that is disposed in the second container 521.

One end of the pipe 523 is connected to an outlet of the second liquid 120 that is disposed in the second container 521.

The other end of the pipe 523 is connected to the positive electrode chamber 620 or the negative electrode chamber 610, whichever includes the second electrode 220 disposed therein (the positive electrode chamber 620 in the example shown in FIG. 7).

The pump 525 is disposed, for example, in the pipe 524. Alternatively, the pump 525 may be disposed in the pipe 523.

In the flow battery 4000 in embodiment 4, the second circulator 520 may include a second passage prevention member 522.

The second passage prevention member 522 prevents passage of the second active material 320.

The second passage prevention member 522 is disposed in a channel through which the second liquid 120 flows from the second container 521 to the second electrode 220 (the pipe 523 in the example shown in FIG. 7).

The above structure can prevent the second active material 320 from flowing out of the second container 521 (e.g., flowing into the second electrode 220 side). Specifically, the second active material 320 stays in the second container 521. Therefore, the flow battery provided can have a structure in which the second active material 320 itself is not circulated. This can prevent clogging of a component (e.g., a pipe) of the second circulator 520 with the second active material 320. Moreover, the occurrence of resistance loss caused by the second active material 320 flowing into the second electrode 220 side can be prevented.

The second passage prevention member 522 may be disposed, for example, at the joint between the second container 521 and the pipe 523.

The second passage prevention member 522 may be, for example, a filter that can filter out the second active material 320. In this case, the filter may be a member having pores smaller than the minimum diameter of the particles of the second active material 320. A material unreactive with the second active material 320, the second liquid 120, etc. can be used as the material of the filter. The filter may be, for example, glass fiber filter paper, polypropylene nonwoven fabric, polyethylene nonwoven fabric, or a metal mesh unreactive with lithium metal.

With the above structure, even when the second active material 320 flows together with the second liquid 120 within the second container 521, the second active material 320 is prevented from flowing out of the second container 521.

In the example shown in FIG. 7, the second liquid 120 contained in the second container 521 passes through the second passage prevention member 522 and the pipe 523 and is then supplied to the positive electrode chamber 620.

The second electrode-side mediator 121 dissolved in the second liquid 120 is thereby oxidized or reduced on the second electrode 220.

Then the second liquid 120 containing the oxidized or reduced second electrode-side mediator 121 dissolved therein passes through the pipe 524 and the pump 525 and is supplied to the second container 521.

Then the second electrode-side mediator 121 dissolved in the second liquid 120 is oxidized or reduced by the second active material 320.

For example, the pump 525 may be used to control the circulation of the second liquid 120. Specifically, the pump 525 may be used appropriately to start the supply of the second liquid 120, stop the supply, or control the amount of the supply.

Alternatively, a mechanism (e.g., a valve) different from the pump 525 may be used to control the circulation of the second liquid 120.

In the example in FIG. 7, the first electrode 210 is shown as the negative electrode, and the second electrode 220 is shown as the positive electrode.

When an electrode with a low relative potential is used as the second electrode 220, the first electrode 210 can serve as a positive electrode.

Specifically, the first electrode 210 may be a positive electrode, and the second electrode 220 may be a negative electrode.

Embodiment 5

Embodiment 5 will be described. However, the description will be omitted as appropriate when it overlaps with that of any of embodiments 1 to 4 above.

A flow battery in embodiment 5 includes, in addition to the structures of the flow batteries in embodiments 1 to 4, the following structure.

Specifically, in the flow battery in embodiment 5, the first active material 310 contains zinc.

With the above structure, the flow battery provided can have a higher capacity than the flow batteries using graphite as the first active material 310.

In the above structure, the first active material 310 can have a relatively low equilibrium potential (vs. Li/Li$^+$). Therefore, a material having a relatively low equilibrium potential (vs. Li/Li$^+$) (e.g., a condensed aromatic compound) can be used as the discharge mediator 112. In this case, the flow battery negative electrode provided can have a lower potential. Therefore, the flow battery provided can have a high battery voltage (discharge voltage).

In embodiment 5, the composition of lithium-occluding zinc (i.e., a LiZn alloy formed during charging) used as the first active material 310 may be at least one of LiZn, Li$_2$Zn$_3$, LiZn$_2$, Li$_2$Zn$_5$, and LiZn$_4$.

When zinc is used as the first active material 310, the zinc reacts with lithium and is fully reduced (i.e., the zinc reacts with lithium to form a LiZn alloy), and the charging is completed. In this case, the potential of the LiZn alloy is about 0.2 V vs. Li/Li$^+$. Therefore, a mediator-type negative electrode can be formed by using as the charge mediator a condensed aromatic compound having a lower potential than the LiZn alloy and using as the discharge mediator a condensed aromatic compound having a higher potential than the LiZn alloy.

In embodiment 5, the charge mediator 111 may be at least one selected from the group consisting of phenanthrene, biphenyl, o-terphenyl, triphenylene, anthracene, acenaphthene, acenaphthylene, fluoranthene, and benzil.

In the above structure, the charge mediator 111 provided can be electrochemically base. More specifically, the charge mediator provided can have a lower potential (vs. Li/Li$^+$) than the LiZn alloy.

In embodiment 5, the discharge mediator 112 may be at least one selected from the group consisting of 1,10-phenanthroline, 2,2'-bipyridyl, benzophenone, trans-stilbene, 4,4'-bipyridyl, 3,3'-bipyridyl, 2,4'-bipyridyl, 2,3'-bipyridyl, cis-stilbene, acetophenone, propiophenone, butyrophenone, valerophenone, ethylenediamine, and tetraphenylcyclopentadienone.

In the above structure, the discharge mediator 112 provided can be electrochemically noble. More specifically, the discharge mediator 112 provided can have a higher potential (vs. Li/Li$^+$) than the LiZn alloy.

In embodiment 5, the discharge mediator 112 may be at least one selected from the group consisting of 2,2'-bipyridyl, trans-stilbene, 2,4'-bipyridyl, 2,3'-bipyridyl, cis-stilbene, propiophenone, butyrophenone, valerophenone, ethylenediamine, and tetraphenylcyclopentadienone.

In the above structure, the discharge mediator 112 provided can be electrochemically noble. More specifically, the discharge mediator 112 provided can have a higher potential (vs. Li/Li$^+$) than the LiZn alloy. Moreover, the discharge mediator 112 can have a relatively low equilibrium potential (vs. Li/Li$^+$). In this case, the flow battery negative electrode provided can have a lower potential. Therefore, the flow battery provided can have a high battery voltage (discharge voltage).

<Description of Charge and Discharge Processes>

Charge and discharge processes of the flow battery in embodiment 5 will next be described.

In this operation example, the first active material 310 is zinc (LiZn).

Processes other than the following processes may be the same as those in the charge and discharge processes described in embodiment 1 or 3 above.

[Reaction on Negative Electrode Side in Charge Process]

The charge mediator 111 reduced on the first electrode 210 is oxidized by the first active material 310. In other words, the first active material 310 is reduced by the charge mediator 111. In this case, zinc serving as the first active material 310 reacts with lithium to form LiZn.

For example, in this operation example, the following reaction occurs.

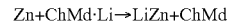

Zn+ChMd·Li→LiZn+ChMd

[Reaction on Negative Electrode Side in Discharge Process]

The discharge mediator 112 oxidized on the first electrode 210 is reduced by the first active material 310. In other words, the first active material 310 is oxidized by the discharge mediator 112. In this case, the first active material 310 releases lithium.

For example, in this operation example, the following reaction occurs.

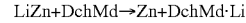

LiZn+DchMd→Zn+DchMd·Li

<Estimation of Energy Densities>

The results of estimation of the energy densities of flow batteries in embodiment 5 will be described below.

FIGS. 16A to 16D and 17A to 17D are tables showing the results of estimation of the energy densities of the flow batteries in embodiment 5. These tables show the potential (V vs. Li/Li$^+$) of each mediator, the charge and discharge voltages (V) of each flow battery, the theoretical capacity density (Ah/L) of the flow battery, the theoretical energy density (Wh/L) of the flow battery, the volume filling factor of a power generation element, and the energy density (Wh/L) of the flow battery.

As can be seen from FIGS. 16A to 16D and 17A to 17D, the theoretical energy density of each flow battery in embodiment 5 is significantly higher than that of the conventional flow battery.

Embodiment 6

Embodiment 6 will be described. However, the description will be omitted as appropriate when it overlaps with that of any of embodiments 1 to 4 above.

A flow battery in embodiment 6 includes, in addition to the structures of the flow batteries in embodiments 1 to 4, the following structure.

Specifically, in the flow battery in embodiment 6, the first active material 310 contains tin.

With the above structure, the flow battery provided can have a higher capacity than the flow batteries using graphite as the first active material 310.

In the above structure, the first active material 310 can have a relatively low equilibrium potential (vs. Li/Li$^+$). Therefore, a material having a relatively low equilibrium potential (vs. Li/Li$^+$) (e.g., a condensed aromatic compound) can be used as the discharge mediator 112. In this case, the flow battery negative electrode provided can have a lower potential. Therefore, the flow battery provided can have a high battery voltage (discharge voltage).

In embodiment 6, the composition of lithium-occluding tin (i.e., a LiSn alloy formed during charging) used as the first active material 310 may be at least one of LiSn, Li$_2$Sn$_5$, Li$_5$Sn$_2$, Li$_7$Sn$_2$, Li$_7$Sn$_3$, Li$_{13}$Sn$_5$, and Li$_{22}$Sn$_5$.

When tin is used as the first active material 310, the tin reacts with lithium and is fully reduced (i.e., the tin reacts with lithium to form a LiSn alloy), and the charging is completed. In this case, the potential of the LiSn alloy is about 0.5 V vs. Li/Li$^+$. Therefore, a mediator-type negative electrode can be formed by using as the charge mediator a condensed aromatic compound having a lower potential than the LiSn alloy and using as the discharge mediator a condensed aromatic compound having a higher potential than the LiSn alloy.

In embodiment 6, the charge mediator 111 may be at least one selected from the group consisting of phenanthrene, biphenyl, o-terphenyl, triphenylene, anthracene, acenaphthene, acenaphthylene, fluoranthene, 2,2'-bipyridyl, trans-stilbene, cis-stilbene, propiophenone, butyrophenone, valerophenone, ethylenediamine, benzil, and tetraphenylcyclopentadienone.

In the above structure, the charge mediator 111 provided can be electrochemically base. More specifically, the charge mediator provided can have a lower potential (vs. Li/Li$^+$) than the LiSn alloy.

In embodiment 6, the discharge mediator 112 may be at least one selected from the group consisting of 1,10-phenanthroline, benzophenone, 4,4'-bipyridyl, 3,3'-bipyridyl, 2,4'-bipyridyl, 2,3'-bipyridyl, and acetophenone.

In the above structure, the discharge mediator 112 provided can be electrochemically noble. More specifically, the discharge mediator 112 provided can have a higher potential (vs. Li/Li$^+$) than the LiSn alloy.

In embodiment 6, the discharge mediator 112 may be at least one selected from the group consisting of benzophenone, 2,4'-bipyridyl, and 2,3'-bipyridyl.

In the above structure, the discharge mediator 112 provided can be electrochemically noble. More specifically, the discharge mediator 112 provided can have a higher potential (vs. Li/Li$^+$) than the LiSn alloy. Moreover, the discharge mediator 112 can have a relatively low equilibrium potential (vs. Li/Li$^+$). In this case, the flow battery negative electrode provided can have a lower potential. Therefore, the flow battery provided can have a high battery voltage (discharge voltage).

<Description of Charge and Discharge Processes>

Charge and discharge processes of the flow battery in embodiment 6 will next be described.

In this operation example, the first active material 310 is tin (LiSn).

Processes other than the following processes may be the same as those in the charge and discharge processes described in embodiment 1 or 3 above.

[Reaction on Negative Electrode Side in Charge Process]

The charge mediator 111 reduced on the first electrode 210 is oxidized by the first active material 310. In other words, the first active material 310 is reduced by the charge mediator 111. In this case, tin serving as the first active material 310 reacts with lithium to form LiSn.

For example, in this operation example, the following reaction occurs.

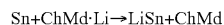

[Reaction on Negative Electrode Side in Discharge Process]

The discharge mediator 112 oxidized on the first electrode 210 is reduced by the first active material 310. In other words, the first active material 310 is oxidized by the discharge mediator 112. In this case, the first active material 310 releases lithium.

For example, in this operation example, the following reaction occurs.

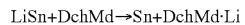

<Estimation of Energy Densities>

The results of estimation of the energy densities of flow batteries in embodiment 6 will be described below.

FIGS. 18A to 18D, 19A to 19D, 20A to 20D, and 21A to 20D are tables showing the results of estimation of the energy densities of the flow batteries in embodiment 6. These tables show the potential (V vs. Li/Li$^+$) of each mediator, the charge and discharge voltages (V) of each flow battery, the theoretical capacity density (Ah/L) of the flow battery, the theoretical energy density (Wh/L) of the flow battery, the volume filling factor of a power generation element, and the energy density (Wh/L) of the flow battery.

As can be seen from FIGS. 18A to 18D, 19A to 19D, 20A to 20D, and 21A to 20D, the theoretical energy density of each flow battery in embodiment 6 is significantly higher than that of the conventional flow battery.

Embodiment 7

Embodiment 7 will be described. However, the description will be omitted as appropriate when it overlaps with that of any of embodiments 1 to 5 above.

A flow battery in embodiment 7 includes, in addition to the structures of the flow batteries in embodiments 1 to 4, the following structure.

Specifically, in the flow battery in embodiment 7, the first active material 310 contains germanium.

With the above structure, the flow battery provided can have a higher capacity than the flow batteries using graphite as the first active material 310.

In the above structure, the first active material 310 can have a relatively low equilibrium potential (vs. Li/Li$^+$). Therefore, a material having a relatively low equilibrium potential (vs. Li/Li$^+$) (e.g., a condensed aromatic compound) can be used as the discharge mediator 112. In this case, the flow battery negative electrode provided can have a lower potential. Therefore, the flow battery provided can have a high battery voltage (discharge voltage).

In embodiment 7, the composition of lithium-occluding germanium (i.e., a LiGe alloy formed during charging) used as the first active material 310 may be at least one of GeLi$_3$ and Ge$_5$Li$_{22}$.

When germanium is used as the first active material 310, the germanium reacts with lithium and is fully reduced (i.e., the germanium reacts with lithium to form a LiGe alloy), and the charging is completed. In this case, the potential of the LiGe alloy is about 0.5 V vs. Li/Li$^+$. Therefore, a mediator-type negative electrode can be formed by using as the charge mediator a condensed aromatic compound having a lower potential than the LiGe alloy and using as the discharge mediator a condensed aromatic compound having a higher potential than the LiGe alloy.

In embodiment 7, the charge mediator 111 may be at least one selected from the group consisting of phenanthrene, biphenyl, o-terphenyl, triphenylene, anthracene, acenaphthene, acenaphthylene, fluoranthene, 2,2'-bipyridyl, trans-stilbene, cis-stilbene, propiophenone, butyrophenone, valerophenone, ethylenediamine, benzil, and tetraphenylcyclopentadienone.

In the above structure, the charge mediator 111 provided can be electrochemically base. More specifically, the charge mediator provided can have a lower potential (vs. Li/Li$^+$) than the LiGe alloy.

In embodiment 7, the discharge mediator 112 may be at least one selected from the group consisting of 1,10-phenanthroline, benzophenone, 4,4'-bipyridyl, 3,3'-bipyridyl, 2,4'-bipyridyl, 2,3'-bipyridyl, and acetophenone.

In the above structure, the discharge mediator 112 provided can be electrochemically noble. More specifically, the discharge mediator 112 provided can have a higher potential (vs. Li/Li$^+$) than the LiGe alloy.

In embodiment 7, the discharge mediator 112 may be at least one selected from the group consisting of benzophenone, 2,4'-bipyridyl, and 2,3'-bipyridyl.

In the above structure, the discharge mediator 112 provided can be electrochemically noble. More specifically, the discharge mediator 112 provided can have a higher potential (vs. Li/Li$^+$) than the LiGe alloy. Moreover, the discharge mediator 112 can have a relatively low equilibrium potential (vs. Li/Li$^+$). In this case, the flow battery negative electrode provided can have a lower potential. Therefore, the flow battery provided can have a high battery voltage (discharge voltage).

<Description of Charge and Discharge Processes>

Charge and discharge processes of the flow battery in embodiment 7 will next be described.

In this operation example, the first active material 310 is germanium (GeLi$_3$).

Processes other than the following processes may be the same as those in the charge and discharge processes described in embodiment 1 or 3 above.

[Reaction on Negative Electrode Side in Charge Process]

The charge mediator 111 reduced on the first electrode 210 is oxidized by the first active material 310. In other words, the first active material 310 is reduced by the charge mediator 111. In this case, germanium serving as the first active material 310 reacts with lithium to form GeLi$_3$.

For example, in this operation example, the following reaction occurs.

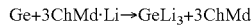
Ge+3ChMd·Li→GeLi$_3$+3ChMd

[Reaction on Negative Electrode Side in Discharge Process]

The discharge mediator 112 oxidized on the first electrode 210 is reduced by the first active material 310. In other words, the first active material 310 is oxidized by the discharge mediator 112. In this case, the first active material 310 releases lithium.

For example, in this operation example, the following reaction occurs.

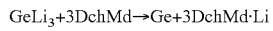
GeLi$_3$+3DchMd→Ge+3DchMd·Li

<Estimation of Energy Densities>

The results of estimation of the energy densities of flow batteries in embodiment 7 will be described below.

FIGS. 22A to 22D, 23A to 23D, 24A to 24D, and 25A to 25D are tables showing the results of estimation of the energy densities of the flow batteries in embodiment 7. These tables show the potential (V vs. Li/Li$^+$) of each mediator, the charge and discharge voltages (V) of each flow battery, the theoretical capacity density (Ah/L) of the flow battery, the theoretical energy density (Wh/L) of the flow battery, the volume filling factor of a power generation element, and the energy density (Wh/L) of the flow battery.

As can be seen from FIGS. 22A to 22D, 23A to 23D, 24A to 24D, and 25A to 25D, the theoretical energy density of each flow battery in embodiment 7 is significantly higher than that of the conventional flow battery.

Embodiment 8

Embodiment 8 will be described. However, the description will be omitted as appropriate when it overlaps with that of any of embodiments 1 to 4 above.

A flow battery in embodiment 8 includes, in addition to the structures of the flow batteries in embodiments 1 to 4, the following structure.

Specifically, in the flow battery in embodiment 8, the first active material 310 contains aluminum.

With the above structure, the flow battery provided can have a higher capacity than the flow batteries using graphite as the first active material 310.

In the above structure, the first active material 310 can have a relatively low equilibrium potential (vs. Li/Li$^+$). Therefore, a material having a relatively low equilibrium potential (vs. Li/Li$^+$) (e.g., a condensed aromatic compound) can be used as the discharge mediator 112. In this case, the flow battery negative electrode provided can have a lower potential. Therefore, the flow battery provided can have a high battery voltage (discharge voltage).

In embodiment 8, the composition of lithium-occluding aluminum (i.e., a LiAl alloy formed during charging) used as the first active material 310 may be LiAl.

When aluminum is used as the first active material 310, the aluminum reacts with lithium and is fully reduced (i.e., the aluminum reacts with lithium to form a LiAl alloy), and the charging is completed. In this case, the potential of the LiAl alloy is about 0.4 V vs. Li/Li$^+$. Therefore, a mediator-type negative electrode can be formed by using as the charge mediator a condensed aromatic compound having a lower potential than the LiAl alloy and using as the discharge mediator a condensed aromatic compound having a higher potential than the LiAl alloy.

In embodiment 8, the charge mediator 111 may be at least one selected from the group consisting of phenanthrene, biphenyl, o-terphenyl, triphenylene, anthracene, acenaphthene, acenaphthylene, fluoranthene, trans-stilbene, butyrophenone, valerophenone, ethylenediamine, benzil, and tetraphenylcyclopentadienone.

In the above structure, the charge mediator 111 provided can be electrochemically base. More specifically, the charge mediator provided can have a lower potential (vs. Li/Li$^+$) than the LiAl alloy.

In embodiment 8, the discharge mediator 112 may be at least one selected from the group consisting of 1,10-phenanthroline, 2,2'-bipyridyl, benzophenone, 4,4'-bipyridyl, 3,3'-bipyridyl, 2,4'-bipyridyl, 2,3'-bipyridyl, cis-stilbene, acetophenone, and propiophenone.

In the above structure, the discharge mediator 112 provided can be electrochemically noble. More specifically, the discharge mediator 112 provided can have a higher potential (vs. Li/Li$^+$) than the LiAl alloy.

In embodiment 8, the discharge mediator 112 may be at least one selected from the group consisting of 2,2'-bipyridyl, benzophenone, 2,4'-bipyridyl, 2,3'-bipyridyl, cis-stilbene, and propiophenone.

In the above structure, the discharge mediator 112 provided can be electrochemically noble. More specifically, the discharge mediator 112 provided can have a higher potential (vs. Li/Li$^+$) than the LiAl alloy. Moreover, the discharge mediator 112 can have a relatively low equilibrium potential (vs. Li/Li$^+$). In this case, the flow battery negative electrode provided can have a lower potential. Therefore, the flow battery provided can have a high battery voltage (discharge voltage).

<Description of Charge and Discharge Processes>

Charge and discharge processes of the flow battery in embodiment 8 will next be described.

In this operation example, the first active material 310 is aluminum WAD.

Processes other than the following processes may be the same as those in the charge and discharge processes described in embodiment 1 or 3 above.

[Reaction on Negative Electrode Side in Charge Process]

The charge mediator 111 reduced on the first electrode 210 is oxidized by the first active material 310. In other words, the first active material 310 is reduced by the charge mediator 111. In this case, aluminum serving as the first active material 310 reacts with lithium to form LiAl.

For example, in this operation example, the following reaction occurs.

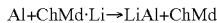

Al+ChMd·Li→LiAl+ChMd

[Reaction on Negative Electrode Side in Discharge Process]

The discharge mediator 112 oxidized on the first electrode 210 is reduced by the first active material 310. In other words, the first active material 310 is oxidized by the discharge mediator 112. In this case, the first active material 310 releases lithium.

For example, in this operation example, the following reaction occurs.

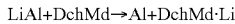

LiAl+DchMd→Al+DchMd·Li

<Estimation of Energy Densities>

The results of estimation of the energy densities of flow batteries in embodiment 8 will be described below.

FIGS. 26A to 26D, 27A to 27D, 28A to 28D, and 29 are tables showing the results of estimation of the energy densities of the flow batteries in embodiment 8. These tables show the potential (V vs. Li/Li$^+$) of each mediator, the charge and discharge voltages (V) of each flow battery, the theoretical capacity density (Ah/L) of the flow battery, the theoretical energy density (Wh/L) of the flow battery, the volume filling factor of a power generation element, and the energy density (Wh/L) of the flow battery.

As can be seen from FIGS. 26A to 26D, 27A to 27D, 28A to 28D, and 29, the theoretical energy density of each flow battery in embodiment 8 is significantly higher than that of the conventional flow battery.

Embodiment 9

Embodiment 9 will be described. However, the description will be omitted as appropriate when it overlaps with that of any of embodiments 1 to 5 above.

A flow battery in embodiment 9 includes, in addition to the structures of the flow batteries in embodiments 1 to 4, the following structure.

Specifically, in the flow battery in embodiment 9, the first active material 310 contains silicon.

With the above structure, the flow battery provided can have a higher capacity than the flow batteries using graphite as the first active material 310.

In the above structure, the first active material 310 can have a relatively low equilibrium potential (vs. Li/Li$^+$). Therefore, a material having a relatively low equilibrium potential (vs. Li/Li$^+$) (e.g., a condensed aromatic compound) can be used as the discharge mediator 112. In this case, the flow battery negative electrode provided can have a lower potential. Therefore, the flow battery provided can have a high battery voltage (discharge voltage).

In embodiment 9, the composition of lithium-occluding silicon (i.e., a LiSi alloy formed during charging) used as the first active material 310 may be at least one of $Li_7Si_3$, $Li_{12}Si_7$, $Li_{13}Si_4$, and $Li_{22}Si_5$.

When silicon is used as the first active material 310, the silicon reacts with lithium and is fully reduced (i.e., the silicon reacts with lithium to form a LiSi alloy), and the charging is completed. In this case, the potential of the LiSi alloy is about 0.4 V vs. Li/Li$^+$. Therefore, a mediator-type negative electrode can be formed by using as the charge mediator a condensed aromatic compound having a lower potential than the LiSi alloy and using as the discharge mediator a condensed aromatic compound having a higher potential than the LiSi alloy.

In embodiment 9, the charge mediator 111 may be at least one selected from the group consisting of phenanthrene, biphenyl, o-terphenyl, triphenylene, anthracene, acenaphthene, acenaphthylene, fluoranthene, trans-stilbene, butyrophenone, valerophenone, ethylenediamine, benzil, and tetraphenylcyclopentadienone.

In the above structure, the charge mediator 111 provided can be electrochemically base. More specifically, the charge mediator provided can have a lower potential (vs. Li/Li$^+$) than the LiSi alloy.

In embodiment 9, the discharge mediator 112 may be at least one selected from the group consisting of 1,10-phenanthroline, 2,2'-bipyridyl, benzophenone, 4,4'-bipyridyl, 3,3'-bipyridyl, 2,4'-bipyridyl, 2,3'-bipyridyl, cis-stilbene, acetophenone, and propiophenone.

In the above structure, the discharge mediator 112 provided can be electrochemically noble. More specifically, the discharge mediator 112 provided can have a higher potential (vs. Li/Li$^+$) than the LiSi alloy.

In embodiment 9, the discharge mediator 112 may be at least one selected from the group consisting of 2,2'-bipyridyl, benzophenone, 2,4'-bipyridyl, 2,3'-bipyridyl, cis-stilbene, and propiophenone.

In the above structure, the discharge mediator 112 provided can be electrochemically noble. More specifically, the discharge mediator 112 provided can have a higher potential (vs. Li/Li$^+$) than the LiSi alloy. Moreover, the discharge mediator 112 can have a relatively low equilibrium potential (vs. Li/Li$^+$). In this case, the flow battery negative electrode provided can have a lower potential. Therefore, the flow battery provided can have a high battery voltage (discharge voltage).

<Description of Charge and Discharge Processes>

Charge and discharge processes of the flow battery in embodiment 9 will next be described.

In this operation example, the first active material 310 is silicon ($Li_7Si_3$).

Processes other than the following processes may be the same as those in the charge and discharge processes described in embodiment 1 or 3 above.

[Reaction on Negative Electrode Side in Charge Process]

The charge mediator 111 reduced on the first electrode 210 is oxidized by the first active material 310. In other words, the first active material 310 is reduced by the charge mediator 111. In this case, silicon serving as the first active material 310 reacts with lithium to form $Li_7Si_3$.

For example, in this operation example, the following reaction occurs.

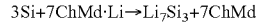

3Si+7ChMd·Li→Li$_7$Si$_3$+7ChMd

[Reaction on Negative Electrode Side in Discharge Process]

The discharge mediator 112 oxidized on the first electrode 210 is reduced by the first active material 310. In other words, the first active material 310 is oxidized by the discharge mediator 112. In this case, the first active material 310 releases lithium.

For example, in this operation example, the following reaction occurs.

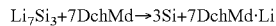

$Li_7Si_3 + 7DchMd \rightarrow 3Si + 7DchMd \cdot Li$

<Estimation of Energy Densities>

The results of estimation of the energy densities of flow batteries in embodiment 9 will be described below.

FIGS. 30A to 30D, 31A to 31D, 32A to 32D, and 33 are tables showing the results of estimation of the energy densities of the flow batteries in embodiment 9. These tables show the potential (V vs. Li/Li$^+$) of each mediator, the charge and discharge voltages (V) of each flow battery, the theoretical capacity density (Ah/L) of the flow battery, the theoretical energy density (Wh/L) of the flow battery, the volume filling factor of a power generation element, and the energy density (Wh/L) of the flow battery.

As can be seen from FIGS. 30A to 30D, 31A to 31D, 32A to 32D, and 33, the theoretical energy density of each flow battery in embodiment 9 is significantly higher than that of the conventional flow battery.

Embodiment 10

Embodiment 10 will be described. However, the description will be omitted as appropriate when it overlaps with that of any of embodiments 1 to 4 above.

A flow battery in embodiment 10 includes, in addition to the structure of the above-described flow battery 1000 in embodiment 1, the following structure.

Specifically, the flow battery in embodiment 10 includes the first liquid 110, the first electrode 210, the first active material 310, a second liquid 120, the second electrode 220, and an electrolyte salt.

The first liquid 110 includes dissolved therein the charge mediator 111 and the discharge mediator 112.

The first electrode 210 is immersed in the first liquid 110.

The first active material 310 is immersed in the first liquid 110.

The second electrode 220 is a counter electrode of the first electrode 210. The second electrode 220 is immersed in the second liquid 120.

The equilibrium potential of the charge mediator 111 is lower than the equilibrium potential of the first active material 310.

The equilibrium potential of the discharge mediator 112 is higher than the equilibrium potential of the first active material 310.

The electrolyte salt is dissolved in at least one of the first liquid 110 and the second liquid 120.

The concentration of the electrolyte salt in the first liquid 110 is equal to or lower than the concentration of the charge mediator 111 in the first liquid 110.

With the above structure, the flow battery provided can have a high energy density. Specifically, when the concentration of the electrolyte salt in the first liquid 110 is set to be equal to or lower than the concentration of the charge mediator 111, the equilibrium potential of the charge mediator 111 can be easily maintained. In other words, a significant increase in the equilibrium potential of the charge mediator 111 (an increase caused by the electrolyte salt) can be prevented. This can prevent the equilibrium potential of the charge mediator 111 from exceeding the equilibrium potential of the first active material 310. Therefore, the charge mediator 111 can reduce the first active material 310. This allows the flow battery provided to utilize the capacity of the first active material 310. Therefore, the flow battery provided can have a high energy density.

In the above structure, the electrolyte salt is dissolved in at least one liquid of the first liquid 110 and the second liquid 120. This can increase the ion conductivity of the at least one liquid.

In embodiment 10, the concentration of the electrolyte salt in the first liquid 110 may be lower than the concentration of the charge mediator 111 in the first liquid 110.

In the above structure, the equilibrium potential of the charge mediator 111 can be easily maintained. In other words, a significant increase in the equilibrium potential of the charge mediator 111 (an increase caused by the electrolyte salt) can be further prevented. Therefore, the flow battery provided can have a higher energy density.

In embodiment 10, the concentration of the electrolyte salt in the first liquid 110 may be equal to or lower than the concentration of the discharge mediator 112 in the first liquid 110.

In the above structure, the flow battery provided can have a higher battery voltage (discharge voltage) and a higher energy density. Specifically, when the concentration of the electrolyte salt in the first liquid 110 is set to be equal to or lower than the concentration of the discharge mediator 112, the equilibrium potential of the discharge mediator 112 can be easily maintained. In other words, a significant increase in the equilibrium potential of the discharge mediator 112 (an increase caused by the electrolyte salt) can be prevented. In this case, the flow battery negative electrode provided can have a lower potential. Therefore, the flow battery provided can have a higher battery voltage (discharge voltage).

In embodiment 10, the concentration of the electrolyte salt in the first liquid 110 may be lower than the concentration of the discharge mediator 112 in the first liquid 110.

In the above structure, the equilibrium potential of the discharge mediator 112 can be easily maintained. In other words, a significant increase in the equilibrium potential of the discharge mediator 112 (an increase caused by the electrolyte salt) can be further prevented. In this case, the flow battery negative electrode provided can have a lower potential. Therefore, the flow battery provided can have a higher battery voltage (discharge voltage).

The flow battery in embodiment 10 may further include the separator 400.

The separator 400 separates the first electrode 210 and the first liquid 110 from the second electrode 220 and the second liquid 120.

In this case, the concentration of the electrolyte salt in the first liquid 110 may be lower than the concentration of the electrolyte salt in the second liquid 120.

In the above structure, the equilibrium potentials of the charge mediator 111 and the discharge mediator 112 can be easily maintained (changes in the equilibrium potentials can be further reduced). Therefore, the flow battery provided can have a high battery voltage (discharge voltage). Moreover, the flow battery provided can have a high energy density.

In embodiment 10, the electrolyte salt may be dissolved in the second liquid 120. In this case, the electrolyte salt may not be dissolved in the first liquid 110. Specifically, the concentration of the electrolyte salt in the first liquid 110 may be 0M.

In the above structure, the equilibrium potentials of the charge mediator 111 and the discharge mediator 112 can be easily maintained (changes in the equilibrium potentials can be further reduced). Therefore, the flow battery provided can have a higher battery voltage (discharge voltage). Moreover, the flow battery provided can have a higher energy density.

In embodiment 10, the first electrode 210 may be a negative electrode, and the second electrode 220 may be a positive electrode.

In embodiment 10, the electrolyte salt may be a lithium salt. The lithium salt used may be $LiBF_4$, $LiSbF_6$, $LiAsF_6$, $LiCF_3SO_3$, $LiN(SO_2CF_3)_2$, $LiN(SO_2C_2F_5)_2$, $LiN(SO_2CF_3)(SO_2C_4F_9)$, $LiC(SO_2CF_3)_3$, or $LiN(SO_2F)_2$. The lithium salt used may be one selected from these lithium salts. Alternatively, a mixture of two or more selected from these lithium salts may be used.

In embodiment 10, the electrolyte salt may be at least one selected from the group consisting of $LiBF_4$, $LiN(SO_2CF_3)_2$, $LiN(SO_2F)_2$, and $LiCF_3SO_3$.

FIGS. 34, 35, 36, and 37 are tables showing the results of measurement of the potentials of biphenyl solutions.

Each sample was prepared by dissolving biphenyl, i.e., a condensed aromatic compound, and an electrolyte salt in a 2-methyltetrahydrofuran (2MeTHF) solution at molar concentrations (M) shown in one of the tables. In samples shown in FIG. 34, $LiBF_4$ was used as the electrolyte salt. In samples shown in FIG. 35, $LiN(SO_2CF_3)_2$ was uses as the electrolyte salt. In samples shown in FIG. 36, $LiN(SO_2F)_2$ was used as the electrolyte salt. In samples shown in FIG. 37, $LiCF_3SO_3$ was used as the electrolyte salt. Potential measurement cells containing respective samples poured therein were produced, and the potential of each cell was measured. The potentials (V vs. Li/Li$^+$) measured with respect to lithium metal are shown in the tables.

As can be seen from FIGS. 34 to 37, when the concentration of the electrolyte salt is higher than the concentration of biphenyl, the equilibrium potential of biphenyl with respect to the potential of lithium metal increases as the concentration of the electrolyte salt increases.

However, when the concentration of the electrolyte salt is equal to or lower than the concentration of biphenyl, a significant increase in the equilibrium potential of biphenyl is prevented. For example, when the concentration of the electrolyte salt is equal to or lower than the concentration of biphenyl, the equilibrium potential of biphenyl can be maintained at 0.2 V vs. Li/Li$^+$ or lower.

FIG. 38 is a table showing the results of measurement of the potentials of trans-stilbene solutions.

Each sample was prepared by dissolving trans-stilbene, i.e., a condensed aromatic compound, and $LiBF_4$, i.e., an electrolyte salt, in a 2-methyltetrahydrofuran (2MeTHF) solution at molar concentrations shown in FIG. 38. Potential measurement cells containing respective samples poured therein were produced, and the potential of each cell was measured. FIG. 38 shows potentials (V vs. Li/Li$^+$) measured with respect to lithium metal.

As can be seen from FIG. 38, when the concentration of the electrolyte salt is higher than the concentration of trans-stilbene, the equilibrium potential of trans-stilbene with respect to the potential of lithium metal increases as the concentration of the electrolyte salt increases.

However, when the concentration of the electrolyte salt is equal to or lower than the concentration of trans-stilbene, a significant increase in the equilibrium potential of trans-stilbene is prevented. For example, when the concentration of electrolyte salt is equal to or lower than the concentration of trans-stilbene, the equilibrium potential of trans-stilbene can be maintained within the range of 0.2 to 0.6 V vs. Li/Li$^+$.

<Estimation of Energy Densities>

The results of estimation of the energy densities of flow batteries in embodiment 10 will be described below.

FIG. 39 is a table showing the results of estimation of the energy densities of the flow batteries in embodiment 10.

FIG. 39 shows the results of estimation of the energy densities under the conditions described above in the operation example of the charge and discharge processes of the flow battery 3000 in embodiment 3 when the charge mediator 111 of the negative electrode is biphenyl and the discharge mediator 112 of the negative electrode is trans-stilbene.

In the computational examples shown in FIG. 39, the concentration of biphenyl in the first liquid 110 is 0.1M. The concentration of trans-stilbene in the first liquid 110 is 0.1M.

"Computational example A" in FIG. 39 is a computational example under the condition that the electrolyte salt is not dissolved in the first liquid 110. Under the condition in "computational example A," an increase in the potential of the charge mediator of the negative electrode and an increase in the potential of the discharge mediator of the negative electrode (increases caused by the electrolyte salt) do not occur. Therefore, the discharge voltage of the flow battery is high (3.1 V). The estimated energy density of the flow battery is 589 Wh/L.

"Computational example B" in FIG. 39 is a computational example under the condition that $LiBF_4$, i.e., the electrolyte salt, is dissolved in the first liquid 110 at a concentration of "0.05M." Under the condition in "computational example B," although the potential of the charge mediator of the negative electrode and the potential of the discharge mediator of the negative electrode are increased slightly (increases caused by the electrolyte salt), the potentials are not increased significantly. Therefore, the discharge voltage of the flow battery is high (3.07 V). The estimated energy density of the flow battery is 584 Wh/L. Since the electrolyte salt is dissolved in the first liquid 110, the ion conductivity of the first liquid 110 is improved.

"Computational example C" in FIG. 39 is a computational example under the condition that $LiBF_4$, i.e., the electrolyte salt, is dissolved in the first liquid 110 at a concentration of "0.1M." Under the condition in "computational example C," although the potential of the charge mediator of the negative electrode and the potential of the discharge mediator of the negative electrode are increased slightly (increases caused by the electrolyte salt), the increases in potentials are not significant. Therefore, the discharge voltage of the flow battery is high (2.98 V). The estimated energy density of the flow battery is 567 Wh/L. Since the electrolyte salt is dissolved in the first liquid 110, the ion conductivity of the first liquid 110 is improved.

"Computational example D" in FIG. 39 is a computational example under the condition that $LiBF_4$, i.e., the electrolyte salt, is dissolved in the first liquid 110 at a concentration of "1M." Under the condition in "computational example D," the potential of the discharge mediator (trans-stilbene) is significantly increased to 1.3 V vs. Li/Li$^+$ because of the electrolyte salt. Therefore, the discharge voltage of the flow battery is decreased to 2.1 V. Moreover, the potential of the charge mediator (biphenyl) of the negative electrode is significantly increased to 1.2 V vs. Li/Li$^+$ because of the electrolyte salt. Therefore, the equilibrium potential of the charge mediator of the negative electrode is higher than the equilibrium potential (0.15 V vs. Li/Li$^+$) of the first active material 310 (graphite: $C_6Li$). In the charge process, although the charge mediator is reduced by the first electrode 210, the first active material 310 is not reduced by the charge mediator ($C_6Li$ is not formed). Therefore, the capacity of the first active material 310 cannot be utilized. In this case, only the mediators dissolved in the first liquid 110 contribute to the battery capacity. This may be the cause of the significant reduction in battery capacity and energy density.

Embodiment 11

Embodiment 11 will be described. However, the description will be omitted as appropriate when it overlaps with that of any of embodiments 1 to 4 above.

A flow battery in embodiment 11 includes, in addition to the structure of the above-described flow battery 1000 in embodiment 1, the following structure.

Specifically, the flow battery in embodiment 11 includes the first liquid 110, the first electrode 210, and the first active material 310.

The first liquid 110 contains dissolved therein the charge mediator 111, the discharge mediator 112, and an electrolyte salt.

The first electrode 210 is immersed in the first liquid 110.

The first active material 310 is immersed in the first liquid 110.

The equilibrium potential of the charge mediator 111 is lower than the equilibrium potential of the first active material 310.

The equilibrium potential of the discharge mediator 112 is higher than the equilibrium potential of the first active material 310.

The electrolyte salt dissolved in the first liquid 110 is $LiPF_6$.

With the above structure, the flow battery provided can have a high energy density. Specifically, when the electrolyte salt in the first liquid 110 is $LiPF_6$, the equilibrium potential of the charge mediator 111 can be maintained even when the concentration of the electrolyte salt is set arbitrarily relative to the concentration of the charge mediator 111. In other words, while a significant increase in the equilibrium potential of the charge mediator 111 (an increase caused by the electrolyte salt) is prevented, the ion conductivity can be improved by the addition of a sufficient amount of $LiPF_6$. This can increase the ion conductivity while the equilibrium potential of the charge mediator 111 is prevented from exceeding the equilibrium potential of the first active material 310. This allows the first active material 310 to be reduced by the charge mediator 111. In this case, the flow battery provided can utilize the capacity of the first active material 310. Therefore, the flow battery provided can have a high energy density.

With the above structure, the flow battery provided can have a higher battery voltage (discharge voltage) and a higher energy density. Specifically, when the electrolyte salt in the first liquid 110 is $LiPF_6$, the equilibrium potential of the discharge mediator 112 can be maintained. In other words, while a significant increase in the equilibrium potential of the discharge mediator 112 (an increase caused by the electrolyte salt) is prevented, the ion conductivity can be improved by the addition of a sufficient amount of $LiPF_6$. Therefore, the flow battery negative electrode provided can have a lower potential while the ion conductivity is increased. The flow battery provided can thereby have a higher battery voltage (discharge voltage).

The flow battery in embodiment 11 may further include a second liquid 120 and the second electrode 220.

The second electrode 220 is a counter electrode of the first electrode 210. The second electrode 220 is immersed in the second liquid 120.

In this case, $LiPF_6$, i.e., the electrolyte salt, may be dissolved in the second liquid 120.

In the above structure, $LiPF_6$, i.e., the electrolyte salt, is dissolved in at least one of the first liquid 110 and the second liquid 120, and the ion conductivity of the liquid can thereby be increased.

The flow battery in embodiment 11 may further include the separator 400. The separator 400 separates the first electrode 210 and the first liquid 110 from the second electrode 220 and the second liquid 120.

In the above structure, the equilibrium potentials of the charge mediator 111 and the discharge mediator 112 can be easily maintained (changes in the equilibrium potentials can be further reduced). Therefore, the flow battery provided can have a higher battery voltage (discharge voltage). Moreover, the flow battery provided can have a higher energy density.

In embodiment 11, the first electrode 210 may be a negative electrode, and the second electrode 220 may be a positive electrode.

FIG. 40 is a table showing the results of measurement of the potentials of biphenyl solutions.

Each sample was prepared by dissolving biphenyl, i.e., a condensed aromatic compound, and $LiPF_6$, i.e., an electrolyte salt, in a 2-methyltetrahydrofuran (2MeTHF) solution at molar concentrations (M) shown in FIG. 40. Potential measurement cells containing respective samples poured therein were produced, and the potential of each cell was measured. FIG. 40 shows the potentials (V vs. $Li/Li^+$) measured with respect to lithium metal. As shown in FIG. 40, even when the concentration of the electrolyte salt $LiPF_6$ is higher (and also lower) than the concentration of biphenyl, the equilibrium potential of biphenyl with respect to the potential of lithium metal can be maintained at 0.2 V vs. $Li/Li^+$ or lower.

FIG. 41 is a table showing the results of measurement of the potentials of trans-stilbene solutions.

Each sample was prepared by dissolving trans-stilbene, i.e., a condensed aromatic compound, and $LiPF_6$, i.e., an electrolyte salt, in a 2-methyltetrahydrofuran (2MeTHF) solution at molar concentrations (M) shown in FIG. 41. Potential measurement cells containing respective samples poured therein were produced, and the potential of each cell was measured. FIG. 41 shows the potentials (V vs. $Li/Li^+$) measured with respect to lithium metal. As shown in FIG. 41, even when the concentration of the electrolyte salt $LiPF_6$ is higher (and also lower) than the concentration of trans-stilbene, the equilibrium potential of trans-stilbene with respect to the potential of lithium metal can be maintained at around 0.3 V vs. $Li/Li^+$.

<Estimation of Energy Densities>

The results of estimation of the energy densities of flow batteries in embodiment 11 will be described below.

FIG. 42 is a table showing the results of estimation of the energy densities of the flow batteries in embodiment 11.

FIG. 42 shows the results of estimation of the energy densities under the conditions described above in the operation example of the charge and discharge processes of the flow battery 3000 in embodiment 3 when the charge mediator 111 of the negative electrode is biphenyl and the discharge mediator 112 of the negative electrode is trans-stilbene.

In the computational examples shown in FIG. 42, the concentration of biphenyl in the first liquid 110 is 0.1M. The concentration of trans-stilbene in the first liquid 110 is 0.1M.

"Computational example E" in FIG. 42 is a computational example under the condition that the electrolyte salt is not dissolved in the first liquid 110. Under the condition in "computational example E," an increase in the potential of the charge mediator of the negative electrode and an increase in the potential of the discharge mediator of the negative electrode (increases caused by the electrolyte salt) do not occur. Therefore, the discharge voltage of the flow battery is high (3.1 V). The estimated energy density of the flow battery is 589 Wh/L.

"Computational example F" in FIG. 42 is a computational example under the condition that $LiPF_6$, i.e., the electrolyte salt, is dissolved in the first liquid 110 at a concentration of "1M." Under the condition in "computational example F," the potential of the charge mediator of the negative electrode is increased slightly, and the potential of the discharge mediator of the negative electrode is decreased slightly, so the potentials are not changed significantly. Therefore, the discharge voltage of the flow battery is high (3.11 V). The estimated energy density of the flow battery is 591 Wh/L. Since the electrolyte salt is dissolved in the first liquid 110, the ion conductivity of the first liquid 110 is improved.

"Computational example G" in FIG. 42 is a computational example under the condition that $LiPF_6$, i.e., the electrolyte salt, is dissolved in the first liquid 110 at a concentration of "0.1M." Under the condition in "computational example G," the potential of the charge mediator of the negative electrode is increased slightly, and the potential of the discharge mediator of the negative electrode is decreased slightly, so the potentials are not changed significantly. Therefore, the discharge voltage of the flow battery is high (3.15 V). The estimated energy density of the flow battery is 599 Wh/L. Since the electrolyte salt is dissolved in the first liquid 110, the ion conductivity of the first liquid 110 is improved.

Embodiment 12

Embodiment 12 will be described. However, the description will be omitted as appropriate when it overlaps with that of any of embodiments 1 to 4 above.

A flow battery in embodiment 12 includes, in addition to the structure of the flow battery in any of embodiments 1 to 4 above, the following structure.

Specifically, in the flow battery in embodiment 12, the first liquid 110 is prepared by dissolving a condensed aromatic compound in at least one selected from the group consisting of tetrahydrofuran, 2-methyltetrahydrofuran, 1,2-dimethoxyethane, 2,5-dimethyltetrahydrofuran, diethoxyethane, dibutoxyethane, diethylene glycol dimethyl ether, triethylene glycol dimethyl ether, tetraethylene glycol dimethyl ether, 3-methylsulfolane, and tetrahydrofurfurylamine.

In the above structure, the first liquid 110 provided can have the function of stabilizing solvated electrons released from lithium and paired with the condensed aromatic compound and can dissolve lithium (e.g., lithium metal).

FIG. 43 is a table showing samples of the first liquid.

Biphenyl used as the condensed aromatic compound was dissolved in the samples (solvents) shown in FIG. 43 at a concentration of 0.1 M to prepare solutions, and lithium metal pieces were added to the prepared solutions. Each solution was left to stand, and dissolution of lithium metal was visually checked.

When lithium metal gives solvated electrons to a colorless solution and dissolves as lithium ions, the solution is colored. The occurrence of dissolution of lithium metal can be determined by disappearance of the lithium metal.

In FIG. 43, "○ (yes)" denotes a sample with dissolution of lithium metal. In FIG. 43, "x (no)" denotes a sample with no dissolution of lithium metal.

A graphite electrode formed into a strip shape (prepared by applying graphite powder to a Cu foil and then rolling the foil) was immersed in one of the solutions containing lithium metal dissolved therein for 4 days. Then the graphite electrode was removed from the solution, and a change in color of the graphite electrode and its surface state were observed.

When graphite is reduced in a solution containing lithium metal dissolved therein and lithium is intercalated into the graphite electrode, the color of the graphite electrode or its surface state is changed. This allows to check whether the solution has the ability to reduce graphite.

In FIG. 43, "○ (yes)" denotes a sample with intercalation of lithium into graphite. In FIG. 43, "x (no)" denotes a sample with no intercalation of lithium into graphite.

In the sample using 2-methyltetrahydrofuran (2MeTHF) among the samples shown in FIG. 43, the entire surface of the graphite turned gold. When 2,5-dimethyltetrahydrofuran or DBE was used, part of graphite turned gold. This gold color is the color of $C_6Li$, and the color change indicates the formation of $C_6Li$.

When other solutions containing lithium dissolved therein were used, the change in color (to, for example, red, blue, brown, etc.) and the change in surface shape evidencing intercalation of lithium between graphite layers were found in most of the solutions.

FIG. 44 is a table showing other samples of the first liquid.

Each sample shown in FIG. 44 was prepared by mixing a solvent X and a solvent Y shown in FIG. 44 at a volume mixing ratio shown in FIG. 44.

For each of the samples shown in FIG. 44, the same experiments as those for the samples shown in FIG. 43 were performed to check dissolution of lithium metal and intercalation of lithium into graphite.

As shown in FIG. 43, when dibutoxymethane, anisole, or phenetole was used alone, the solvent did not exhibit the ability to dissolve lithium metal. However, as shown in FIG. 44, mixtures of dibutoxyethane with dibutoxymethane, anisole, and phenetole exhibited the ability to dissolve lithium metal.

It was found that when a solvent having the ability to dissolve lithium metal coexists, the ability to dissolve lithium metal can be imparted to a solvent having no ability to dissolve lithium metal, as described above.

The structures described in embodiments 1 to 12 above may be appropriately combined.

The flow battery of the present disclosure can be preferably used as an electricity storage device.

What is claimed is:
1. A flow battery comprising:
a first liquid containing dissolved therein a charge mediator and a discharge mediator;
a first electrode immersed in the first liquid;
a first active material immersed in the first liquid; and
an electrolyte salt that is dissolved in the first liquid,
wherein the equilibrium potential of the charge mediator is lower than the equilibrium potential of the first active material,
wherein the equilibrium potential of the discharge mediator is higher than the equilibrium potential of the first active material,
wherein a concentration of the electrolyte salt in the first liquid is equal to or lower than a concentration of the charge mediator in the first liquid, wherein the charge mediator is at least one selected from the group consisting of phenanthrene, o-terphenyl, triphenylene, anthracene, acenaphthene, acenaphthylene, fluoranthene, 2,2'-bipyridyl, trans-stilbene, cis-stilbene, propiophenone, butyrophenone, valerophenone, ethylenediamine, benzil, and tetraphenylcyclopentadienone, and
wherein the concentration of the charge mediator is equal to or lower than 0.1 M.

2. The flow battery according to claim 1,
wherein lithium is dissolved in the first liquid,
wherein the first active material is a material having the property of occluding and releasing the lithium,
wherein, during charging, the charge mediator is reduced on the first electrode, and the charge mediator reduced on the first electrode is oxidized by the first active material while the first active material occludes the lithium, and
wherein, during discharging, the first active material containing the lithium occluded therein reduces the discharge mediator and releases the lithium, and the discharge mediator reduced by the first active material is oxidized on the first electrode.

3. The flow battery according to claim 2,
wherein, during the charging, the discharge mediator is reduced on the first electrode, and
wherein, during the discharging, the charge mediator is oxidized on the first electrode.

4. The flow battery according to claim 1,
wherein the charge mediator is a condensed aromatic compound, and the discharge mediator is a condensed aromatic compound, and
wherein the first liquid containing the condensed aromatic compounds dissolved therein has the property of causing the lithium to release solvated electrons and dissolve as cations.

5. The flow battery according to claim 1,
wherein the concentration of the electrolyte salt in the first liquid is equal to or lower than the concentration of the discharge mediator in the first liquid.

6. The flow battery according to claim 1, further comprising:
a second liquid;
a second electrode that serves as a counter electrode of the first electrode and is immersed in the second liquid; and
a separator that separates the first electrode and the first liquid from the second electrode and the second liquid,
wherein the electrolyte salt is dissolved in the second liquid, and the concentration of the electrolyte salt in the first liquid is lower than the concentration of the electrolyte salt in the second liquid.

7. The flow battery according to claim 1,
wherein the electrolyte salt is at least one selected from the group consisting of $LiBF_4$, $LiN(SO_2CF_3)_2$, $LiN(SO_2F)_2$, and $LiCF_3SO_3$.

8. The flow battery according to claim 1,
wherein the electrolyte salt is $LiPF_6$.

9. The flow battery according to claim 1,
wherein the first liquid contains at least one selected from the group consisting of tetrahydrofuran, 2-methyltetrahydrofuran, 1,2-dimethoxyethane, 2,5-dimethyltetrahydrofuran, diethoxyethane, dibutoxyethane, diethylene glycol dimethyl ether, triethylene glycol dimethyl ether, tetraethylene glycol dimethyl ether, 3-methylsulfolane, and tetrahydrofurfurylamine.

10. The flow battery according to claim 1, further comprising
a first circulator,
wherein the first circulator circulates the first liquid between the first electrode and the first active material.

11. The flow battery according to claim 10,
wherein the first circulator includes a first container,
wherein the first active material and the first liquid are contained in the first container,
wherein the first circulator circulates the first liquid between the first electrode and the first container, and
wherein the first active material comes into contact with the first liquid within the first container to thereby cause at least one of an oxidation reaction of the charge mediator by the first active material and a reduction reaction of the discharge mediator by the first active material to proceed.

12. The flow battery according to claim 11,
wherein the first circulator includes a first passage prevention member that prevents passage of the first active material, and
wherein the first passage prevention member is disposed in a channel through which the first liquid flows from the first container to the first electrode.

13. The flow battery according to claim 1, further comprising:
a second liquid containing a second electrode-side mediator dissolved therein;
a second electrode that serves as a counter electrode of the first electrode and is immersed in the second liquid;
a second active material immersed in the second liquid; and
a separator that separates the first electrode and the first liquid from the second electrode and the second liquid,
wherein the second electrode-side mediator is oxidized and reduced on the second electrode, and
wherein the second electrode-side mediator is oxidized and reduced by the second active material.

14. The flow battery according claim 13,
wherein lithium is dissolved in the second liquid,
wherein the second active material is a material having the property of occluding and releasing the lithium,
wherein, during charging, the second electrode-side mediator is oxidized on the second electrode, and the second electrode-side mediator oxidized on the second electrode is reduced by the second active material while the second active material releases the lithium, and
wherein, during discharging, the second electrode-side mediator is reduced on the second electrode, and the second electrode-side mediator reduced on the second electrode is oxidized by the second active material while the second active material occludes the lithium.

15. The flow battery according to claim 13,
wherein the second electrode-side mediator is tetrathiafulvalene.

16. The flow battery according to claim 13,
wherein the second active material contains lithium iron phosphate.

17. The flow battery according to claim 13, further comprising
a second circulator,
wherein the second circulator circulates the second liquid between the second electrode and the second active material.

18. The flow battery according to claim 17,
wherein the second circulator includes a second container,
wherein the second active material and the second liquid are contained in the second container, wherein the second circulator circulates the second liquid between the second electrode and the second container, and wherein the second active material comes into contact with the second liquid within the second container, and the second electrode-side mediator is thereby oxidized or reduced by the second active material.

19. The flow battery according to claim 18, wherein the second circulator includes a second passage prevention member that prevents passage of the second active material, and wherein the second passage prevention member is disposed in a channel through which the second liquid flows from the second container to the second electrode.

20. A flow battery comprising:

a first liquid containing dissolved therein a charge mediator and a discharge mediator;

a first electrode immersed in the first liquid; and a first active material immersed in the first liquid, wherein the equilibrium potential of the charge mediator is lower than the equilibrium potential of the first active material, wherein the equilibrium potential of the discharge mediator is higher than the equilibrium potential of the first active material, wherein the first active material contains graphite, and wherein the charge mediator is o-terphenyl.

21. The flow battery according to claim 20, wherein the discharge mediator is at least one selected from the group consisting of 2,2'-bipyridyl, trans-stilbene, 2,4'-bipyridyl, 2,3'-bipyridyl, cis-stilbene, propiophenone, butyrophenone, valerophenone, ethylenediamine, benzil, and tetraphenylcyclopentadienone.

22. A flow battery comprising:

a first liquid containing dissolved therein a charge mediator and a discharge mediator;

a first electrode immersed in the first liquid; and a first active material immersed in the first liquid, wherein the equilibrium potential of the charge mediator is lower than the equilibrium potential of the first active material, wherein the equilibrium potential of the discharge mediator is higher than the equilibrium potential of the first active material, wherein the first active material contains zinc, and wherein the charge mediator is at least one selected from the group consisting of o-terphenyl, and benzil.

23. The flow battery according to claim 22, wherein the discharge mediator is at least one selected from the group consisting of 2,2'-bipyridyl, trans-stilbene, 2,4'-bipyridyl, 2,3'-bipyridyl, cis-stilbene, propiophenone, butyrophenone, valerophenone, ethylenediamine, and tetraphenylcyclopentadienone.

24. A flow battery comprising:

a first liquid containing dissolved therein a charge mediator and a discharge mediator;

a first electrode immersed in the first liquid; and a first active material immersed in the first liquid, wherein the equilibrium potential of the charge mediator is lower than the equilibrium potential of the first active material, wherein the equilibrium potential of the discharge mediator is higher than the equilibrium potential of the first active material, wherein the first active material contains germanium and germanium comprises at least one of $GeLi_3$ or $Ge_5Li_{22}$, and wherein the charge mediator is at least one selected from the group consisting of phenanthrene, o-terphenyl, triphenylene, anthracene, acenaphthene, acenaphthylene, fluoranthene, 2,2'-bipyridyl, trans-stilbene, cis-stilbene, propiophenone, butyrophenone, valerophenone, ethylenediamine, benzil, and tetraphenylcyclopentadienone.

25. The flow battery according to claim 24, wherein the discharge mediator is at least one selected from the group consisting of benzophenone, 2,4'-bipyridyl, and 2,3'-bipyridyl.

26. A flow battery comprising:

a first liquid containing dissolved therein a charge mediator and a discharge mediator;

a first electrode immersed in the first liquid; and a first active material immersed in the first liquid, wherein the equilibrium potential of the charge mediator is lower than the equilibrium potential of the first active material, wherein the equilibrium potential of the discharge mediator is higher than the equilibrium potential of the first active material, wherein the first active material contains aluminum, and wherein the charge mediator is at least one selected from the group consisting of o-terphenyl, acenaphthene, trans-stilbene, butyrophenone, valerophenone, ethylenediamine, benzil, and tetraphenylcyclopentadienone.

27. The flow battery according to claim 26, wherein the discharge mediator is at least one selected from the group consisting of 2,2'-bipyridyl, benzophenone, 2,4'-bipyridyl, 2,3'-bipyridyl, cis-stilbene, and propiophenone.

* * * * *